(12) United States Patent
Dolin et al.

(10) Patent No.: US 10,789,726 B2
(45) Date of Patent: Sep. 29, 2020

(54) METHODS AND SYSTEMS FOR FILM PREVISUALIZATION

(71) Applicant: Rubber Match Productions, Inc., Toronto (CA)

(72) Inventors: John Dolin, Toronto (CA); Daniel Chantal Mills, Toronto (CA); Srinivas Krishna, Toronto (CA); Naimul Mafraz Khan, Toronto (CA); Edward Albert Rosales, Mississauga (CA); Pavan Jakhu, Brampton (CA); David Alexander Yue, Mississauga (CA); Sidhdharthkumar Patel, Toronto (CA); Laura Thomas, Toronto (CA); Danning Lu, Toronto (CA)

(73) Assignee: Rubber Match Productions, Inc., Toronto, Ontario (CA)

( * ) Notice: Subject to any disclaimer, the term of this patent is extended or adjusted under 35 U.S.C. 154(b) by 315 days.

(21) Appl. No.: 15/920,695

(22) Filed: Mar. 14, 2018

(65) Prior Publication Data

US 2018/0268565 A1    Sep. 20, 2018

Related U.S. Application Data

(60) Provisional application No. 62/471,579, filed on Mar. 15, 2017.

(51) Int. Cl.
*G06F 9/48* (2006.01)
*G06T 7/70* (2017.01)
(Continued)

(52) U.S. Cl.
CPC .............. *G06T 7/70* (2017.01); *G06F 3/0482* (2013.01); *G06F 16/58* (2019.01);
(Continued)

(58) Field of Classification Search
CPC ............ G06T 7/70; G06T 2207/10021; G06T 2207/10028; G06T 2207/30244;
(Continued)

(56) References Cited

U.S. PATENT DOCUMENTS

| 2002/0130955 A1* | 9/2002 | Pelletier ................. G03B 15/00 348/211.4 |
| 2004/0095474 A1* | 5/2004 | Matsufune ........... G11B 27/034 348/220.1 |

(Continued)

*Primary Examiner* — Jennifer N To
*Assistant Examiner* — KC Chen
(74) *Attorney, Agent, or Firm* — Ridout & Maybee LLP

(57) ABSTRACT

In accordance with example embodiments, the method and system for film previsualization provides users with real-time previsualization guidance. In accordance with example embodiments, the method includes scanning a set using a mobile camera system; setting a master shot position in the set; tagging a position of one or more subjects within the set; calculating one or more camera positions based on the position of the master shot and the position of the one or more subjects; and displaying on the display of the mobile camera system the location of the one or more camera positions on a map of the set. In accordance with example embodiments, the method further includes overlaying selected composition guides over a camera live view on the display of the mobile camera system.

33 Claims, 46 Drawing Sheets

(51) Int. Cl.
    *H04N 5/222*     (2006.01)
    *G06F 3/0482*    (2013.01)
    *G06F 16/58*     (2019.01)
    *G06F 16/78*     (2019.01)

(52) U.S. Cl.
    CPC .......... *G06F 16/5866* (2019.01); *G06F 16/78* (2019.01); *H04N 5/2226* (2013.01); *G06T 2207/10021* (2013.01); *G06T 2207/10028* (2013.01); *G06T 2207/30244* (2013.01)

(58) Field of Classification Search
    CPC ...... G06F 16/5866; G06F 16/58; G06F 16/78; G06F 3/0482; H04N 5/2226
    See application file for complete search history.

(56) References Cited

U.S. PATENT DOCUMENTS

| | | | | |
|---|---|---|---|---|
| 2004/0189849 | A1* | 9/2004 | Hofer | G03B 37/04 348/333.03 |
| 2008/0225137 | A1* | 9/2008 | Kubo | H04N 5/23203 348/231.2 |
| 2008/0284848 | A1* | 11/2008 | Martin | F41H 11/02 348/143 |
| 2011/0007962 | A1* | 1/2011 | Johnson | G06F 16/70 382/154 |
| 2013/0135315 | A1* | 5/2013 | Bares | G06T 13/20 345/473 |
| 2015/0029332 | A1* | 1/2015 | Milstead | H04N 7/183 348/143 |
| 2015/0130801 | A1* | 5/2015 | Wooley | H04N 5/232 345/420 |
| 2015/0178953 | A1* | 6/2015 | Gao | G06K 9/00664 345/681 |
| 2015/0229838 | A1* | 8/2015 | Hakim | H04N 5/23222 348/333.02 |
| 2016/0327950 | A1* | 11/2016 | Bachrach | G05D 1/0044 |
| 2016/0353053 | A1* | 12/2016 | Mori | G11B 27/34 |
| 2018/0165541 | A1* | 6/2018 | Amico | G06K 9/6212 |
| 2018/0176502 | A1* | 6/2018 | Bhuruth | A63B 71/0622 |
| 2019/0037133 | A1* | 1/2019 | Schuett | H04N 13/239 |

* cited by examiner

METHODS AND SYSTEMS FOR FILM PREVISUALIZATION

CROSS-REFERENCE

This application claims the benefit of priority to U.S. Provisional Patent Application No. 62/471,579 filed Mar. 15, 2017 and entitled METHODS AND SYSTEMS FOR FILM PRE VISUALIZATION, the contents of which are herein incorporated by reference into the DETAILED DESCRIPTION OF EXAMPLE EMBODIMENTS herein below.

TECHNICAL FIELD

Example embodiments relate generally to methods and systems for providing filmmaking guidance, also referred to as previsualization.

BACKGROUND

A number of previsualization methods and systems have been used over the years. From the silent era through to the early 1990s, the primary previsualization tool for the director remained the hand drawn storyboard. For example, in the 1960s, Alfred Hitchcock used meticulously crafted, hand drawn storyboards to help figure out the camera position and composition of every shot in each scene in his films. In working out their detail, he created a previsualization guide that he would follow once he began shooting. This careful planning helped him realize his unique vision, without the need for improvisation and related trial or error when shooting a scene. Examples of hand drawn storyboards are shown in FIGS. 1, 2, and 3.

With the advent of computer technology, previsualization methods and systems changed considerably. At the level of big budget feature films, previsualization methods and systems can help the director create and refine a virtual version of the scene, plotting everything from camera positions and moves to lighting and blocking (actor movement) and dialogue. For example, in 1993, on Jurassic Park™, Steven Spielberg became one of the first directors to use digital technology to create and trial characterizations, images and sequences during preproduction.

Since then, high end 3D previsualization systems have been designed to help the director and producer trial scenes or sequences. These 3D previsualization systems, which output animated or virtual versions of the planned scenes, assist directors in identifying, correcting and refining coverage and continuity strategies. For example, the chase sequences that are featured in action films, including in the James Bond™ franchise, which are logistically challenging and expensive to shoot, are trialed and refined on computers in the previsualization stage to help keep production of the 'real version' on time and on budget.

The previsualization category has seen the introduction of previsualization systems for the consumer-pro and professional who use tablets or smartphones. These previsualization systems allow the user to manually create, trial and modify their sequences using images taken by the devices, on-board icons or avatars (i.e. virtual actor stand-ins, camera, lights, etc.) or a combination of both. Once images are gathered, the user can use the previsualization system to manually program subject and/or camera moves so they can review their trial sequence before production. Some systems require the finished output to be rendered before being viewed. In all cases, time, resources and film literacy are required during the pre-production phase to successfully complete the storyboard, schematic or plan, and in many cases, the output, which is diagram-centric, becomes a baseline for further work, such as the manual creation of a shotlist, so that the output is in a form that can be shared and understood by other crew members during pre-production and/or manually referenced during production. The finished output may be used as guidance for production with larger format cameras, so that it may be referenced during production on the user's Apple™ iPad™ tablet or another mobile device. Since this output is neither to scale nor real-time means, it provides a reference material rather than in-camera real-time guidance.

With previsualization tools like Hollywood Camera'S™ Shot Designer™, literacy in the system's operation takes time to realize and literacy in the app's visual shorthands is also required to understand the shared output or schematics. During production, additional time may be needed to explain the iconography used to describe complex camera moves, for example if the assistant camera person does not understand the visual shorthands used by the system in its schematics. While consumer pro's and professionals are literate in filmmaking, the learning curve for some mobile previsualization tools, in particular the more powerful ones, may be steeper than expected, and their overall utility may be diminished as a result.

Additional difficulties with existing systems may be appreciated in view of the Detailed Description of Example Embodiments, herein below.

BRIEF DESCRIPTION OF THE DRAWINGS

Reference will now be made, by way of example, to the accompanying drawings which show example embodiments of the present application, and in which.

DETAILED DESCRIPTION OF EXAMPLE EMBODIMENTS

Figure 3:
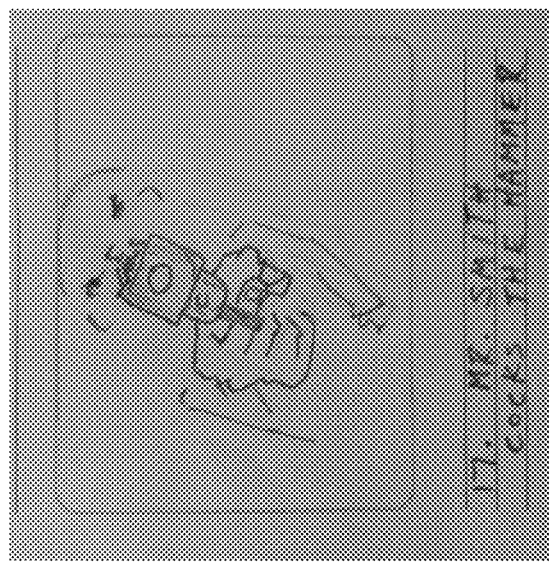
FIGS. 1, 2, and 3 are examples of hand drawn storyboards.
Figure 2:
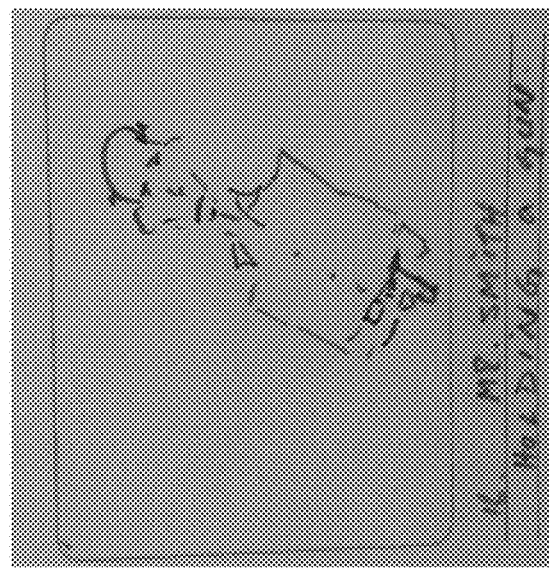
Figure 1:
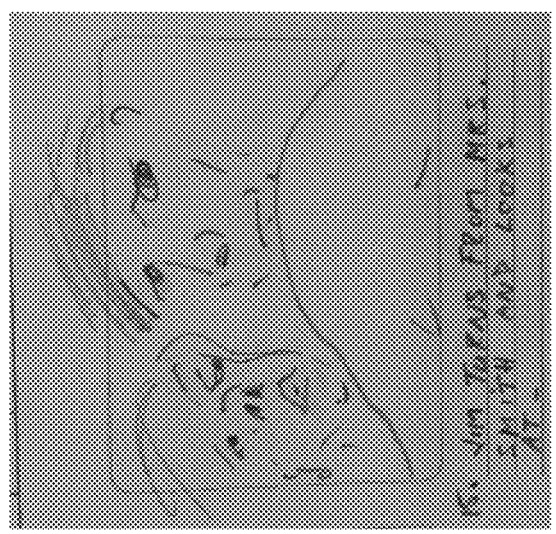
Figure 4:
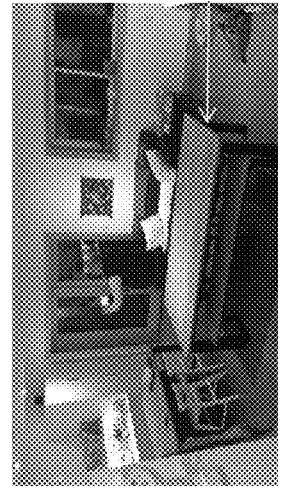
FIGS. 4, 5, 6, and 7 are pictures of a user scanning a set in accordance with example embodiments.

In narrative filmmaking, the director's primary responsibility is typically to bring a screenplay or story to life on screen. The desired final product is a collection of related scenes and shots, each with their own purpose, content, tone and look. A shot refers to an uninterrupted video recording, in other words continuous video footage or a sequence between cuts in editing. Preparation before going to camera helps the director realize identified goals of the scene. For the director, an important step in this process is previsualization. Previsualization involves breaking down the scenes into their component parts, including master shots, which are typically wide shots that establish the scene of one or more actors, and a series of complimentary shots taken from camera positions which are closer to the subject or subjects being recorded. Because these shots feature some or all of the same content, they can be edited together to form a sequence in the same way that a set of words form a sentence or argument. In the same way that grammar is used for proper word choice and sentence structure, there is a positional and compositional grammar to filmmaking.

When previsualizing a scene, the director may create a shooting plan and shot list for subsequent execution on set. By planning coverage in advance, a director may be able to reduce coverage errors and find time saving efficiencies. "Plan your shoot and shoot your plan" is the director's mantra. The production's daily schedule may be based, for the most part, on this shot list.

Pre-production previsualization methods and systems have enabled directors of assorted skillsets to previsualize, prioritize and organize the scenes and coverage they intend to shoot during production. Essentially a planning process, previsualization includes the creation and refinement of coverage schemes (sets of camera positions or moves and related images) that allow the director to produce an efficient shooting plan for each project that is executed, in increments, on each day of the project.

High end 3D previsualization systems typically require film literacy, graphic expertise and significant computational power. Although tablet or smartphone based previsualization systems require less computational power than the advanced 3D previsualization systems used in Hollywood, it is still helpful to have filmmaking literacy in order to achieve meaningful output from these mobile systems. When using these previsualization systems, it is helpful for the user to have an understanding of the conventions of filmmaking, especially proper camera placement. It is also helpful to have the time to explore different scene options. To gather still images that are relevant to the trial, the director will typically visit the set or location before production and shoot it (preferably with actors or stand-ins) so that the trial footage is relevant. Use of on-board avatars instead of actors for the trials can often be less time consuming. One way or another, time is needed to generate the images used by the previsualization systems, including time for travel, experimentation, rendering, refinement and, where necessary, coordinating with actors or stand-ins.

Previsualization methods and systems are typically intended for use in pre-production when crews are not on the clock. Use of crews during production can be time consuming and expensive. Typically, once directors are on set, time and expense encourage directors to concentrate on shooting, and not on devising or changing a pre-visualization plan. Yet the nature of filmmaking is that things often change in the field, no matter how much you plan. As such, if anything changes on the day of production, for example a scene must be cut or moved from outside to inside, or the director of photography fails to agree with camera placement, the previsualization plan may have to be altered or discarded. It's not uncommon that the director who uses previsualization methods or systems abandons their output because production requires that they improvise.

While existing previsualization systems serve a valid purpose, they are not always efficient, especially for amateurs, who lack the knowledge, experience, time and patience to use them. Furthermore, amateurs sometimes prefer impulse shooting which involves minimal pre-production planning at best.

A number of mobile filmmaking systems focus on image enhancement, for example MoviePro™, and a few offer previsualization functionality, for example Cinemek Storyboard™ and Shot Designer™. Mobile filmmaking systems that offer previsualization functionality often cater to consumer-professionals and professionals who are literate in filmmaking and are equipped to use the tool to trial coverage schemes that they themselves design. The mobile filmmaking systems that offer previsualization are considered previsualization tools in the classic sense, meaning the coverage schemes they help produce are typically created by the director in pre-production, and do not offer real time guidance when shooting.

Referring generally to all the figures which illustrate various example embodiments, the method for film previsualization comprises scanning a set using a mobile camera system 400 having a camera, one or more scanners, and a display 700, the scanning performed using the one or more scanners of the mobile camera system 400; setting a master shot 1906 position in the set; tagging a position of one or more subjects within the set using the mobile camera system 400; calculating one or more camera positions based on the position of the master shot and the position of the one or more subjects; and displaying on the display 700 of the mobile camera system 400 the location of the one or more camera positions on a map 3424 of the set.

In accordance with example embodiments, the set is empty when it is being scanned by the one or more scanners of the mobile camera system.

In accordance with example embodiments, the one or more subjects are placed within the master shot when manually setting the master shot 1906 position.

In accordance with example embodiments, the camera of the mobile camera system 400 is one of the one or more scanners. In accordance with example embodiments, the camera of the mobile camera system scans the set using monocular photogrammetry or stereoscopic photogrammetry.

In accordance with example embodiments, the map 3424 of the set is an overhead map 3424.

In accordance with example embodiments, the method for film previsualization further comprises indicating on the display which of the one or more camera positions is a next camera position to be shot.

In accordance with example embodiments, the method for film previsualization further comprises: determining, using the one or more scanners, when the camera of the mobile camera system 400 is at the next camera position; and indicating on the display which of the one or more camera positions is to be shot after footage has been shot from the next camera position.

In accordance with example embodiments, the method for film previsualization further comprises: determining, using the one or more scanners, a current location of the camera of the mobile camera system 400 in the set; and displaying the current location of the camera of the mobile camera system 400 on the map 3424 of the set.

In accordance with example embodiments, the method for film previsualization further comprises: identifying, from memory, one or more composition guides 1102 for the one or more camera positions; selecting, from the memory, one of the one or more composition guides 1102; overlaying the selected composition guide 1102 over a camera live view on the display of the mobile camera system 400.

In accordance with example embodiments, one or more of the one or more camera positions is an over-the-shoulder shot. In accordance with example embodiments, the one or more over-the-shoulder shot camera positions are positioned so that one of the subjects is contained within approximately one third of a frame of the camera of the mobile camera system 400.

In accordance with example embodiments, one or more of the one or more camera positions is a close-up shot of one of the subjects. In accordance with example embodiments, the one or more close-up shot camera positions are positioned so that one of the subjects is contained within approximately one third of a frame of the camera of the mobile camera system.

In accordance with example embodiments, the setting of the master shot 1906 position comprises receiving user input through the mobile camera system 400 when the camera of the mobile camera system 400 is in the master shot position.

In accordance with example embodiments, the setting of the master shot 1906 position comprises receiving user input through the mobile camera system 400 when the camera of the mobile camera system 400 is presently capturing the master shot.

In accordance with example embodiments, the previsualization system further comprises displaying on the display of the mobile camera system the location of one or more recommended positions for the master shot 1906 based on the scan of the set and the position of the one or more subjects.

In accordance with example embodiments, the mobile camera system automatically calculates and sets the master shot position in the set based on the scan of the set and the position of the one or more subjects.

In accordance with example embodiments, the previsualization system automatically provides the user with the master shot 1906 position. In accordance with example embodiments, this master shot 1906 position appears as a master shot position icon 908 on the overhead map 3424, which the user advances to before recording the master shot 1906.

In accordance with example embodiments, the previsualization system will recommend one or more master shot 1906 positions which appear as master shot position 1906 icons 908 on the overhead map 3424. In instances where more than one master shot position 1906 is recommended, the user advances to one of the recommended master shot positions 1906 and records a master shot from that position.

In accordance with example embodiments, the display 700 comprises a touchscreen, and the method further comprises manually plotting camera positions for a coverage scheme through the touchscreen, wherein the calculation is further based on the manually plotted camera positions.

In accordance with example embodiments, the calculating is further based on one or more of a focal length, image sensor size, or lens of the mobile camera system.

In accordance with example embodiments, the method for film previsualization further comprises displaying a dynamic compass arrow 902 on the map 3424 of the set that points in the direction of one of the camera positions.

In accordance with example embodiments, the scanning of the set generates a virtual set. In accordance with example embodiments, the virtual set is a point cloud.

In accordance with example embodiments, the method for film previsualization further comprises showing a graphic representation of the virtual set being built during the scanning of the set, wherein the graphic representation identifies the portions of the set that have been scanned.

In accordance with example embodiments, the scanning is performed using one or more of monocular photogrammetry, stereoscopic photogrammetry, motion tracking or infrared scanning.

In accordance with example embodiments, the scanning comprises measurements from one or more of a gyroscope, compass or accelerometer.

In accordance with example embodiments, the method for film previsualization further comprises: identifying one or more lines of action between two or more of the subjects; wherein calculating the one or more camera positions comprises the one or more camera positions not crossing the one or more lines of action.

In accordance with example embodiments, the method for film previsualization further comprises: ordering the camera positions when there is more than one subject; wherein the camera positions associated with the subject who is the pivot of the smallest angle formed between the master shot 1906 position and the two subjects closest to the camera position are recommended first.

In accordance with example embodiments, the camera positions associated with the subject closest to the subject who is the pivot of the smallest angle formed between the master shot 1906 position and the two subjects closest to the camera position are recommended second.

In accordance with example embodiments, the method for film previsualization further comprises: ordering the one or more camera positions to minimize lighting set ups; and displaying, on the display, the location of one or more of the lighting set ups on the map 3424 of the set.

In accordance with example embodiments, the position of one or more of the subjects comprises a path of the subject to account for the subject moving during a scene.

In accordance with example embodiments, one or more of the camera positions comprise a recommended path for the camera to follow during a scene.

In accordance with example embodiments, the method for film previsualization further comprises: shooting one or more shots at one or more of the camera positions with the camera of the mobile camera system 400; and saving the one or more shots in a gallery 2208.

In accordance with example embodiments, the method for film previsualization further comprises: identifying one or more of the shots as preferred shots; and compiling the one or more preferred shots into a video.

In accordance with example embodiments, the shots in the gallery 2208 are organized on the map 3424 of the set based on the camera position of the shots.

In accordance with example embodiments, the method for film previsualization further comprises: selecting a shot in the gallery 2208; displaying the camera position of the selected shot on the map 3424 of the set; re-shooting the shot footage from the camera position with the camera; and saving the new shot in the gallery 2208.

In accordance with example embodiments, the method for film previsualization further comprises displaying the location of one or more of the subjects on the overhead map 3424 of the set on the display 700 of the mobile camera system 400.

In accordance with example embodiments, the method for film previsualization further comprises displaying a tag on one or more of the subjects on a camera live view on the display 700 of the mobile camera system 400.

In accordance with example embodiments, the display 700 comprises a touchscreen, wherein one or more additional camera positions can be manually added to the map 3424 through the touchscreen.

In accordance with example embodiments, the calculating the one or more camera positions is further based on the scan of the set.

In accordance with example embodiments, the display 700 comprises a touchscreen, wherein the tagging the position of the one or more subjects is performed through the touchscreen. In accordance with example embodiments, the tagging the position of the one or more subjects is performed through the touchscreen by touching the one or more subjects displayed on the touchscreen.

In accordance with example embodiments, the tagging of the position of the one or more subjects is performed through the use of beacons, for example Bluetooth™ beacons such as Apple'S™ Ibeacon™ system. These real-time positional markers are carried by the subjects and once activated, relay their location to the mobile device.

In accordance with example embodiments, instructions which are executable by one or more processors for performing the method are stored on a non-transitory computer readable medium.

In accordance with example embodiments, the method for film previsualization comprises: scanning a set using a mobile camera system 400 having a camera, one or more scanners, and a display 700, the scanning performed using the one or more scanners of the mobile camera system 400; tagging a position of one or more subjects within the set using the mobile camera system 400; setting one or more camera positions; displaying on the display 700 of the mobile camera system 400 the location of the one or more camera positions on a map 3424 of the set; identifying a current location of the camera of the mobile camera system 400 in the set using the one or more scanners; and displaying the current location of the camera of the mobile camera system 400 and one or more of the camera positions on the map 3424 of the set.

In accordance with example embodiments, the mobile camera system 400 comprises: a camera; one or more processors; memory; one or more scanners; and a display 700; the one or more processors configured to execute instructions stored in memory to: scan a set using the one or more scanners, set a master shot position in the set, tag (also known as anchor) a position of one or more subjects within the set, calculating one or more camera positions based on the master shot position and the position of the one or more subjects, and displaying on the display 700 the location of the one or more camera positions on a map 3424 of the set.

In accordance with example embodiments, visual guidance is provided to users by displaying a set of camera positions which are derivative of a master shot 1906 and by displaying composition guides 1102 that are registered to each camera position which help the user frame each shot. In accordance with example embodiments, a shot is a video recording. In accordance with example embodiments, a shot is continuous video footage between cuts. In accordance with example embodiments, the visual guidance—which augments reality—is shown as overlays on top of the live image to help to stage a proper shot. In accordance with example embodiments, the film previsualization methods and systems generate a coverage scheme while the user is shooting, during production. In accordance with example embodiments, previsualization guidance is generated during production rather than pre-production. In accordance with example embodiments, real time results are delivered during production.

In accordance with example embodiments, the film previsualization visual guidance is designed to follow filmmaking conventions to assist the user to develop proper coverage that can be cut together by following the guidance and physically advancing to each recommended camera position, and by using the composition guides 1102 to help frame each shot at each position, then recording each shot with this augmented reality guidance in effect. In accordance with example embodiments, the user is guided through a process that recommends relevant shots for each subject. A subject can be an actor or some other object relevant to the shot.

In accordance with example embodiments, some of the previsualization visual guidance from the production phase may be repurposed as real-time previsualization guidance during the post-production phase.

In accordance with example embodiments, the film previsualization guidance that is developed is based on 3D measurement data acquired by scanning the set and objects on the set, the static or changing position of the mobile camera within the set, the calibrated distances of the subjects to the mobile camera, and the calibrated distances between the subjects. In accordance with example embodiments, the 3D measurement data is used to develop a 3D model of the shooting environment, referred to as a virtual set, which is used to identify, place and track the position of the user's camera and their on-camera subjects within the virtual set in order to generate recommendations.

In accordance with example embodiments, camera positions and shot composition guides 1102 for the next shot in a filming sequence are calculated and shown to the user before the user moves from their present camera position. In accordance with example embodiments, the generated coverage scheme, which includes composition guides 1102 and derivative camera positions that account for the line of action 1314 based on the master shot 1906 set by the user, is followed by the user to assist the user in capturing coverage that will cut together appropriately.

In accordance with example embodiments, guidance is provided in a simple manner that is easy to understand even by amateur filmmakers. For example, example embodiments can be designed to serve the limited skillsets and behavior-based preferences of amateur filmmakers in different age brackets, for example 13 to 17 or 18 to 30.

In accordance with example embodiments, the on-the-fly output serves amateur filmmakers who favor impulse shooting and prefer getting instruction, learning, or both instruction and learning, during engagement.

In accordance with example embodiments, the real-time previsualization methods and systems are integrated into digital learning tools targeted at different age groups and types of users: for example the impulsive 13 to 17 year old teen that shoots everything and anything on their smartphone without structure; the 13 year old who loves movies and wants to learn the craft in a fun, interactive way; the student who needs to shoot a documentary or scripted project for an assignment; the aspiring auteur; the family archivist; the blogger, video diarist or millennial that must shoot a project for an education based or work based assignment; or even the professional who may desire some real-time previsualization guidance.

In accordance with example embodiments, the targeted user groups are under pressure to become video literate, for example from social media where everything uploaded gets rated; from peers; from all levels of education (primary, secondary and post secondary) where both media and non-media classes expect video to be used as a presentation tool; and even from work where presentations often incorporate video. In accordance with example embodiments, the targeted groups consist of amateurs who don't have the skill or patience to learn how to use a professional tool (for example, Shot Designer™ or StoryBoard Composer™). In accordance with example embodiments, the target user group includes today's amateur director, who, by disposition, does not take the time to properly plan their shoot but wants to just go out there and do it.

In accordance with example embodiments, previsualization guidance is delivered in real time to assist the user to shoot scenes or movies—either on impulse or with minimal planning—while helping the user achieve proper coverage in the field.

In accordance with example embodiments, the user is provided guidance with respect to where to place the camera. Camera placement is a common source of mistakes which can slow production and can render acquired footage unusable or difficult to use because it won't cut together properly in a scene. In accordance with example embodiments, real-time positional output helps the user capture coverage that will: improve the ability to cut footage together, facilitate learning, and operate in service of impulsive behavioral preferences of users.

In accordance with example embodiments, the previsualization system is implemented on a mobile camera system 400, including iOS™ and Android™ based mobile systems. Examples of mobile camera systems 400 include Samsung™ Galaxy S8™ smartphones, Google™ smartphones (Pixel™, Pixel XL™, Pixel 2 XL™) and related tablets; Apple™ iPhone™ smartphones; Apple™ iPad™ tablets; the Lenovo™ Phab 2 Pro™; and the Asus™ ZenFone AR (ZS571K1)™.

In accordance with example embodiments, the previsualization system is a multi-platform system designed for different mobile camera systems 400 which perform scanning using one or more scanners on the mobile camera system 400. In accordance with example embodiments, the scanning uses one or more of photogrammetry (monocular and/or stereoscopic), motion tracking, sensor fusion and/or infrared scanning capability as a means of acquiring the required 3D measurement data to generate its real time positional recommendations. In accordance with example embodiments, the one or more scanners comprise one or more of an on-board camera of the mobile camera system's 400 (e.g. using photogrammetry), an infrared scanner, a Global Positioning System (GPS), a Local Positioning System (LPS) and/or other scanners. In accordance with example embodiments, the one or more scanners include a gyroscope, a compass and/or accelerometer. In accordance with example embodiments, derivative and non-derivative coverage schemes based on user inputs can be delivered to users in real time.

In accordance with example embodiments, the one or more scanners are used to identify the current location of the camera of the mobile camera system 400 in the set. In accordance with example embodiments, the current location of the camera of the mobile camera system 400 is shown on the map 3424 by the current camera position icon 904.

In accordance with example embodiments, the previsualization system makes use of game engine technology integrating real time measurement data captured by mobile camera systems 400 with infrared depth sensing capability, for example the Lenovo™ Phab 2 Pro™ which acquires depth measurement data by way of an infrared emitter, sensor and camera system. In accordance with sample embodiments, 3D depth measurement data can be captured by conventional Android™ and iOS™ devices, which feature conventional camera systems, as deployed on the iPhone 7Plus™, the iPhone 8™, the iPhone X™ and across the Google™ Pixel™ line.

In accordance with example embodiments, the film previsualization system uses the mobile camera system's 400 hardware's ability to scan the shooting environment, motion track the camera within the scanned environment, and locate and track identified objects within the scanned environment, and the game engine's ability to output that data in 2D and 3D imagery, in real time. In accordance with example embodiments, the film previsualization system is able to identify and show the user where their current subject and current camera positions are, as well as produce a coverage scheme of derivative camera positions and composition guides 1102 that are registered to those positions.

In accordance with example embodiments, depending on the vision recognition capabilities and/or camera design of the mobile camera system 400, the mobile camera system 400 may automatically register the set but require that the positions of the on-screen subjects be manually registered, while others may require both the subject positions and set be simultaneously registered via scanning.

In accordance with example embodiments, the mobile camera system 400 is a Lenovo™ Phab 2 Pro™ which is an Android™ based smartphone or tablet that features Google™ Tango™ augmented reality based technology. In accordance with example embodiments, the mobile camera system 400 includes an on-board infrared depth emitter and sensor that maps interior shooting environments, identifies objects or subjects within the shooting environment, and motion tracks the camera within the scanned space.

In accordance with example embodiments, when scanning a set with the mobile camera system 400, a point cloud is built. In accordance with example embodiments, a point cloud is a 3D model of the planes on a set which may include, for example, the floor, ceiling, walls and furniture surfaces. In accordance with example embodiments, the planes on the set are identified by a number of points of infrared light which are sent by the infrared depth emitter to mark the set and which are sensed by the infrared depth sensor during scanning. In accordance with example embodiments, a time of flight lens, which measures the time it takes infrared light to travel from and return to the time of flight lens, is used to perform depth sensing. In accordance with example embodiments, the point cloud is a cluster of the points of infrared light sent and sensed by the mobile camera system's 400 emitter/sensor system during scanning. In accordance with example embodiments, the mobile camera system 400 co-ordinates two on-board cameras to achieve a monocular photogrammetric solution in conjunction with infrared based depth perception capability. The Lenovo Phab2Pro™ is an example of a mobile camera system 400 that co-ordinates two on-board cameras.

Figure 17:
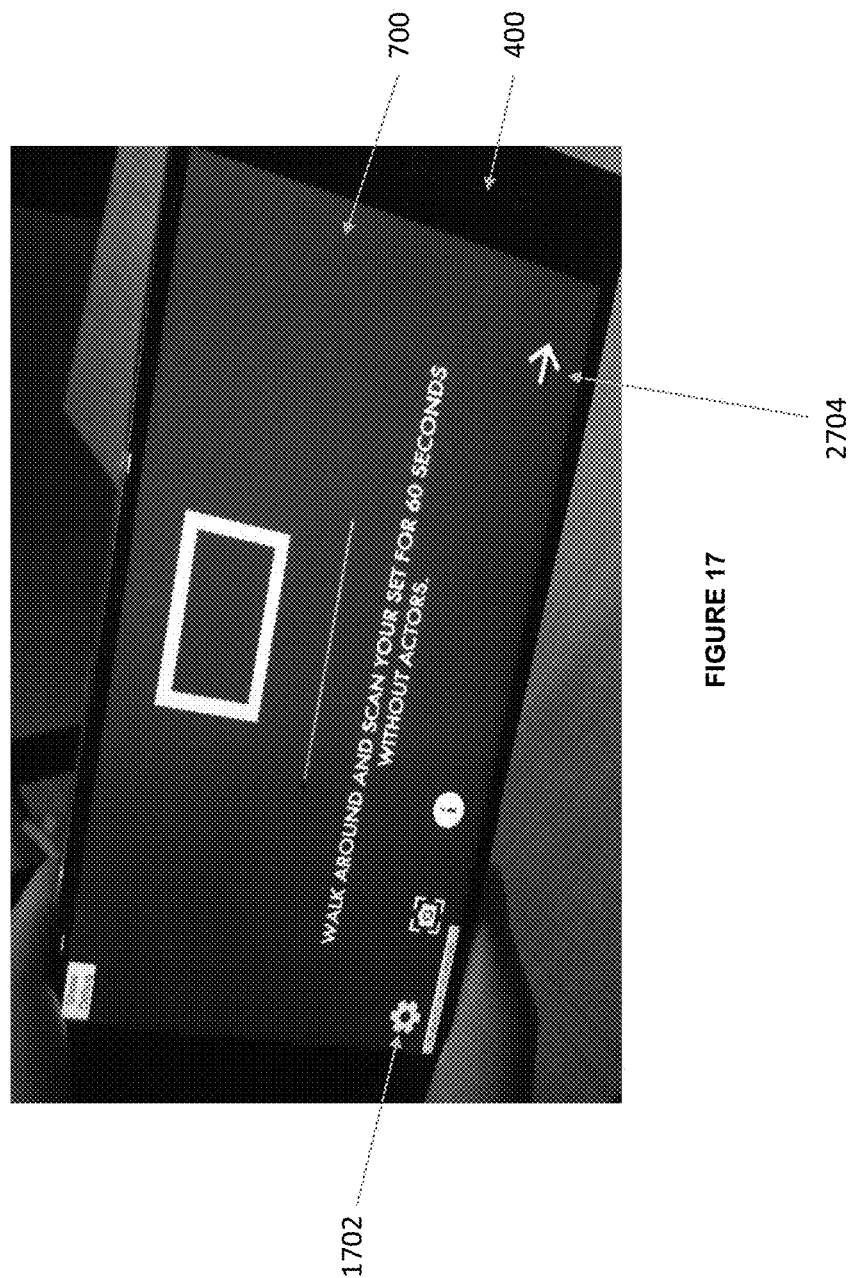
FIG. 17 is a picture of a get ready to scan screen of a user interface in accordance with example embodiments.
Figure 18:
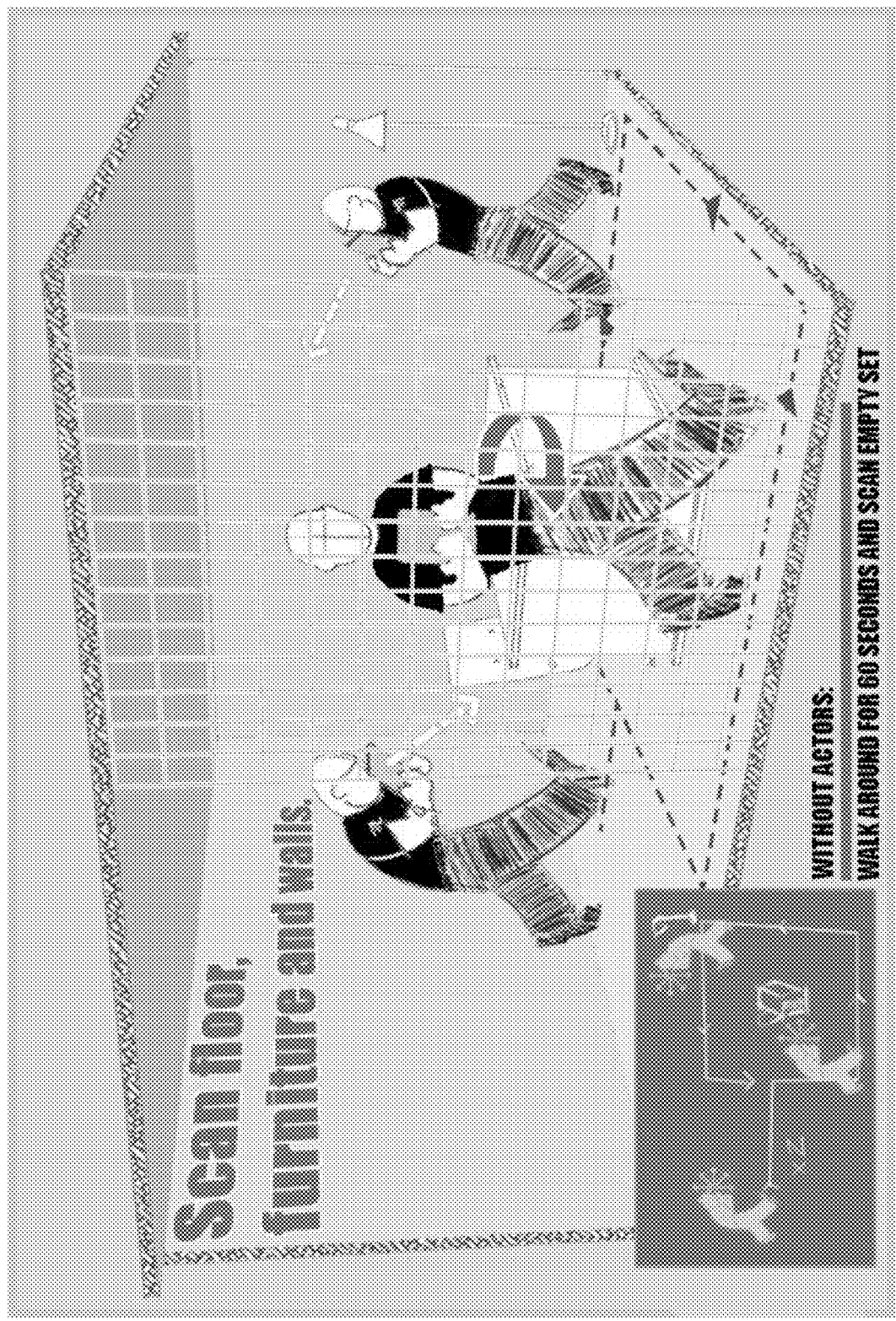
FIG. 18 is an example illustration of a user scanning a set in 3 dimensions.

As shown in FIG. 17, in accordance with example embodiments, a scanning period of 60 seconds is used to scan a set using an infrared depth emitter and sensor.

In accordance with example embodiments, a 3D sensor for mobile devices, for example the Structure™ sensor produced by Occipital™, is attached to the mobile camera system 400, which allows the mobile camera system 400 to gain real-time depth sensing capability that can be used to scan the set, identify subjects or objects on the set and motion track the camera, on the set.

In accordance with example embodiments, the mobile camera system 400 does not include infrared depth sensing. In accordance with example embodiments, one or more of monocular photogrammetry, stereoscopic photogrammetry and sensor fusion are used to generate a 3D model of the set and identify the locations of actors or objects and motion track the camera. With monocular photogrammetry, which can be used by mobile devices with either single camera systems or two camera systems, 3D measurement data is mined from key frames drawn from the video stream as opposed to an infrared point cloud. With stereoscopic photogrammetry, the same 3D measurement data is gathered through the co-ordination of two on-board cameras. With sensor fusion, 3D measurement data is acquired through the strategic co-ordination of the mobile device's sensors (such as its gyroscope, compass and accelerometer) to determine precise 3D movements and orientations relative to a starting location. These 3D movements and orientations can be combined with a monocular or stereoscopic photogrammetric solution to better determine movements and positions in real time.

In accordance with example embodiments, the previsualization system makes use of game engine technology integrating real time measurement data captured by the mobile camera system 400 which uses optically based photogrammetry to obtain the required measurement data, as is common on Android™ or iOS™ mobile devices. In accordance with example embodiments, Apple™ ARKit™ and Google™ ARCore™, which are augmented reality toolsets for mobile devices, enable conventional mobile devices to acquire the required 3D measurement data by leveraging a form of monocular photogrammetry.

In accordance with example embodiments, Apple™ ARKit™ or Google™ ARCore™ toolsets leverage photogrammetric principles and sensor based capabilities to enable conventional mobile camera systems 400 to detect, recognize and scan horizontal planes as the basis for mapping environments by identifying a large number of markers on each horizontal plane then finding the mathematical equation that makes them co-planar. In accordance with example embodiments, a derivative vertical measurement on the Z-axis is subsequently calculated perpendicular to the horizontal planes. In accordance with example embodiments, these AR toolsets enable conventional camera systems to detect, recognize and scan both horizontal and vertical planes as the basis for mapping suitable environments for shooting. For example, Apple™ ARKit™ includes the ability to scan vertical planes in addition to horizontal planes.

Figure 44A:
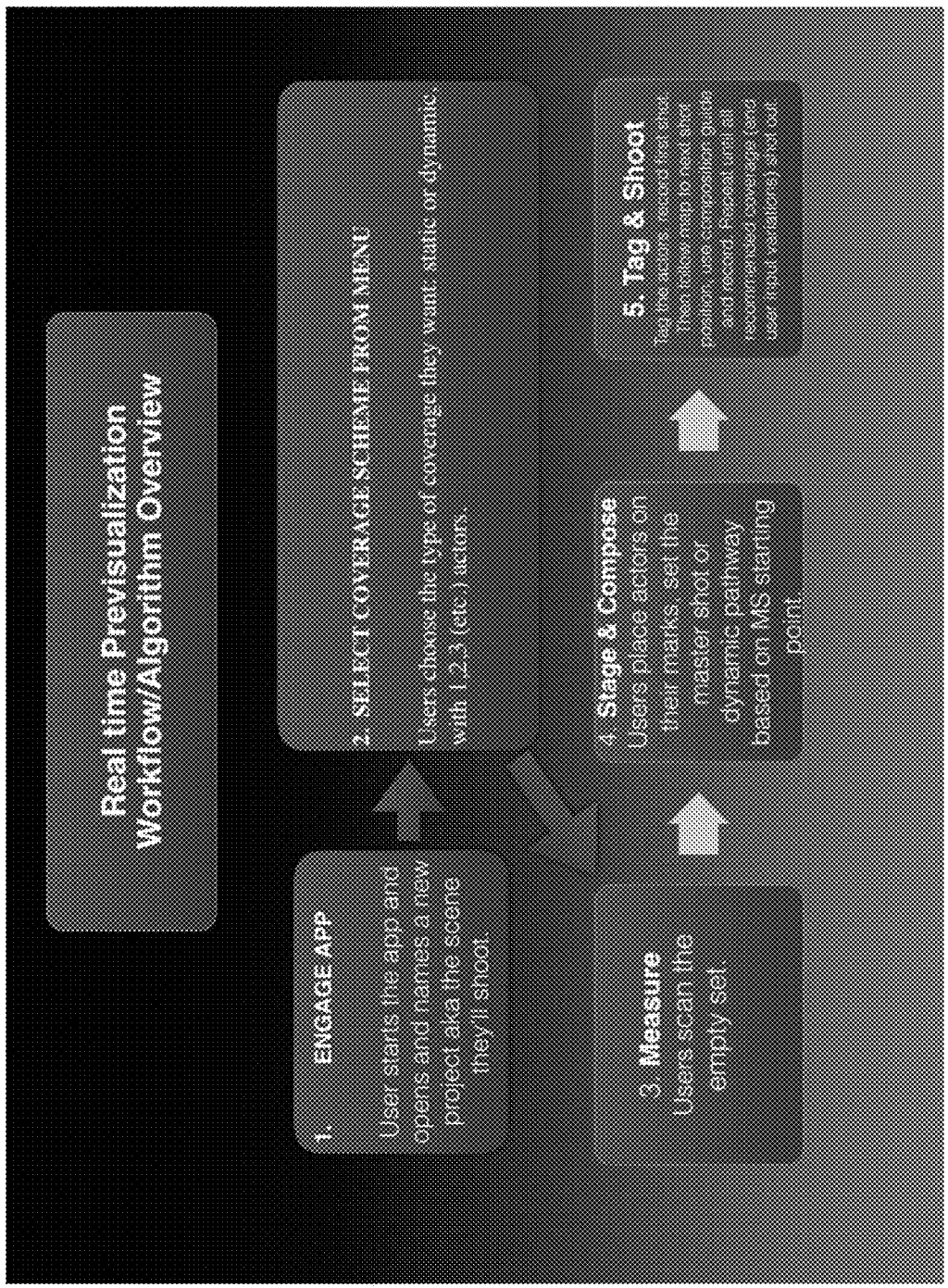
FIG. 44A shows an example workflow for film and video previsualization in accordance with example embodiments.
Figure 44B:
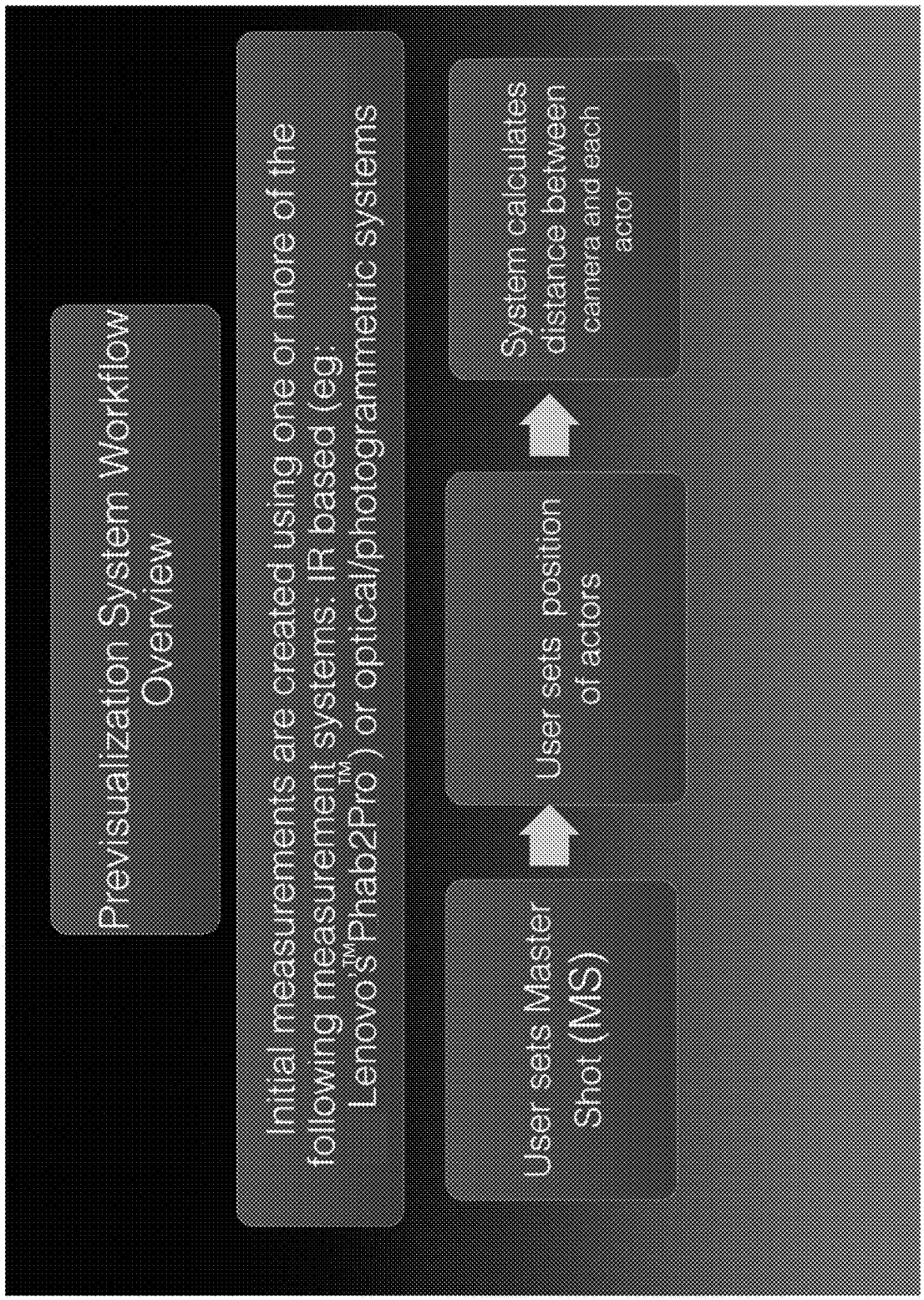
FIG. 44B shows an example workflow of measurement steps for film and video previsualization in accordance with example embodiments.

As shown in FIG. 44B, in accordance with example embodiments, the user scans an empty set 602 to capture its physical parameters (which is used to map and build the virtual set); sets the master shot 1906 (which inputs the master shot 1906 position into the virtual set); and tags the subjects (which inputs the subjects' positions into the virtual set). In accordance with example embodiments, related measurement and positional data is mined from key frames from the video stream using photogrammetry.

In accordance with example embodiments, some consideration must be made in respect to the actual set used since the previsualization system requires that a set be scanned, and scanning requires tangible surfaces for contact, feedback and related measurements. In accordance with example embodiments, environments with non-visible horizons cannot be properly scanned by the mobile camera system 400, examples being an empty field or airport hangar where the walls are beyond the reach of the device scanner. In accordance with example embodiments, a 20' by 20' environment or smaller may represent an acceptable space to shoot in with some mobile camera systems 400. In accordance with example embodiments, outdoor scenes can be staged where there are backgrounds such as a parked vehicle or outer walls, since they add vertical planes, surfaces and texture for scanning. In accordance with sample embodiments, when scanning is achieved on mobile systems by way of augmented reality toolsets such as Google™ ARCore™, non-visible horizons are not an impediment, because these systems are focused primarily on horizontal plane detection—for example a floor or table—versus both horizontal and vertical plane detection. As such, a 50 'by 50' environment, or larger, may represent an acceptable space to scan and shoot in with some mobile camera systems 400, whether inside or outside, with or without visible horizons. In accordance with example embodiments, where AR toolsets such as Apple™ ARKit™ enable mobile camera systems to scan both horizontal and vertical planes, a lack of visual horizon may impede or corrupt the scan. In accordance with example embodiments, the previsualization system may include a scan booster, in which case the number of environments that can be used as a set may be increased.

In accordance with example embodiments, the previsualization system is tailored to work around predictable scanning limitations. In accordance with example embodiments, some coverage schemes may require supplementary compositional guidance without real time positional guidance. For example, a car sequence module may be featured with real time positional guidance that covers several related interior and exterior sequences and shots, including a driver and any number of passengers getting into a car, sitting in a car, driving off, travelling in the car, passenger POVs (points of view) out the windows and parking. In accordance with example embodiments, the car sequence feature may be offered as an additional module that can be purchased by the user. In accordance with example embodiments, the car sequence feature may not accommodate certain exterior shots that fall outside the scope of any device's scanning range, for example a drive-by where the car drives past a stationary camera on the roadside and car-to-car footage where a chase car records the hero car while driving.

In accordance with example embodiments, some event based coverage schemes require that the real time positional guidance feature be masked or turned off while offering real-time guidance for uncontrolled situations such as sporting events, birthday parties or graduations. In accordance with example embodiments, the real time positional guidance feature is turned off once the master shot 1906 and/or other derivative shots have been achieved. In these situations, the real-time composition guides 1102 are still accessible.

In accordance with example embodiments, when scanning limitations prevent the capture of certain shots required to build, complete or augment a real time coverage scheme, users are provided a list of shots with related positional and compositional guidance that are not dependent on scanning a set. In accordance with example embodiments, this positional and compositional guidance can be inserted anywhere into the sequence. In accordance with example embodiments, pick up shots can be achieved using a free shot option which allows the user to insert and register their own shot and camera position into the recommended coverage scheme and related overhead map 3424.

In accordance with example embodiments, real-time previsualization guidance is based on the set where the user chooses to stage their material, the position or positions of a master shot 1906 within the set, the position or positions of the camera in the set for subsequent shots after the master shot 1906, and the positions of the tagged subjects in the set.

In accordance with example embodiments, derivative camera positions are calculated and visually rendered on a display 700 of the mobile camera system 400 based on user inputs that enable positional identification of static or moving on-camera subjects. In accordance with example embodiments, the ability of mobile camera systems 400 to scan and map the shooting environment as well as locate and track identified objects within the scanned environment is leveraged to acquire specific measurement sets that form the basis of the camera position recommendations. In accordance with example embodiments, this data includes one or more of the 3D model for the virtual set; the user's master shot 1906 position within the set; the real-time position or positions of the mobile camera system's 400 camera within the set; the position or positions of the on-camera subjects within the set; the distance from the on-camera subjects to the lens; and the distance between the on-camera subjects.

In accordance with example embodiments, an overview real time previsualization workflow/algorithm overview is shown in FIG. 44A.

Figure 16:
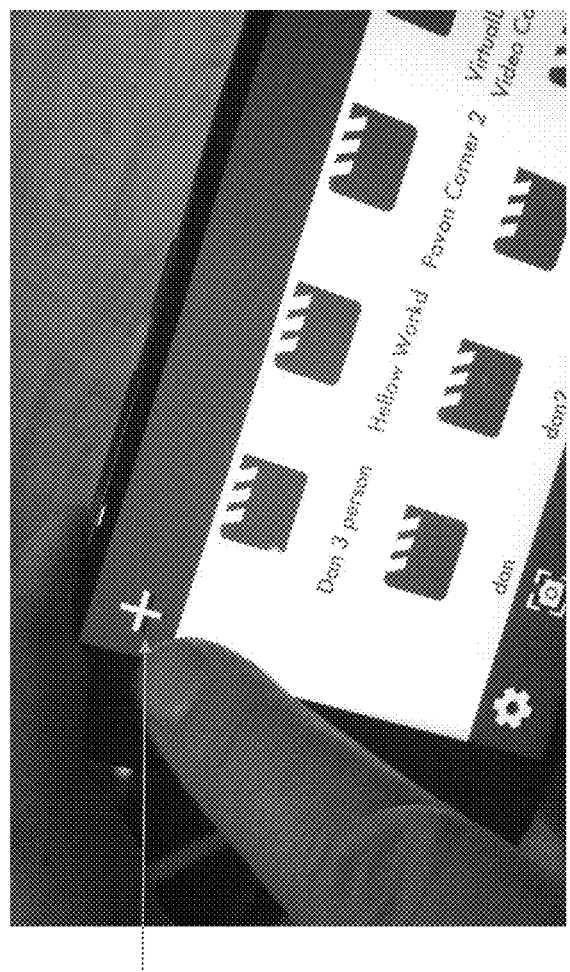
FIG. 16 is a picture of a user interface to create a new project in accordance for example embodiments.

As shown in FIG. 16, in accordance with example embodiments, the user engages the previsualization system by opening a project. In accordance with example embodiments, after deploying the previsualization system, the user lands on a project screen and is prompted to open a new project by selecting a plus (+) symbol 1602. In accordance with example embodiments, the plus (+) symbol 1602 is at the top left of the frame.

Figure 27A:
FIG. 27A is a picture showing a user interface for entering a project name in accordance with example embodiments.
Figure 27B:
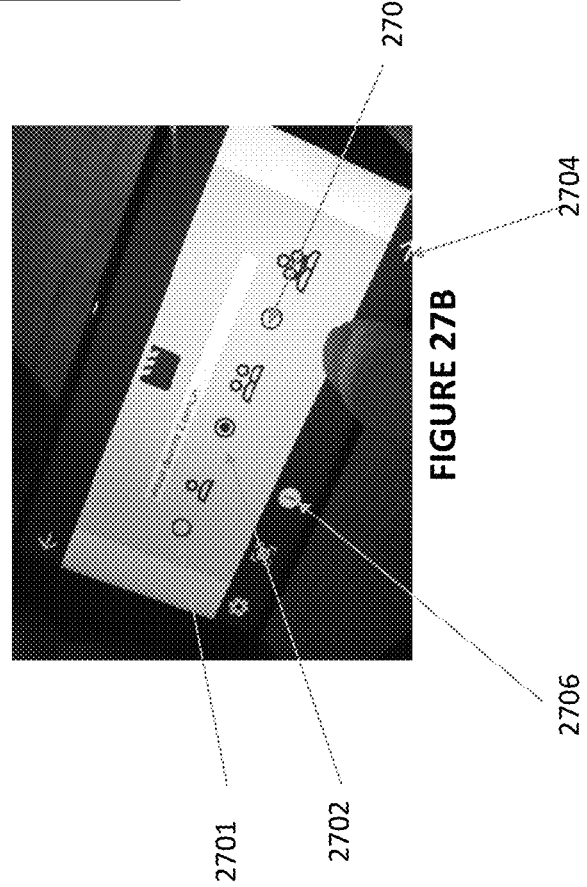
FIG. 27B is a picture of a user interface for selecting the type of coverage requested in accordance with example embodiments.

As shown in FIG. 27A, in accordance with example embodiments, the user enters a name for the project after opening a new project. As shown in FIG. 27B, in accordance with example embodiments, the user selects the kind of coverage they desire, for example 1, 2, or 3 person coverage. In accordance with example embodiments, the user selects the 1 person coverage icon 2701 for 1 person coverage, the 2 person coverage icon 2702 for 2 person coverage, and the 3 person coverage icon 2703 for 3 person coverage.

As shown in FIG. 27B, in accordance with sample embodiments, the display 700 of the mobile camera system 400 provides the user with a go arrow 2704 to press in order to advance to the next step. In accordance with example embodiments, the next step is to scan the set.

Figure 34:
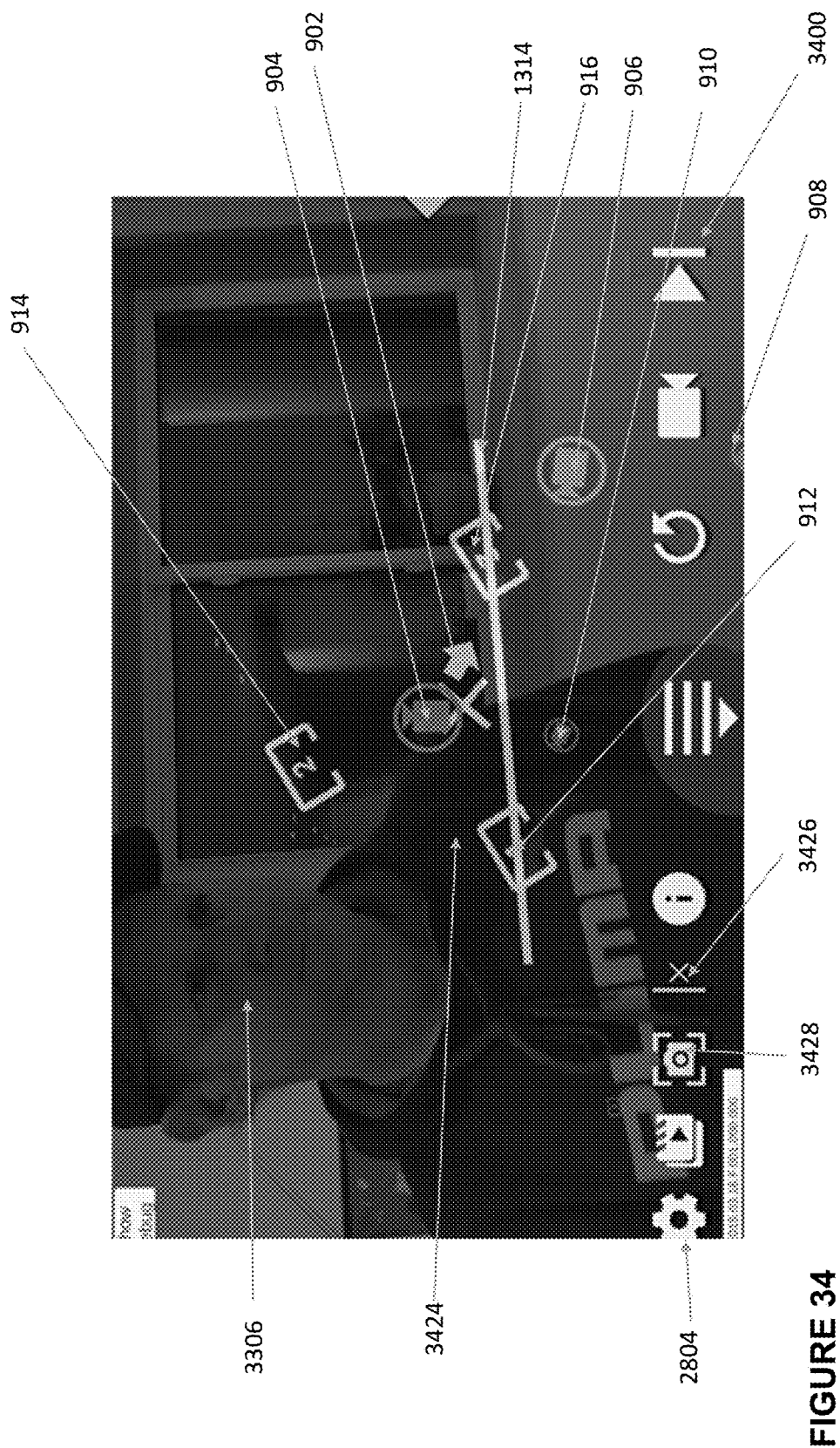
FIG. 34 is a picture depicting a user interface which shows the line of action in accordance with example embodiments.

In accordance with sample embodiments, the user may tap the help icon 2706 at any time, on any page, during operation to summon written and graphic guidance to help execute each operational step. An example of written and graphic guidance is shown in FIGS. 7, 20, 22, and 25B. In accordance with example embodiments, as shown in FIGS. 17 and 34, for supplementary insight into the system's functionality and how best to use it, the user taps the gear icon 1702 to access the system's Getting Started Guide. In accordance with example embodiments, the user may tap the gear icon 1702 to access language settings and/or access the internet for sharing, uploading or downloading.

As shown in FIGS. 44A and 44B, in accordance with example embodiments, initial data acquisition occurs in three steps: scanning an empty set 602; composing the master shot 1906, and tagging the subjects. In accordance with example embodiments, the subjects are tagged using a touchscreen of the mobile camera system 400.

In accordance with example embodiments, the positions of the master shot and tagged subjects are identified as positions within the scanned set. In accordance with example embodiments, tagging a subject using a touchscreen identifies a position of the subject within the scanned set.

As shown in FIG. 17, in accordance with example embodiments the display 700 of the mobile camera system 400 prompts the user to tap the go arrow 2704 and start scanning the empty set 602. In accordance with example embodiments, the go arrow 2704 is displayed on the bottom right of the display 700. As shown in FIGS. 4, 5, 6, 7, and 18, in accordance with example embodiments the user scans the empty set 602. In accordance with example embodiments, the user walks the empty set 602 and scans ground to ceiling including vertical and/or horizontal plane(s) while the mobile camera system 400 builds the virtual set.

Figure 5:
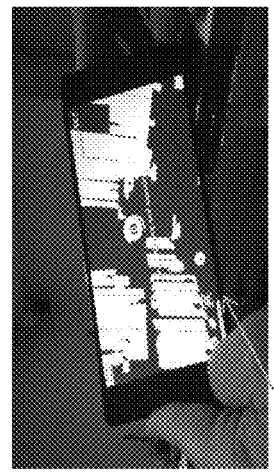

As shown in FIG. 5, in accordance with example embodiments, the user is provided visual feedback on the mobile camera system's 400 display 700 showing the virtual set being built, which can be used to show the user where they have scanned and where they may need to keep scanning. In accordance with example embodiments, the virtual set takes the form of a point cloud.

Figure 6:
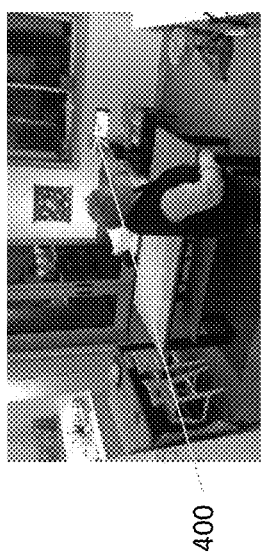
Figure 7:
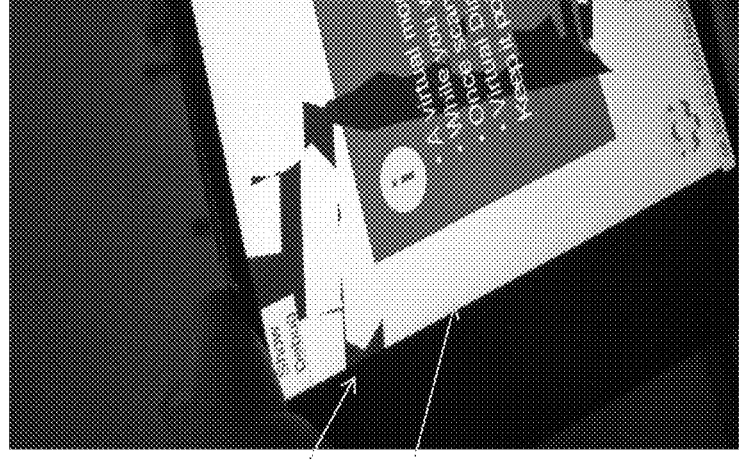

As shown in FIG. 6, in accordance with example embodiments, the mobile camera systems 400 is used for scanning the empty set 602. In accordance with example embodiments, the mobile camera system 400 uses infrared emitters and sensors, which use structured light, time of flight and stereo imaging to create depth perception and map the set in 3D. In accordance with example embodiments, mobile camera systems 400 may use a structured light technique that projects laser dots or a moray pattern onto the real set as a means of mapping the set in 3D. In accordance with example embodiments, mobile camera systems 400 generate the point cloud by way of a time-of-flight approach which calculates the time for a laser to bounce off horizontal and/or vertical point or points on a surface or plane as a means of mapping the set in 3D. In accordance with example embodiments, shot recommendations that are specific to a scene, set and the actors on a set are partially based on a scan of a set, which registers and logs key spatial, measurement and positional data.

Figure 19A:
FIG. 19A is a picture showing composition of a master shot in accordance with example embodiments.
Figure 19B:
FIG. 19B is a picture showing composition of a master shot with actors in accordance with example embodiments.

In accordance with example embodiments, the user sends their actors into position onto the set then composes and sets the master shot 1906. As shown in FIG. 19A, in accordance with example embodiments, the user is prompted to compose the master shot 1906 by a composition prompt 1901. As shown in FIG. 19B, in accordance with example embodiments, the user positions the subjects, for example a first actor 1902 and second actor 1904, on set and composes the master shot 1906 so that both actors are visible in the same wide frame. In accordance with example embodiments, the master shot 1906 allows the user to see all featured subjects in the display 700 of the mobile camera system 400 in the same wide frame. In accordance with example embodiments, the mobile camera system 400 receives user input when the live view of the mobile camera system 400 is capturing the master shot 1906. In accordance with example embodiments, the user is prompted to press a go arrow 2704 to set the master shot 1906 position within the virtual set.

Figure 8:
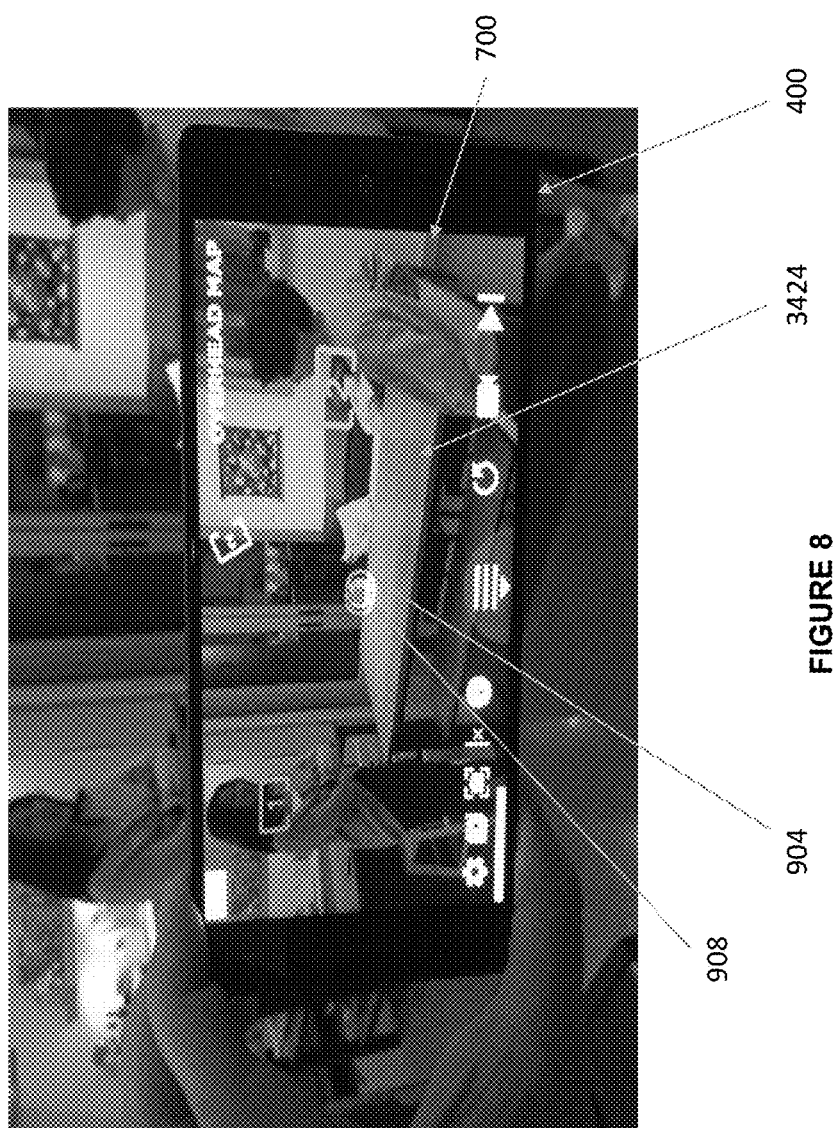
FIG. 8 is a picture of an overhead map user interface in accordance with example embodiments.
Figure 9:
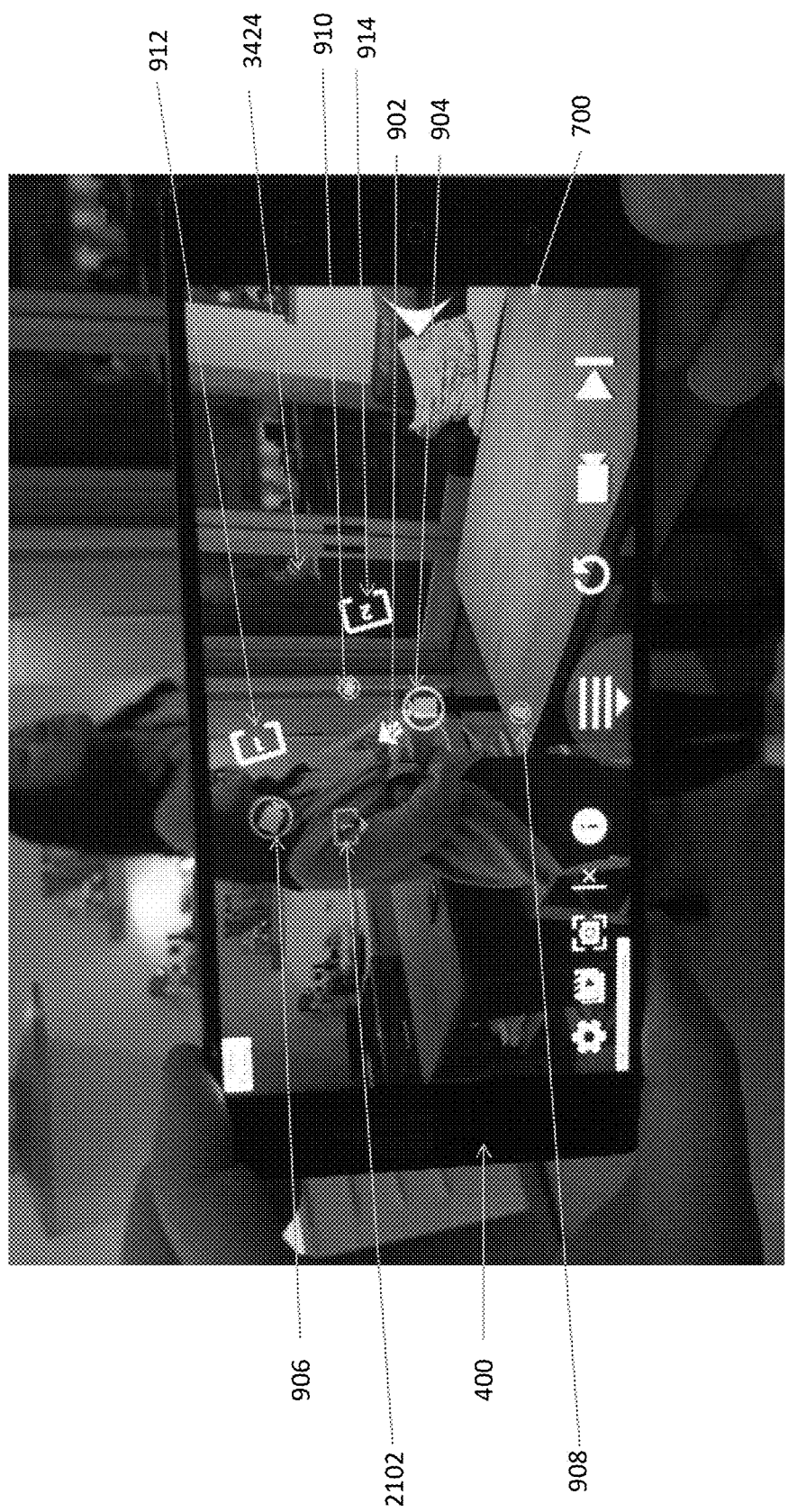
FIG. 9 is a picture of an overhead map user interface in accordance with example embodiments.
Figure 20:
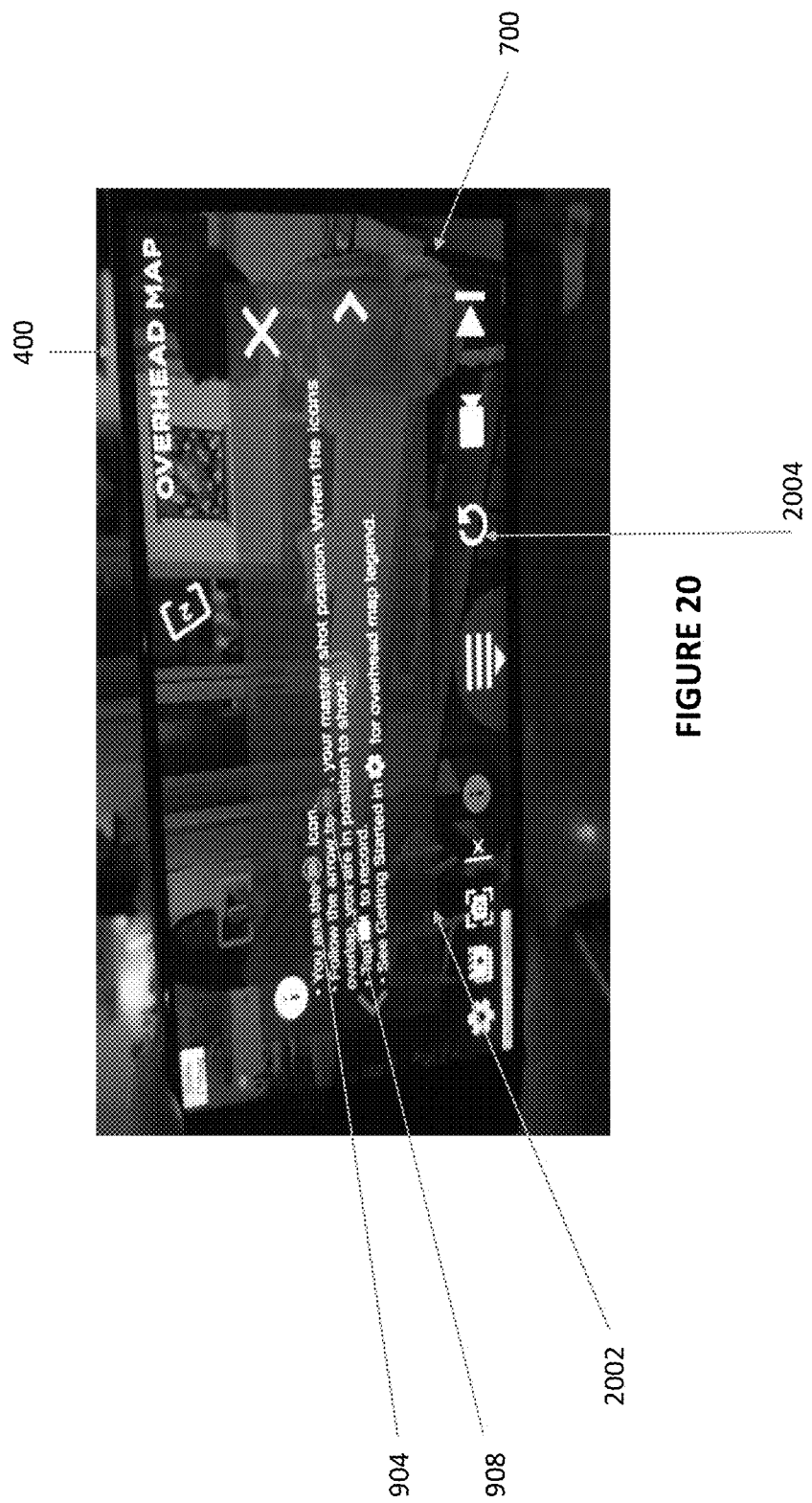
FIG. 20 is a picture of an information screen in accordance with example embodiments.

As shown in FIGS. 8, 9, and 20, in accordance with example embodiments the master shot 1906 position becomes visible as a master shot 1906 position icon 908 on a map 3424 shown in the display 700 of the mobile camera system 400. In accordance with example embodiments, the map 3424 is an overhead map 3424. As shown in FIG. 8, in accordance with example embodiments, the user's master shot 1906 position icon 908 is represented by a red camera and the user's current camera position icon 904 is represented by a green camera icon. As shown in FIG. 8, in accordance with example embodiments, the two icons overlap to indicate that the user is in the correct position to record the master shot 1906. As shown in FIG. 20, in accordance with example embodiments, the instructions for this correct positioning is described by a help page 2002 depicted over the mobile camera systems' 400 live view.

Figure 21B:
FIGS. 21A, 21B, 21C, and 21D are pictures showing the tagging of two actors in a two person scene using a user interface in accordance with example embodiments.
Figure 21A:
Figure 21:
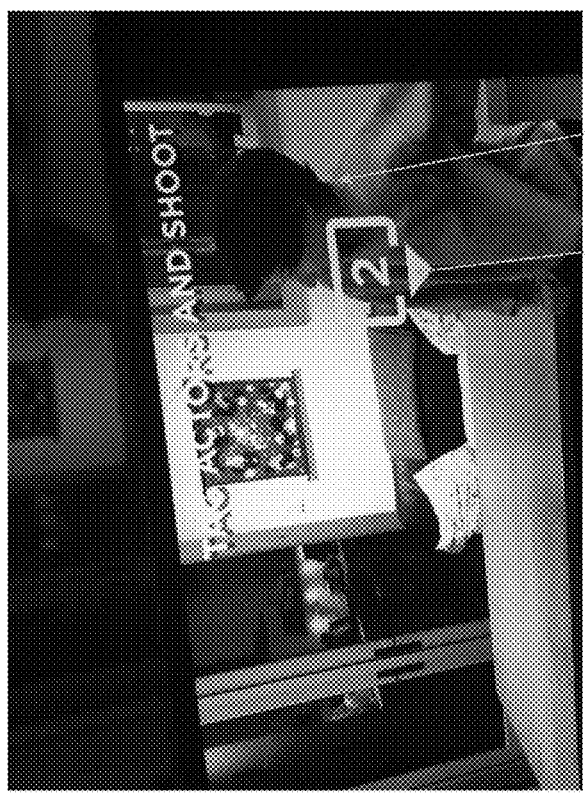
Figure 21C:

In accordance with example embodiments, as shown in FIG. 21C, the user may reset the master shot 1906 by pressing the go arrow 2704 on the top left of frame after tagging the subjects. This action will clear the tags and take the user back to the compose master shot 1906 screen as shown in FIG. 19B, where they can then compose a new master shot 1906 in the same sequence.

In accordance with example embodiments, the user is provided access to the one or more master shot 1906 positional recommendations after resetting the master shot 1906.

As shown in FIGS. 21A, 21B, 21C, and 21D, in accordance with example embodiments, the user tags the subjects that will be featured in the recording. In accordance with example embodiments, the subjects, for example the first actor 1902 and the second actor 1904, are tagged by tapping them on the touchscreen of the mobile camera system's 400 display 700, and the subjects' positions become anchored in the virtual set. As shown in FIGS. 21C and 21D, in accordance with example embodiments, tagging marks the subject positions in the virtual set and produces a numbered tag 2102, 2104 at the point of contact or near the point of contact on the subjects, which is shown on the mobile camera system's 400 display 700. In accordance with example embodiments, tagging the subjects sets 3 dimensional co-ordinates for the subject in the virtual set. In accordance with example embodiments, the 3D co-ordinates are set by the user on or near the subject.

In accordance with example embodiments, as shown in FIG. 20, the user may re-tag the subject by pressing the reset icon 2004 on the control panel 2804. This will clear the existing tags and allow the user to re-tag the subjects.

In accordance with example embodiments, the line or lines of action 1314 are identified based on the coordinates of the tagged subjects. In accordance with example embodiments, the 3D co-ordinates of the recommended camera positions in the virtual set are calculated partially based on each subjects' 3D co-ordinates.

Figure 29:
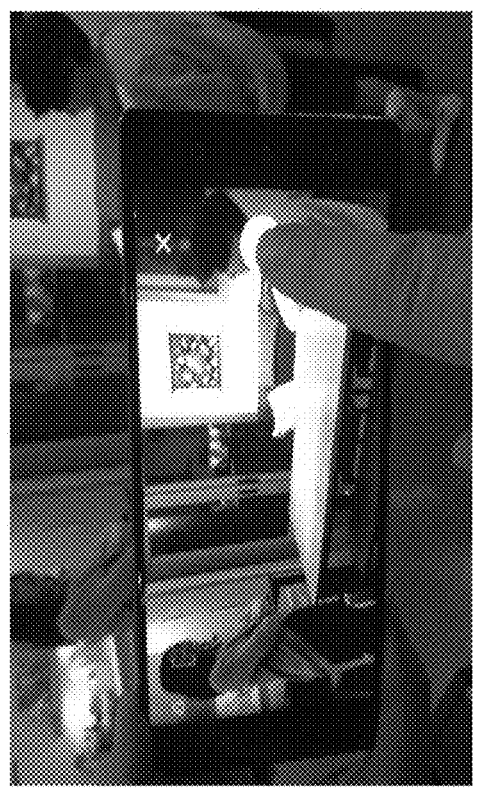
FIGS. 28 and 29 are pictures showing the master shot being recorded in accordance with example embodiments.
Figure 28:

In accordance with example embodiments, after scanning the set, composing and setting the master shot 1906, and tagging the subjects, the user then records the master shot 1906. In accordance with example embodiments, the user starts recording the master shot 1906 by tapping a camera icon 2802 on a control panel 2804 as shown in FIG. 28. In accordance with example embodiments, the user records the master shot 1906 with the mobile camera system's 400 camera, which records and saves the master shot 1906 as shown in FIG. 29. In accordance with example embodiments, the user records and saves one or more versions of the master shot 1906. In accordance with example embodiments, after saving one or more versions of the master shot 1906, the user then follows the guidance to record each subsequent positional and composition recommendation until all recommended coverage has been recorded.

In accordance with example embodiments, measurement data for the film previsualization methods and systems include the physical parameters of the empty set 602, the user set master shot 1906 position which is based, in part, on the live-view offered by the lens of the mobile camera system 400, and the distance of the master shot 1906 position to the position of the tagged subjects on the scanned set. In accordance with example embodiments, the virtual set, master shot 1906 position and subject tagging data is used to calculate and output geo-accurate derivative camera positions for a coverage scheme based on the scanned empty set 602, the master shot 1906 camera position, the subject positions and the relative distances between them.

Figure 44C:
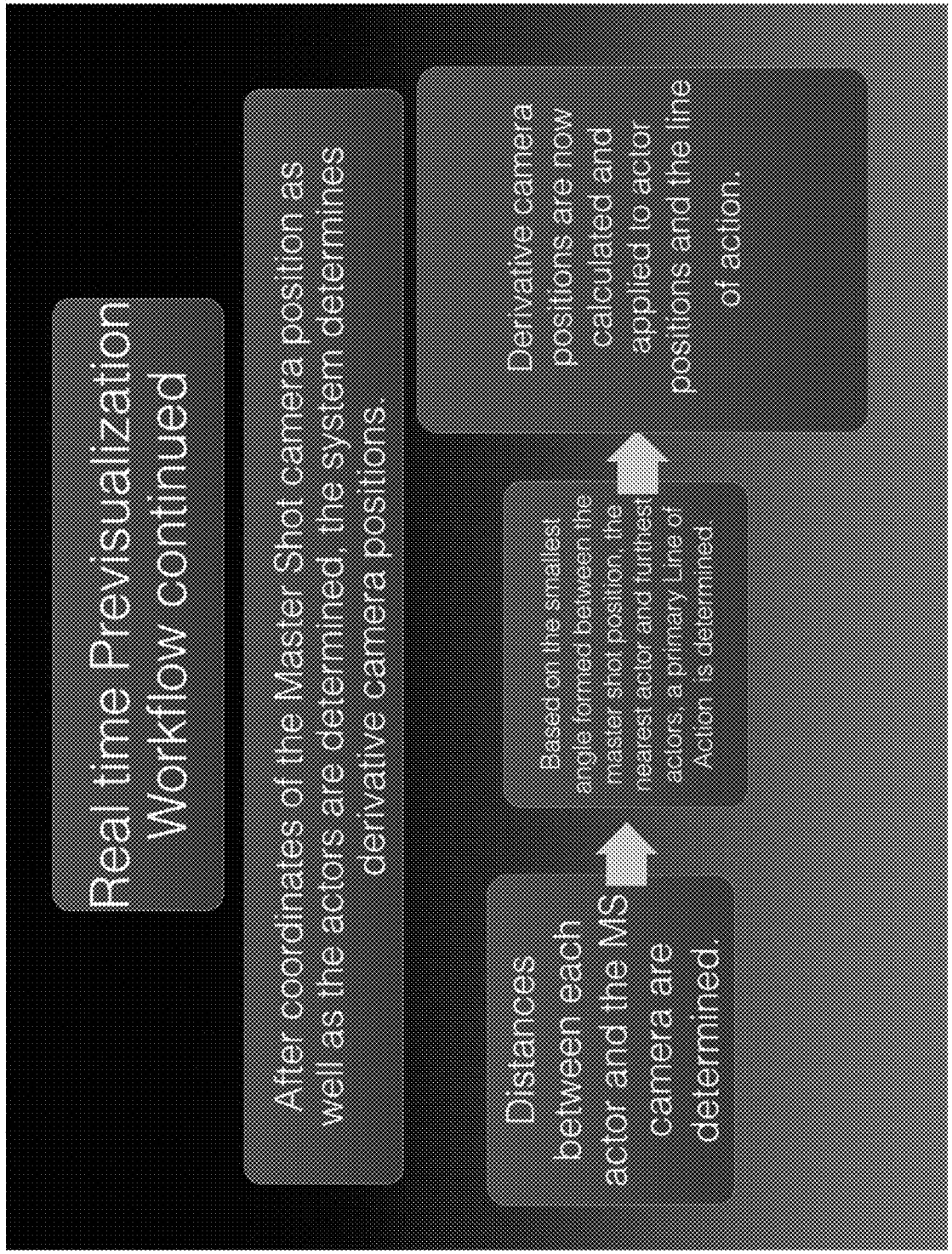
FIG. 44C shows an example workflow of measurement steps that set the primary line of action in accordance with example embodiments.

As shown in FIG. 44C, in accordance with example embodiments, derivative camera positions are based on the position of the camera relative to the scanned empty set 602 and tagged subjects, whether static or moving, as well as the focal length of the mobile camera systems' 400 native lens and/or related attachments, as well as calculated static and/or changing distances.

Figure 13:
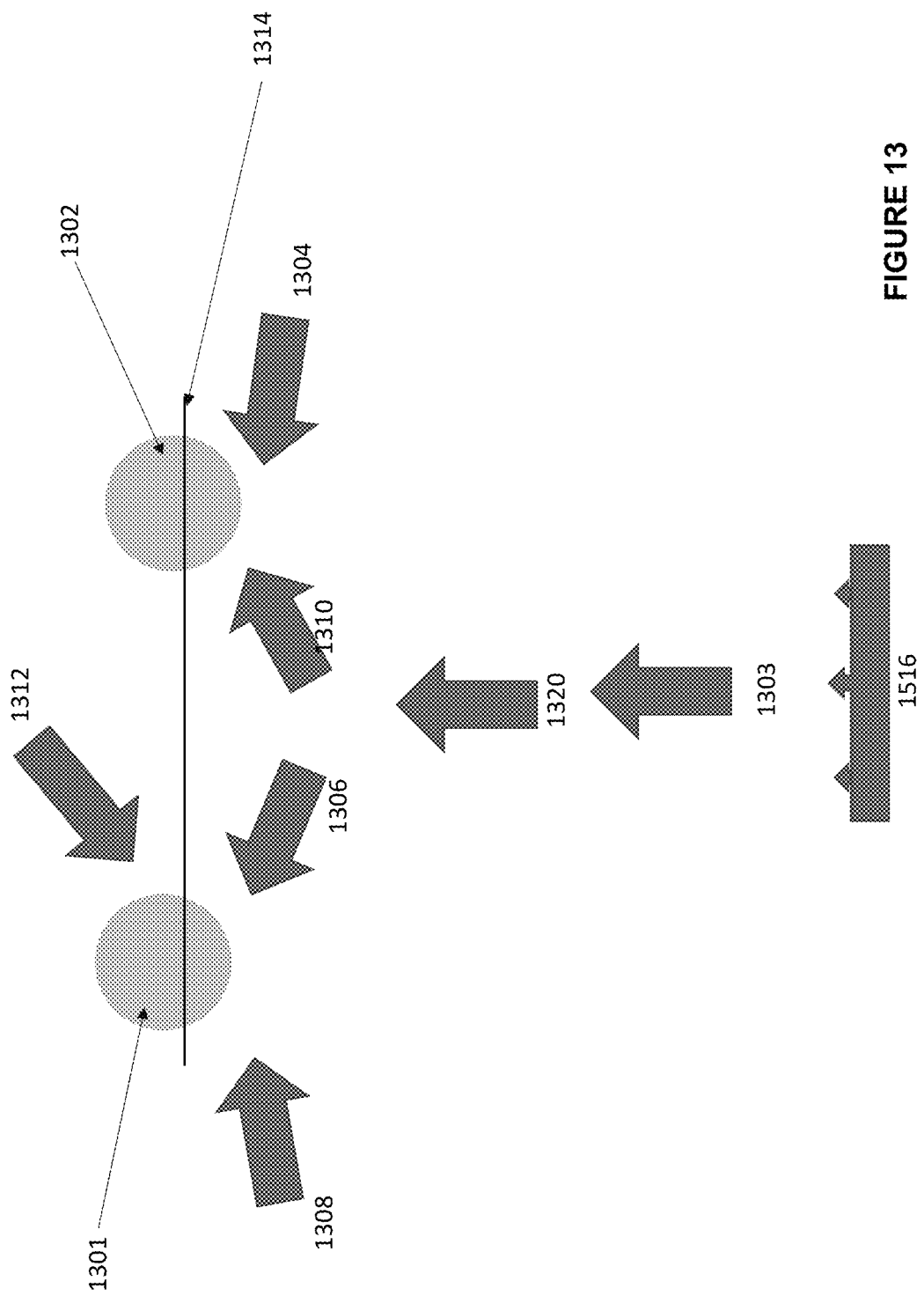
FIG. 13 is an illustration showing an example of a line of action and camera positions in 2 person coverage.
Figure 15:
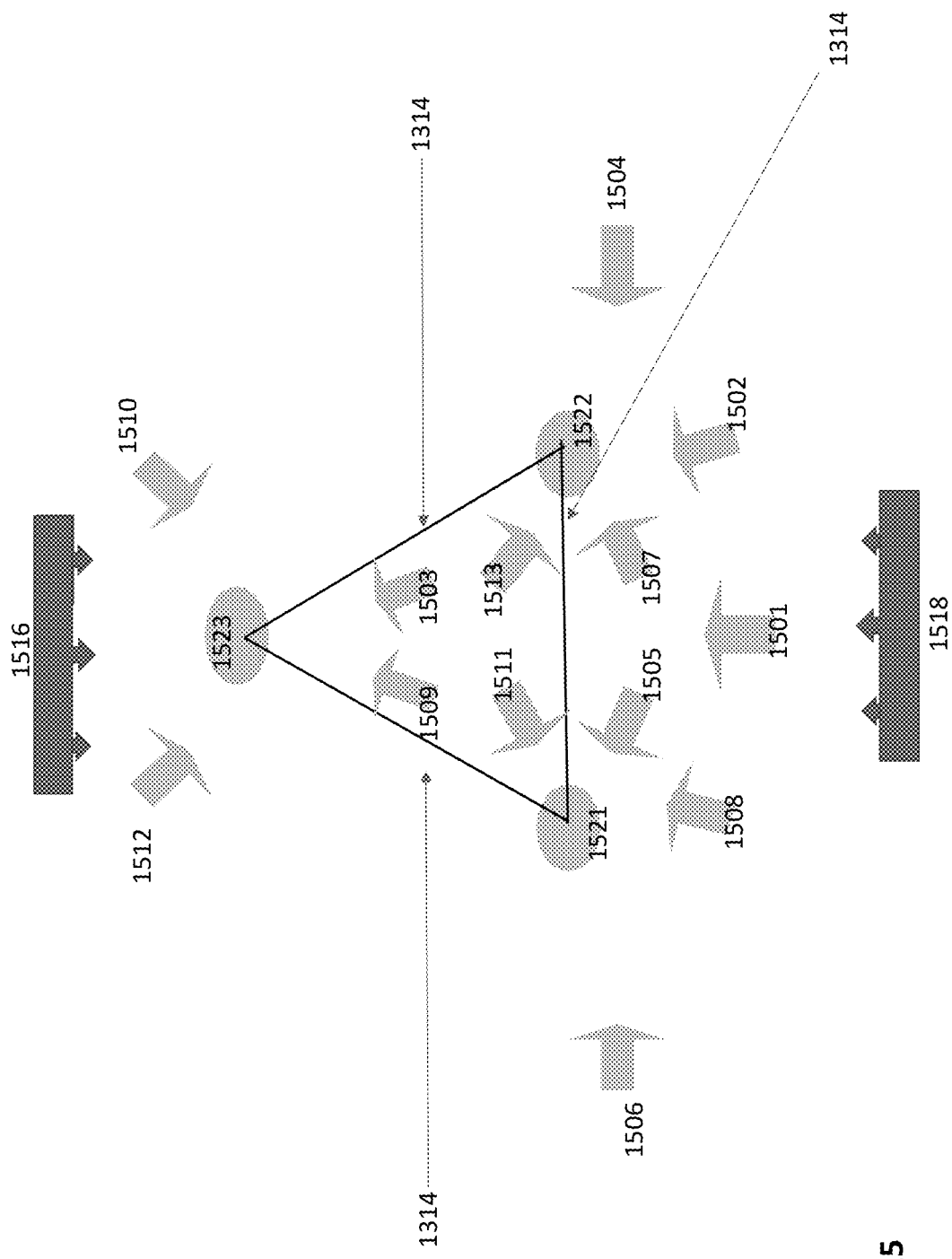
FIG. 15 is an illustration showing an example of 3 person derivative coverage schemes in accordance with example embodiments.
Figure 44D:
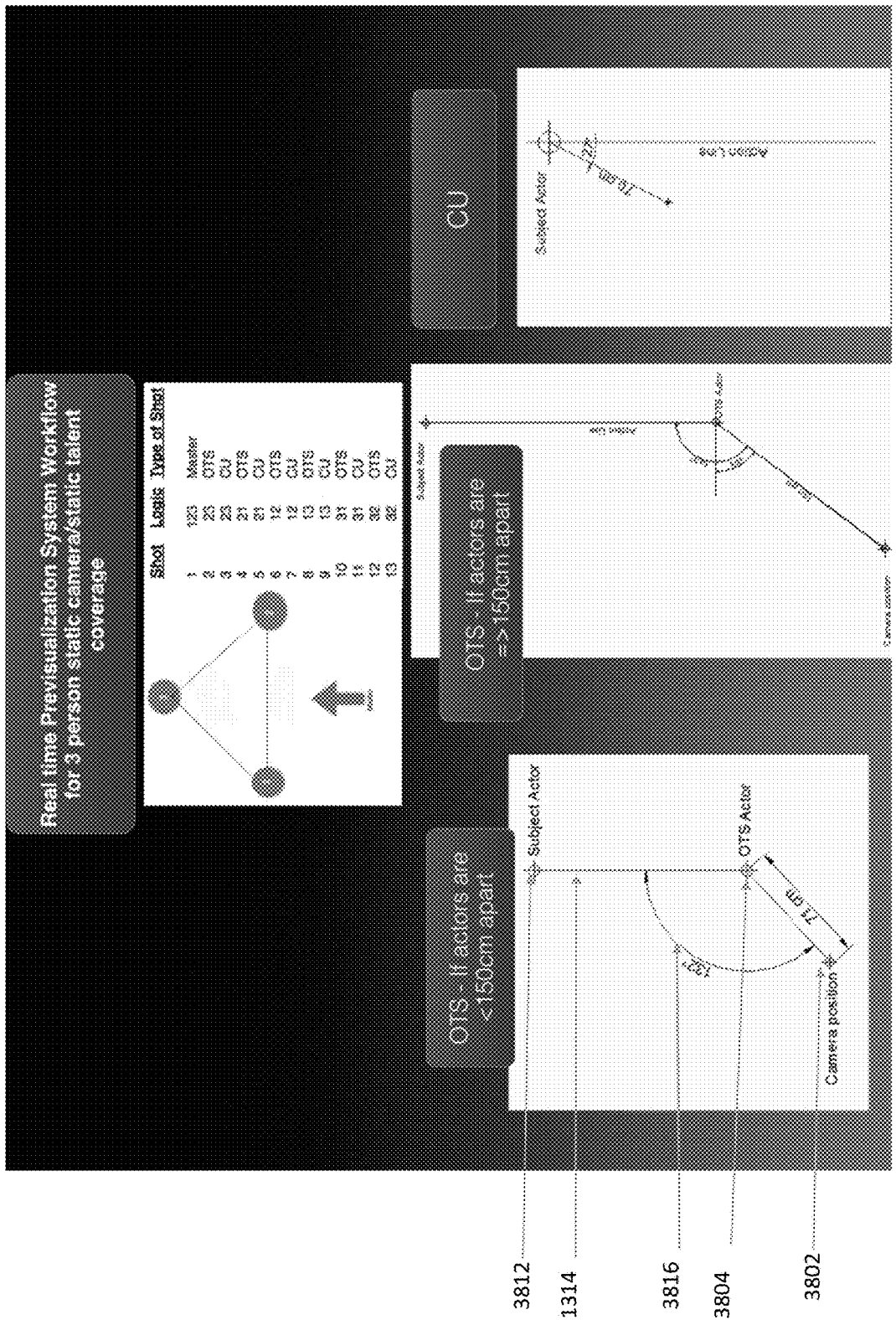
FIG. 44D shows an example previsualization workflow of 13 shots in a static camera, static subject coverage scheme and the related angles used to determine camera rotation for over-the-shoulder (OTS) 2 shots and close-ups (CU) in accordance with example embodiments.
Figure 44E:
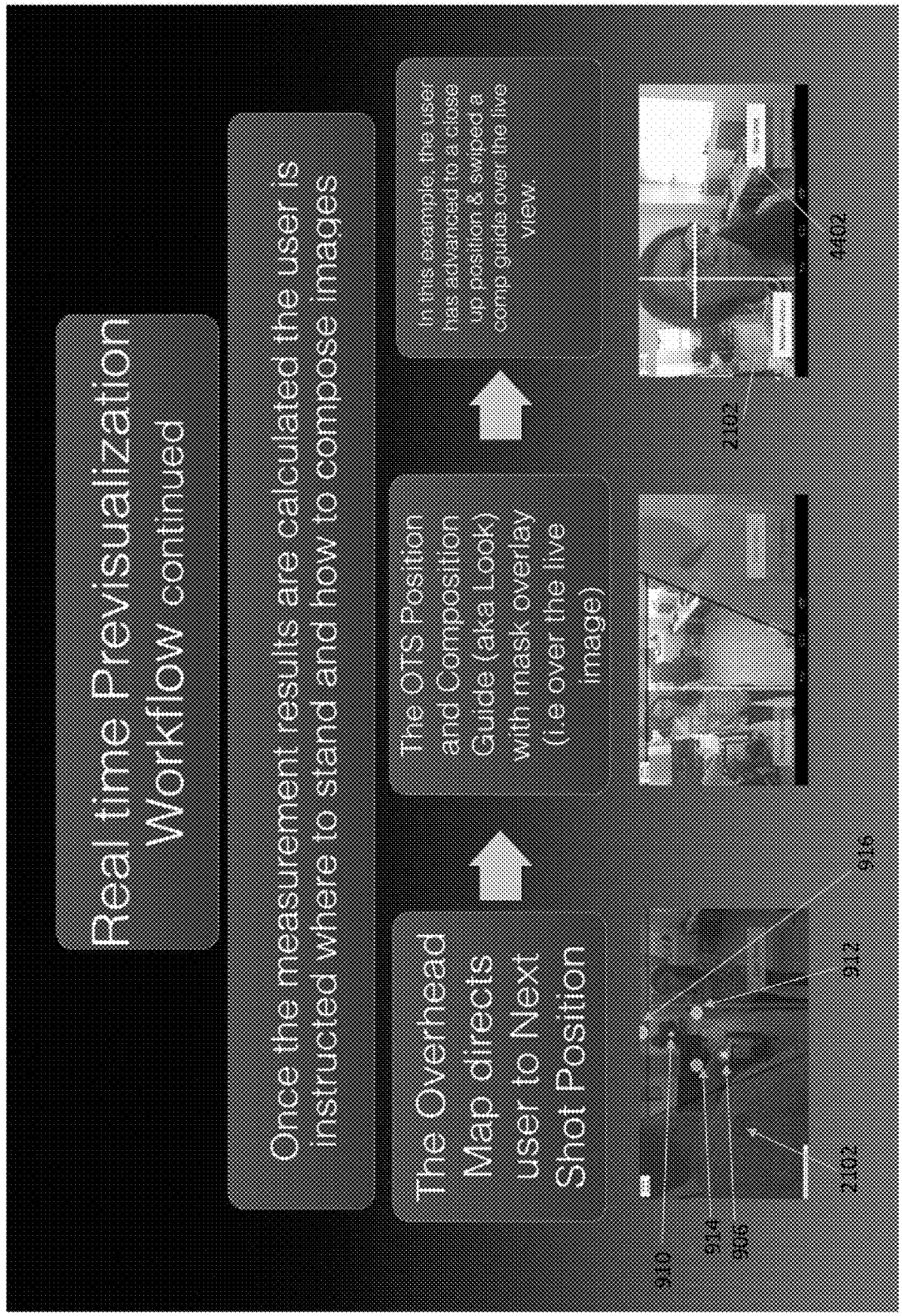
FIG. 44E shows an example previsualization workflow from the user's perspective, with respect to the real time overhead map and related composition guides in accordance with example embodiments.

As shown in FIG. 44E, in accordance with example embodiments, once a user has saved their first shot or any follow up shot, the user is shown the next shot position, which is the location of the next camera position in the sequence, as well as the follow up shot position, which is the camera position following the next camera position. In accordance with example embodiments, the mobile camera system 400 uses its one or more sensors to determine when the camera of the mobile camera system 400 is at a camera position. As shown in FIG. 44E, in accordance with example embodiments, the next shot camera position icon 906 and the smaller follow up shot position icon 910 are blue, the numbered subject position icons 912, 914, 916 (which identify tagged subject positions on the overhead map 3424) are yellow circles with red numerals inset, the subject tags 2102 are red tapered balloons and the skip shot button 4402 (to skip a recommended shot) appears on the touch screen. In accordance with example embodiments, as depicted in FIGS. 13 and 15, the user may access one or more master schematics of the coverage scheme before, during or after recording from a menu of coverage schemes. In accordance with example embodiments, master schematics illustrate one or more of set designs, all camera and lighting positions, and offer example subject positions and example subject or example camera moves, so the user has full perspective.

In accordance with example embodiments, when the system's auto-master shot position functionality is engaged, the overhead map 3424 appears after the set is scanned and the subjects tagged, but before the master shot 1906 is recorded. The overhead map 3424 displays a master shot position 1906 icon to direct the user to advance to a line of action friendly master shot 1906 position.

In accordance with example embodiments, once the user has advanced to the auto-generated master shot 1906 position, they can access a master shot 1906 composition guide 1102 to help them frame their shot before recording.

In accordance with example embodiments, the previsualization system recommends more than one master shot 1906 position. In these instances, before recording their master shot 1906, the user is presented an overhead map 3424 with more than one master shot 1906 position icon. These recommended master shot 1906 positions may appear at different angles, different elevations and/or different distances to the tagged subjects. In accordance with example embodiments, the user advances to one of the master shot 1906 positions to record.

In accordance with example embodiments, the user can follow the guidance and advance to the next shot position to shoot out the recommended coverage.

As shown in FIG. 9, in accordance with example embodiments, the next shot position icon 906 is reviewable on the map 3424 which automatically appears over the live view on the mobile camera system's 400 display 700. In accordance with example embodiments, the map 3424 can be swiped over the live view by the user on the mobile camera system's 400 display 700.

In accordance with example embodiments, the map 3424 augments the live image on the mobile camera system's 400 display 700. In accordance with example embodiments, the map 3424 is translucent and appears over the live view.

In accordance with example embodiments, the first numbered tag 2102 and second numbered tag 2104 are shown on the map 3424 to identify the positions of tagged subjects that are visible in the mobile camera system's 400 live view. For tagged subjects that are not currently visible in the live view, these off-camera tags remain active and the numbered tags 2102, 2104 become visible when the tagged subjects are brought back into the live view.

In accordance with example embodiments, as shown in FIG. 34, subject position icons 912, 914 and 916 identify the position of the tagged subjects on set relative to the current camera position icon 904, master shot 1906 position icon 908, next shot position icon 906, and follow up shot position icon 910 in the map 3424.

In accordance with example embodiments, the derivative camera positions are fixed in relation to the position of the subjects' tagged positions, while the camera, because it is motion tracked, can be moved or placed anywhere within the scanned set. In accordance with example embodiments, the user can see changes in the camera's live position identified by the current camera position icon 904, in real time, on the map 3424.

In accordance with the example embodiments, the size of the map 3424 as well as all independent graphics can be manually adjusted during production, either contracted or expanded, on the live view.

Figure 30:
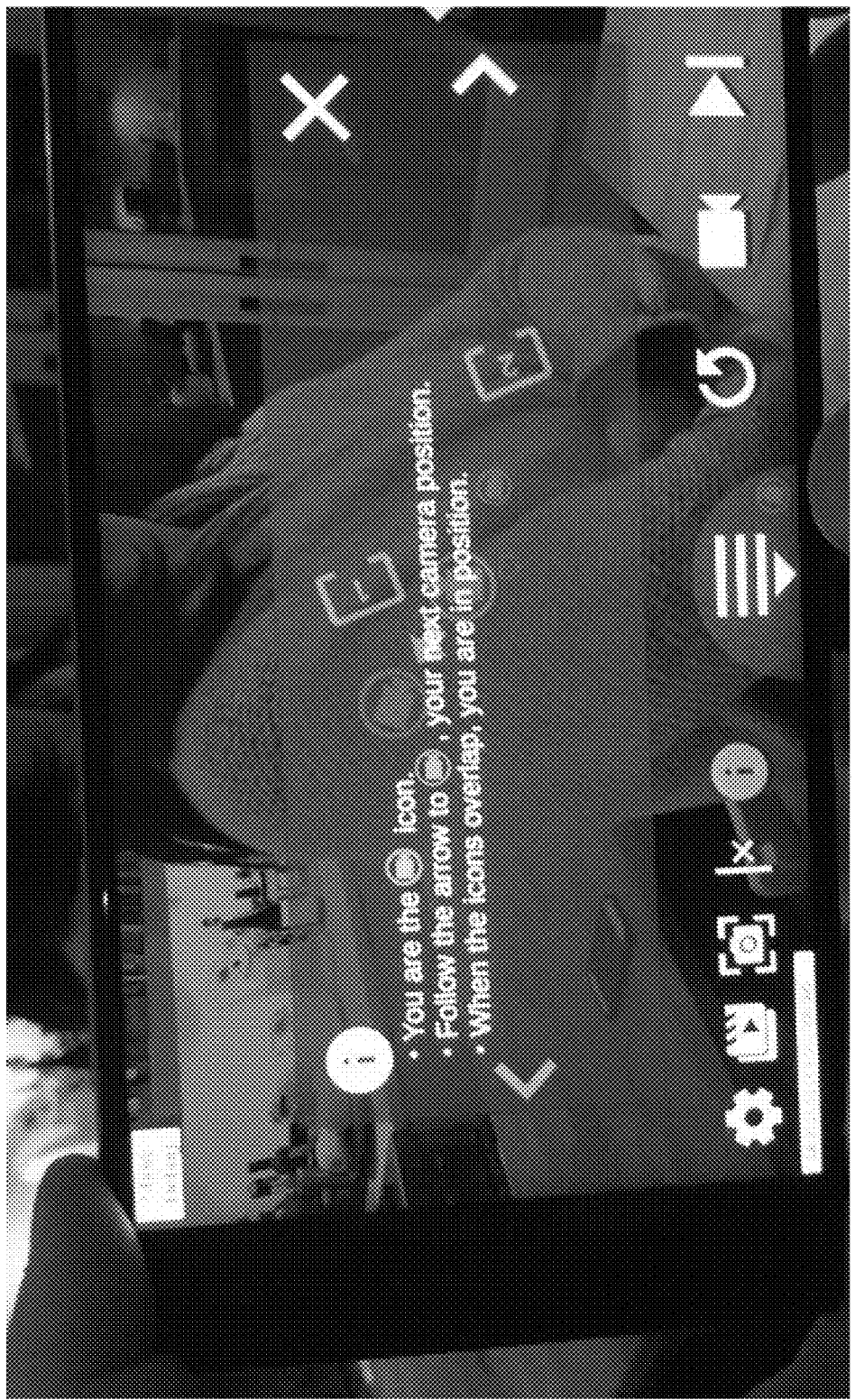
FIG. 30 is a picture of a help screen that informs the user how to read the overhead map in accordance with example embodiments.

As shown in FIG. 30, in accordance with example embodiments, the user is prompted to use the map 3424 as a guide as the user moves to the next shot position after recording a shot. As shown in FIG. 9, in accordance with example embodiments, the map 3424 shows the user their current position using the current camera position icon 904.

Figure 10:
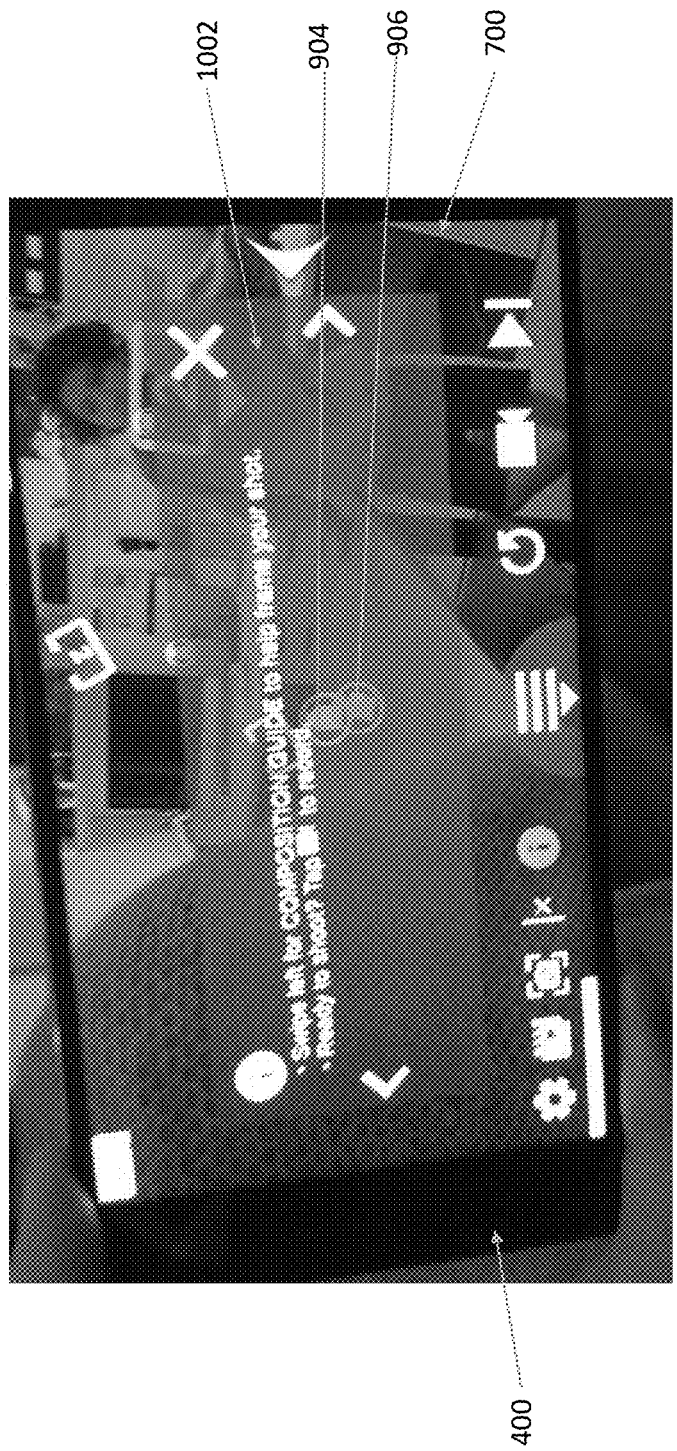
FIG. 10 is a picture of an over-the-shoulder shot user interface in accordance with example embodiments.

As shown in FIG. 9, in accordance with example embodiments, in addition to the current camera position icon 904 and the next shot camera position icon 906, two other camera positions may be shown on the map 3424: the master shot 1906 position icon 908 and the follow up position icon 910, which represents the location of the shot after the next shot. In accordance with example embodiments, a dynamic compass arrow 902 is tethered to the current camera position icon 904. The dynamic compass arrow 902 stays fixed on the next shot position and guides the user to the next shot position after each saved shot 2302. In accordance with example embodiments, the user is prompted to follow the dynamic compass arrow 902. As shown in FIG. 10, when the current camera position icon 904 overlaps the next shot position icon 906, the user is in position to shoot and the dynamic compass arrow 902 disappears.

In FIG. 9, in accordance with example embodiments, the map 3424 has a current camera position icon 904 (which is also the user's position) in green; a next shot position icon 906 in blue; a follow up shot position icon 910, whose icon can be sized smaller than the next shot position icon 906, in blue; a master shot 1906 position icon 908, in red; subject position icons 912, 914, in white; numbered tags 2102, in off-white; and a dynamic compass arrow 902 in white.

In accordance with example embodiments, after a user has moved to a new camera position and created a saved shot 2302, an updated version of the map 3424 is automatically produced which shows the master shot 1906 position icon 908, the next shot position icon 906, and the follow-up shot position icon 910 for the shot after the next shot position, as shown in FIGS. 9 and 10, which depict the user travelling to the next shot position. As depicted in FIG. 9, in accordance with example embodiments, the map 3424 features subject position icons 912 and 914, which represent the positions of tagged subjects. In the example of a 2 person static camera, static subject scene as shown in FIG. 9, the first subject position icon 912 and the second subject position icon 914 are both visible on the map 3424, but only the first numbered tag 2102 is visible since only the first actor 1902 is visible in the live view, which is set up for a close-up.

Figure 25B:
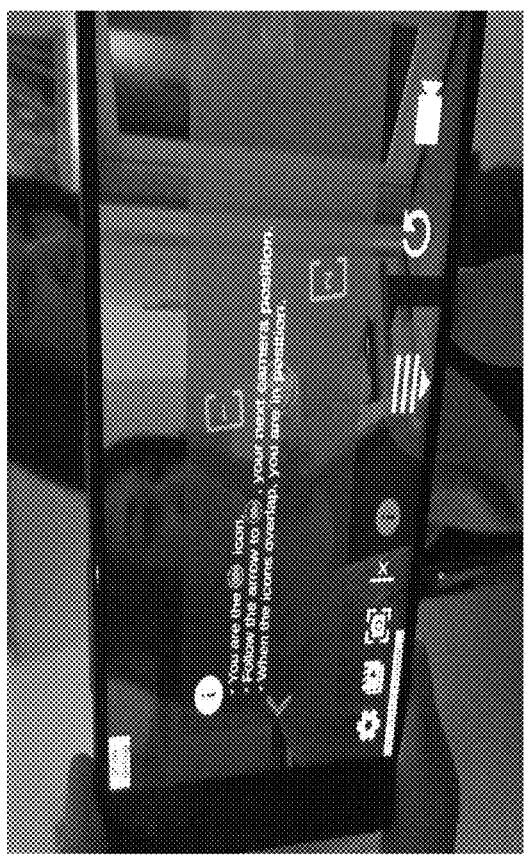
FIGS. 25A, 25B, 25C, 25D are pictures depicting guidance being provided by the user interface during the re-take of a shot in accordance with example embodiments.
Figure 25A:
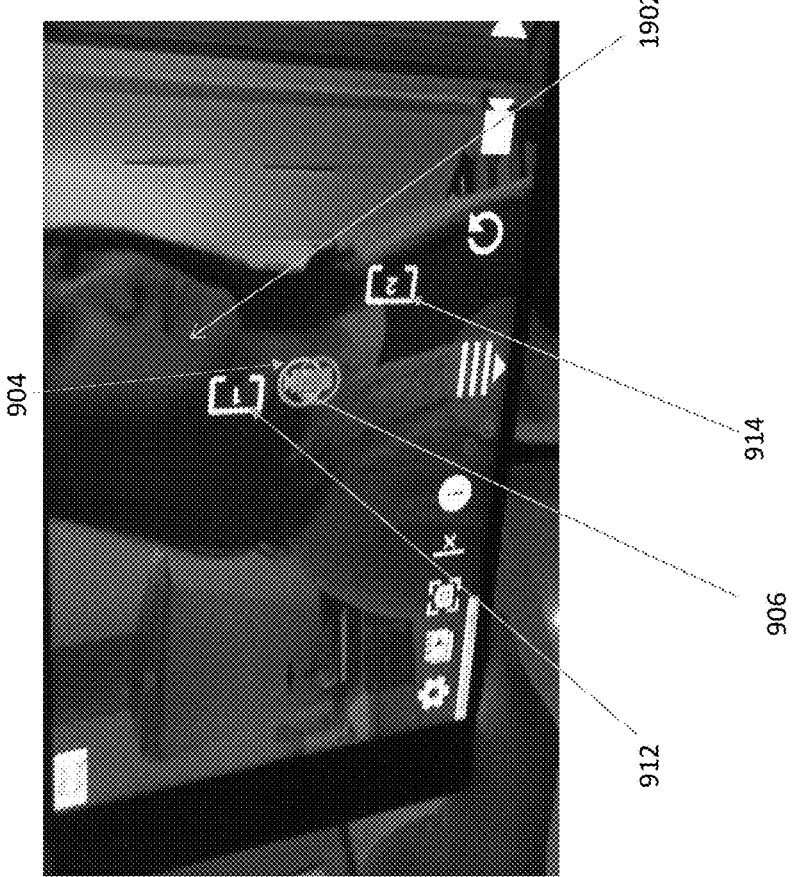

In accordance with example embodiments, the distance of the mobile camera system 400 to the tagged on-camera subjects may affect the live view of the map 3424. In accordance with example embodiments, as depicted in FIG. 25A, the live view features the first actor 1902 in close-up while the map 3424 features two subject position icons 912, 914, the current camera position icon 904 and the next shot camera position icon 906. The previously registered master shot 1906 position icon 908 or the follow up shot position icon 910 are not currently visible on the map 3424. In accordance with example embodiments, an icon such as the next shot position icon 906 on the map 3424 may be wholly or partially obscured because the map 3424 has been manually zoomed in or because of a change in the mobile camera's proximity to a tagged on-camera subject. In accordance with example embodiments, unseen icons such as the master shot 1906 position icon 908 or the next shot position icon 906 may become visible on the map 3424 if the user zooms out the map 3424 by, for example, advancing in the direction recommended by the dynamic compass arrow 902, physically moving the mobile camera further away from the tagged subject(s), or manually zooming out the map 3424 using the mobile camera systems' 400 display 700. Alternatively, the user may manually zoom in the map 3424 using the mobile camera systems' 400 display 700 which may cause an icon on the map 3424 to move outside of the frame of the visible portion of the map 3424.

In accordance with example embodiments, in addition to helping guide users from shot to shot, the map 3424 can assist users in correcting their position before recording in the event they moved off the next shot position.

In accordance with example embodiments, coverage schemes may be provided for different combinations, for example static camera, static subject, where both the subjects and camera are stationary; static subject, dynamic camera, where the camera moves but the tagged on-screen subjects are stationary; static camera, dynamic subject, where the camera remains in a fixed position but at least one of the tagged on-screen subjects moves; and dynamic camera, dynamic subject, where both the camera and tagged on-screen subjects are moving.

In accordance with example embodiments, the previsualization system allows on-screen subjects to exit and re-enter the live-view offered by the lens (native or attached) of the mobile camera system 400, or enter the live view and move to a recommended position. In accordance with the example embodiments, before the user records the shot, the user marks the floor with positional markers based on the positional recommendations made by the system, in order for the actor to know where to exit to, enter from and/or where to land, in a manner that would edit with follow up shot recommendations.

In accordance with example embodiments, coverage schemes may include a recommendation for a dynamic camera. In accordance with example embodiments, coverage schemes may include moving subjects.

In accordance with example embodiments, in coverage schemes where a subject is moving but the camera is static, during set up, multiple tags are required to chart the subject pathway while the designated static camera positions, which are a function of the subject pathway, are highlighted along the subject pathway. In coverage schemes where the subjects are static but the camera is dynamic (static subject, dynamic camera functionality), each subject is marked by one tag while the recommended camera move is based on a camera pathway that allows the user to record the tagged static subjects while the camera is in motion.

In accordance with example embodiments, in static subject, dynamic camera functionality, the dynamic camera pathway is a straight or curved line, which is based on the tagged positions of the subjects and includes a master shot 1906 camera pathway and derivative camera pathways that are based on the master shot 1906 camera pathway. In accordance with example embodiments, static subject, dynamic camera recommendations include a master shot 1906 camera pathway which is set by the user and a derivative next shot camera pathway and a follow-up shot position pathway. In accordance with example embodiments, the user sets the master shot 1906 position, which is their starting point for the camera move, then advances to and sets a final or target camera position. In accordance with example embodiments, the master shot 1906 camera pathway—which is set by the user—appears on the map 3424. In accordance with example embodiments, derivative camera pathways of the master shot 1906 camera pathway, which are closer to the tagged subjects, are generated in a manner that allows for derivative medium shot and close-up compositions of the recommended master shot 1906 camera pathway composition.

Figure 11:
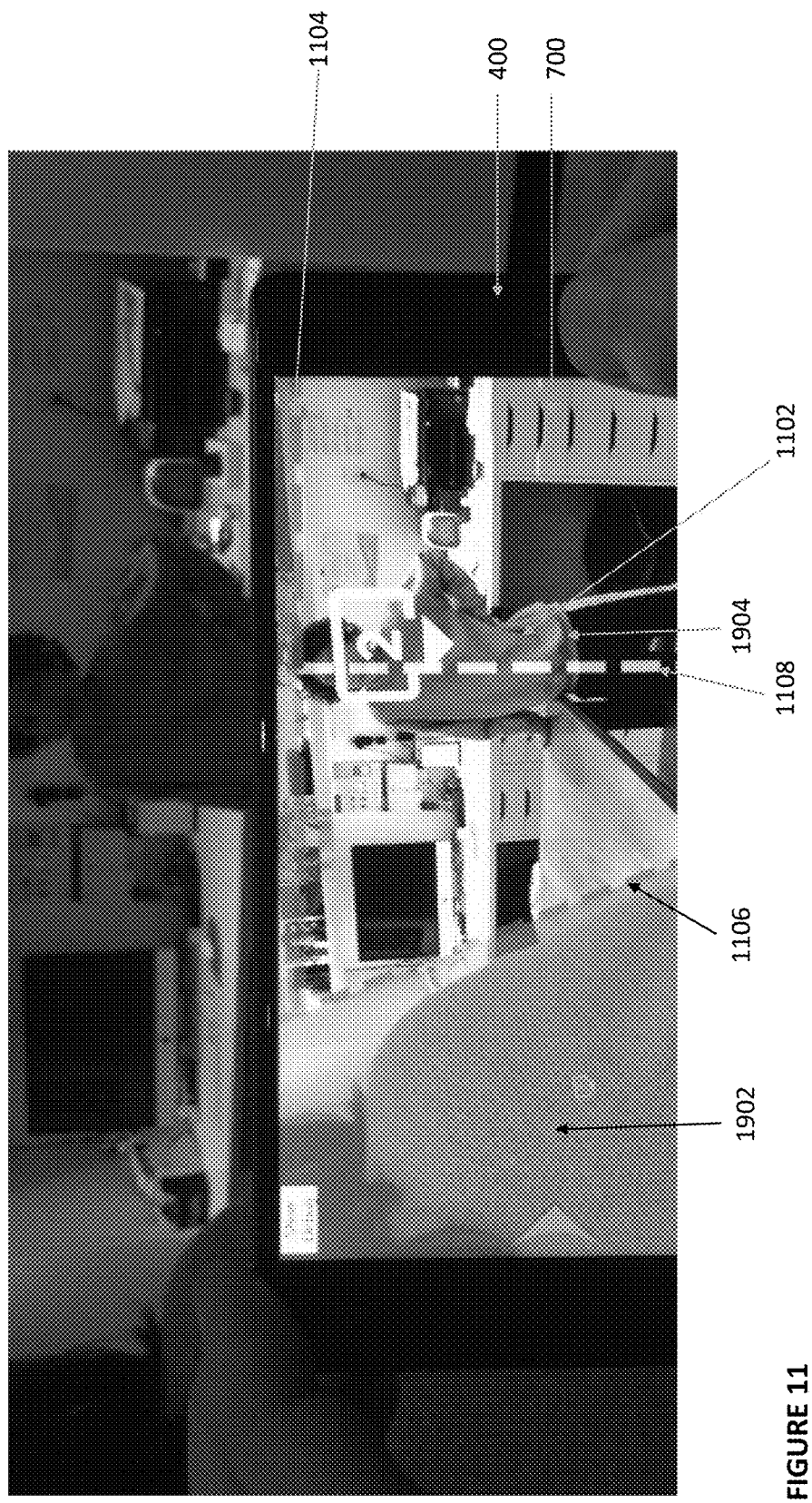
FIG. 11 is a picture of an over-the-shoulder shot composition guide in accordance with example embodiments.
Figure 22:
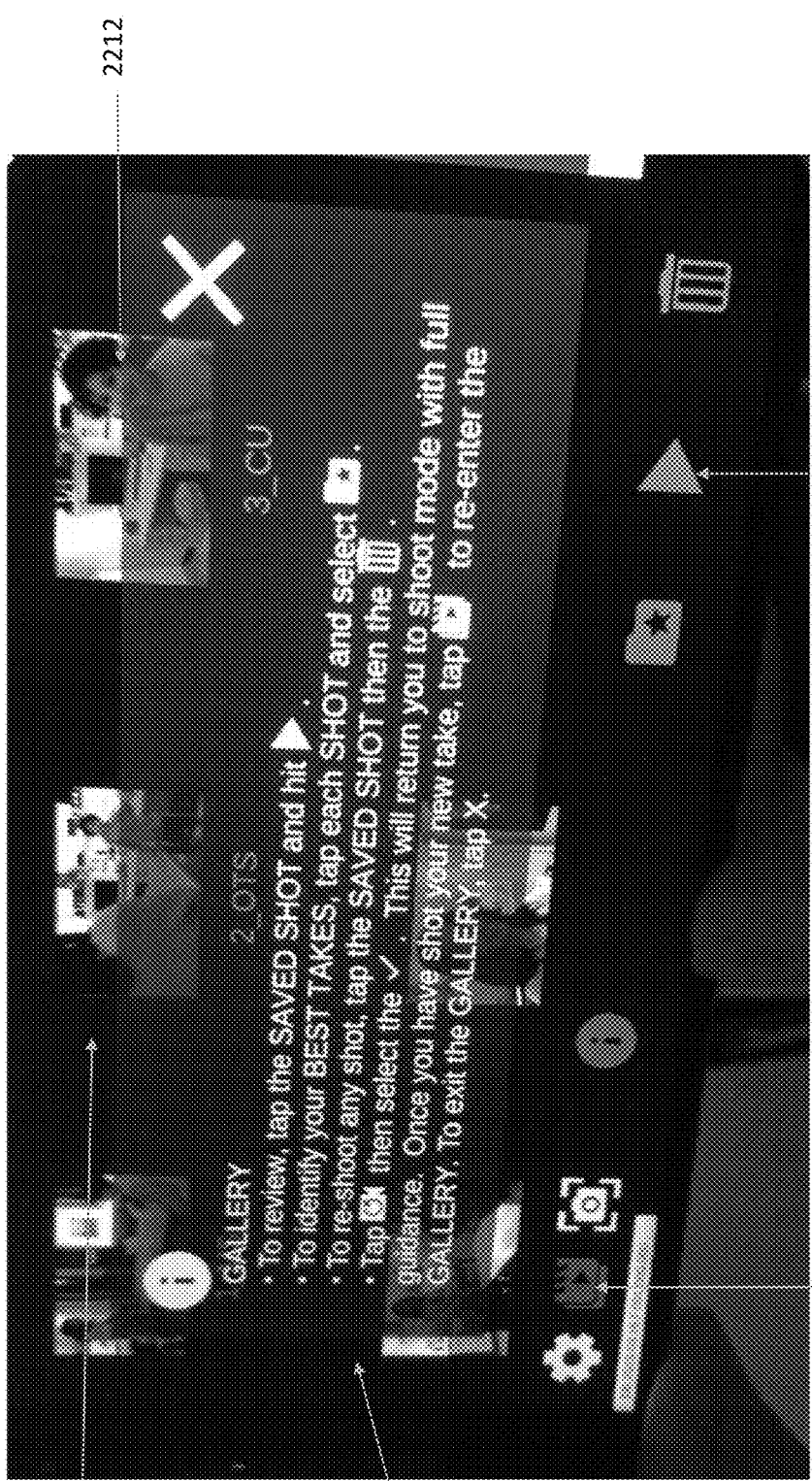
FIG. 22 is a picture depicting a user interface showing a gallery of recorded shots and a help screen that informs the user how to replace one of the recorded shots in accordance with example embodiments.

In accordance with example embodiments, a dynamic camera pathway may be derivative of a static camera position, for example the camera position that captures an over-the-shoulder 2 shot as depicted in FIG. 11. In this example, the camera pathway is deployed as a ramp to the next shot camera position to heighten the expression of the subject in the derivative close-up 2212 (of the teenager) as shown in FIG. 22.

In accordance with example embodiments, the static subject, dynamic camera functionality is achieved by the user using the free shot functionality.

In accordance with example embodiments, free shot functionality allows the user to manually insert one or more camera positions, static or dynamic, into a set coverage scheme and record it. In accordance with example embodiments, these additional camera positions may appear as yellow on the map 3424. In accordance with example embodiments, the additional camera positions are added using a touchscreen of the mobile camera system 400. In accordance with example embodiments, the other camera positions are adjusted based on the manually inserted camera positions. In accordance with example embodiments, camera positions that would be unnecessary or duplicative of the manually inserted camera positions are removed from the coverage scheme.

In accordance with example embodiments, the dynamic recommendations that guide the user to a target position, in some instances selected by the free shot functionality, appear, in part, as dynamic compass arrows 902, lines, running lights or breadcrumbs on the overhead map 3424 that the user is prompted to follow like a roadmap. In accordance with example embodiments, a dynamic graphic may be dragged by the user onto the map 3424 to connect one or more camera positions or one or more subject positions to reflect the movements they plan to use or record. In accordance with example embodiments, these graphics may include a sample animation of a move as reference for the user.

In accordance with example embodiments, in coverage schemes with moving subjects, the subject position consists of a path for the subject to follow during the scene. In accordance with example embodiments, instead of a single subject position tag, a subject pathway is created by the user tagging each subject at various points along a designated route for the shot, creating a subject pathway made up of multiple subject positions, each of which is recorded in the virtual set.

In accordance with example embodiments, in coverage schemes where dynamic camera moves are recommended to capture moving subjects, the designated subject pathway may be created via multiple tags being made at various distances between the starting point of the subject and the final target position of the subject. In accordance with example embodiments, in coverage involving dynamic subjects, one or more dynamic subjects are tagged multiple times, in different positions on the scanned environment, during set up to produce a set of x and y co-ordinates of a subject pathway, which becomes the basis for the previsualization system calculating, outputting and transposing the subject pathway into a companion set of x and y co-ordinates, which represents the camera pathway, which the user travels as a means of recording moving or static subjects. In accordance with example embodiments, augmented reality toolsets such as Apple™ ARKit™ may recognize and generate x, y and z co-ordinates for either the dynamic camera pathway or the dynamic subject pathway.

In accordance with example embodiments, dynamic camera guidance captures dynamic or static subjects, at various speeds, angles and distances from the subjects, in a manner that allows for wide shot coverage, medium shot coverage, close-up coverage and related compositional guidance. In accordance with example embodiments, the dynamic camera guidance is seen as a dynamic overlay on top of the live image.

In accordance with example embodiments, derivative pathways for the camera to capture subjects travelling along a charted subject pathway are generated. In accordance with example embodiments, the subject travels along the subject pathway while the user records from a recommended distance and angle at a complimentary speed, which is referred to as the camera pathway. In accordance with example embodiments, once the subject pathway has been established, camera pathways are outputted which are derivative of the subject pathway, which is set by the user during rehearsal. In accordance with example embodiments, in sequences where dynamic camera moves are recommended, a camera pathway is shown on the mobile camera systems' 400 display 700 instead of the next shot position icon 906.

In accordance with example embodiments, camera pathways include a main hero or master shot 1906 camera pathway as well as derivate pathways that feature and allow for variance in composition, rotation and relative distance of the camera to the dynamic subject.

In accordance with example embodiments, the user may engage the skip shot functionality as a means of skipping (e.g. not recording) one or more of the camera pathway or subject pathway recommendations made by the system.

In accordance with example embodiments, the camera position in a dynamic camera shot consists of a recommended path for the camera to follow during a scene. In accordance with example embodiments, the camera pathway is shown on the mobile camera systems' 400 display 700 as virtual breadcrumbs which the user follows from start to finish when filming. In accordance with example embodiments, the camera pathway offers visual guidance with respect to camera position, direction, angle, distance and speed. In accordance with example embodiments, the camera pathway is set in relation to the subject pathway. In accordance with example embodiments, the camera pathway may run parallel or perpendicular to the subject pathway, intersect or overlap the subject pathway, or run at any angle to the subject pathway, whether this subject pathway is curved or straight, provided the subject can be seen in the mobile camera systems' 400 viewfinder. In accordance with example embodiments, in the case of dynamic coverage that represents the moving point of view of a subject in motion, the camera pathway may be identical to the subject pathway. In accordance with example embodiments, dynamic camera pathways may augment static camera, static subject coverage, by emanating from a static camera position and/or leading to a static camera position, in a manner that is derivative of a master shot 1906 position or any other derivative camera position. In accordance with example embodiments, dynamic subject pathways may augment a static camera, static subject coverage, by emanating from a tagged subject position and leading to another tagged subject position.

In accordance with example embodiments, camera pathways are determined by an algorithm which outputs a derivative set of x and y co-ordinates and a related rate of change or speed for the camera to travel its length, based on the charted x and y co-ordinates of the subject pathway, the slope of the line created by these co-ordinates and the rate of change or speed travelled by the subject along the pathway established or designated during set up. In accordance with example embodiments, the current camera position icon 904, which reflects the user's current position, is prompted to travel the camera pathway. In accordance with example embodiments, in schemes where dynamic coverage is featured, the pathway of camera positions, the virtual breadcrumbs, is shown on the map 3424. In accordance with example embodiments each tagged or marked subject pathway position is time stamped during rehearsal so that different user speeds and related visual guidance can be recommended while shooting along the camera pathway. In accordance with example embodiments, the breadcrumbs for the camera pathway are based on speed and measurement sets which recommend positional options and speeds so the user can record from a variety of angles and distances from the subjects, while traveling at a recommended speed.

In accordance with example embodiments, two mathematical functions help define the pathways. One function converts the breadcrumbs, for example two or more tags, into a continuous line—a tag line or subject pathway. A second function transposes the subject line into another line, which is the camera pathway, which is a set of x and y co-ordinates, or a set of x, y and z co-ordinates, that are derivative of the subject line. In both cases, the charted co-ordinates may be linear, parabolic or exponential, such that the recommendations accommodate the camera moving with the subjects being static, one or more subjects moving with the camera being static, one or more subject(s) and camera moving in parallel, similar and/or different directions while moving at similar, different and/or changing velocities, which, by nature of the subject/camera relationship, are always relative. In accordance with the example embodiments, in dynamic subject, dynamic camera functionality, the subject pathway may be marked by a set of x and y co-ordinates, or x, y and z co-ordinates, achieved by multiple tagging, while the camera pathway is a function of these co-ordinates, such that they define the co-ordinates of the camera, whether linear, parabolic or exponential.

In accordance with example embodiments, directional arrows are used to visually describe dynamic coverage schemes as a means of indicating subject and/or camera roadmaps to ensure users and subjects start from, travel to and land in designated and complimentary positions where compositions and angles recommended by the composition guides 1102 can be fulfilled.

In accordance with example embodiments, both static and dynamic functionalities serve either unscripted or scripted coverage schemes, which may be unlocked or downloaded. In accordance with example embodiments, unscripted coverage schemes feature positional and compositional guidance for unscripted interior or exterior scenes, such as a basketball game or graduation, either with or without actors or other subjects. In accordance with example embodiments, scripted coverage schemes feature similar guidance and functionality but in service of genre based, fictional screenplays. In accordance with example embodiments, these scripted coverage schemes lead users through scripted material with specific lighting, positional and compositional guidance that may serve specific set designs. In accordance with sample embodiments, these screenplays have been written in a manner that allow the user to shoot spin off scenes that are directly related to the scripted content. In accordance with example embodiments, unscripted coverage schemes for documentary style or live events feature lighting, positional and compositional guidance in service of outlines that describe proper interview technique, fly-on-the-wall coverage and controlled B roll coverage.

In accordance with example embodiments, in coverage schemes where dynamic camera and/or dynamic subject guidance is automatically recommended, preset dynamic pathways are summoned from the system's memory. In accordance with example embodiments, master shot 1906 dynamic recommendations appear on the overhead map 3424 which the user uses as a dynamic positional guide during rehearsal before enacting the dynamic tagging protocol. In accordance with example embodiments, the dynamic tagging protocol may be modified for dynamic guidance that is automatically generated.

As shown in FIGS. 10 and 11 in accordance with example embodiments, when providing static camera guidance, once the user arrives at the next shot position, they can swipe a composition guide 1102 over the live view to help frame the shot before recording, as shown in FIG. 11 and described by the help screen 1002 shown in FIG. 10. For example, if the user has framed a wide master shot 1906, where 2 on-screen subjects are seen in the same wide frame as depicted in FIG. 19B, a coverage scheme with recommendations may be generated, consisting of 2 camera positions and 2 composition guides 1102 for derivative over-the-shoulder 2 shots, and 2 camera positions and 2 composition guides 1102 for derivative single character close-ups.

In accordance with example embodiments, the composition guides 1102 are saved in and retrieved from the mobile camera systems' 400 memory. In accordance with example embodiments, the next shot position will guide the user to one of the camera positions and the user will select a composition guide 1102 for the next shot position. In accordance with example embodiments, one or more of the composition guides 1102 and are retrieved from memory based on the current camera position. In accordance with example embodiments, rather than having the user select which composition to shoot next, the user will automatically be guided to shoot one of the compositions once they are in the next shot position.

As depicted in FIG. 11, in accordance with example embodiments, once a user is in the next shot position, the user can swipe left on the display 700 of the mobile camera system 400 to draw the composition guide 1102 over the live view. In accordance with example embodiments, the composition guide 1102, which replaces the map 3424, appears as graphic overlays on top of the live view.

In accordance with example embodiments, composition guides 1102 are registered to the camera positions or camera pathways. As shown in FIG. 33B, in accordance with example embodiments, the user is provided with a menu 3308 of composition guides 1102 for the camera position or pathway. In accordance with example embodiments, composition guides 1102 may be stored in the memory of the mobile camera system 400 or can be stored in cloud based memory which is accessed by the mobile camera system 400.

As shown in FIGS. 10, 11, 31, 32, and 33A and 33B, in accordance with example embodiments, the composition guides 1102 are graphic templates that provide visual guidance based on the rule of thirds, accounting for the aspect ratio or ratios offered by the mobile camera system 400 camera, the live view of the mobile camera system's 400 lens, whether fixed or attached, and in some cases the aspect ratios of existing footage. In accordance with example embodiments, the line based templates of the composition guides 1102, which are graphic overlays designed to augment the live image, allow the user to adjust their frame so that the featured on-camera subjects are properly positioned.

Figure 32:
FIGS. 31 and 32 are pictures showing a user shooting an over-the-shoulder 2 shot as per the recommendations in FIGS. 10 and 11, in accordance with example embodiments.
Figure 31:

In FIG. 31, the user is shown setting up for an "over-the-shoulder" 2 shot in accordance with example embodiments. In accordance with example embodiments, FIG. 11 shows how the user has swiped an "over-the-shoulder 2 shot" composition guide 1102 over the live view and adjusted their position so the subjects are framed properly, and FIG. 32 shows the user about to record the same shot using the mobile camera system's 400 camera.

In accordance with example embodiments, FIG. 11 shows how the second actor 1904, who is facing the mobile camera system's 400 camera, has been lined up such that his body is bi-sected by a vertical line 1108 that correctly positions him on the right third of the frame in accordance with the rule of thirds. In accordance with example embodiments, FIG. 11 shows the top of the second actor's 1904 head has been positioned to touch but not exceed a designated top line 1104, as per the fundamental tenets of proper 2 shot composition as defined by the rule of thirds. In accordance with example embodiments, in FIG. 11, the position of the first actor 1902 in the foreground whose right shoulder has been positioned to fill the left third of the same frame, is guided by a diagonal line 1106 which helps ensure proper physical positioning for the 'over-the-shoulder' element of this two shot.

Figure 33A:
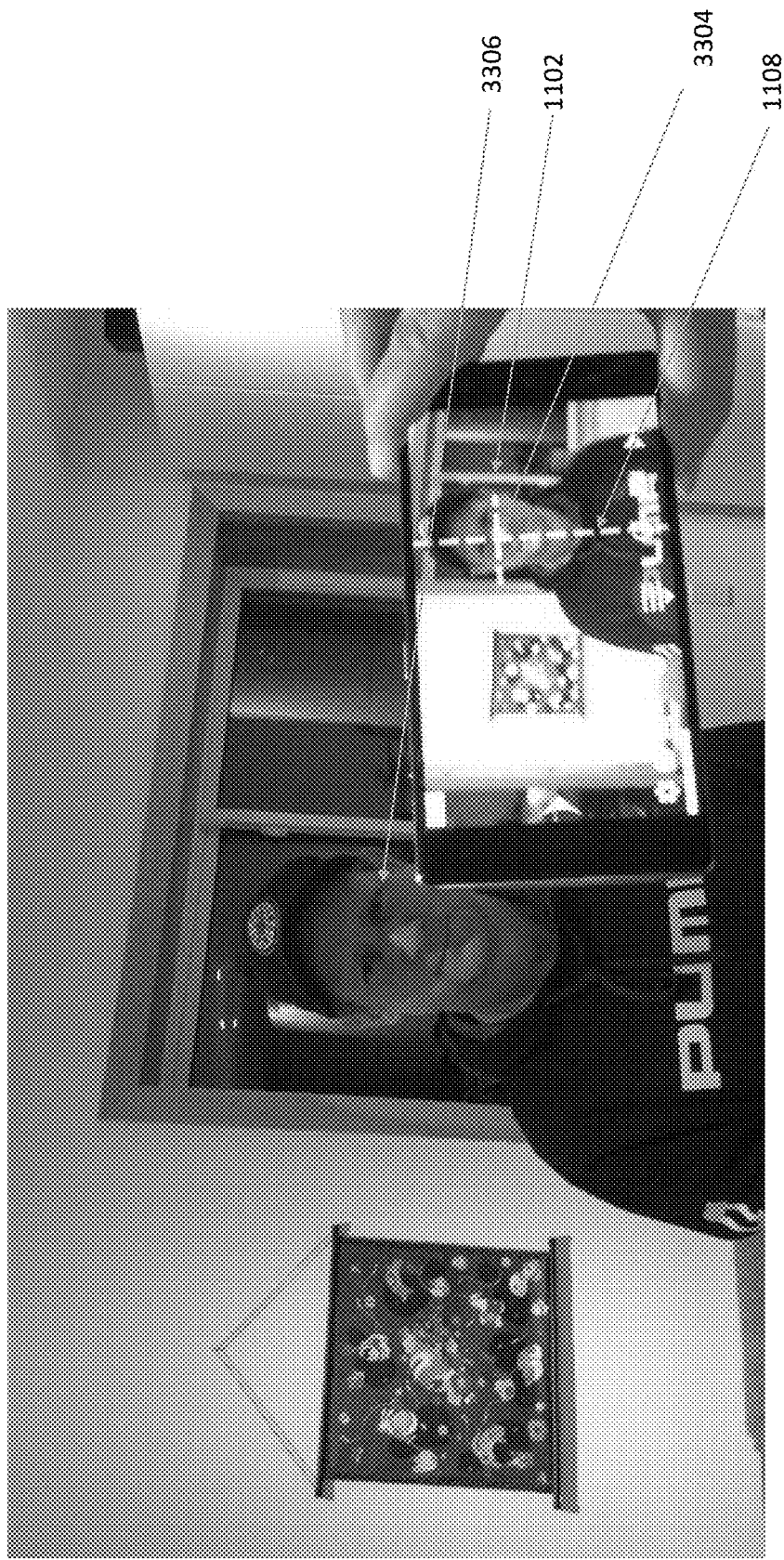
FIG. 33A is a picture showing an example of a close-up composition guide in accordance with example embodiments.
Figure 33B:
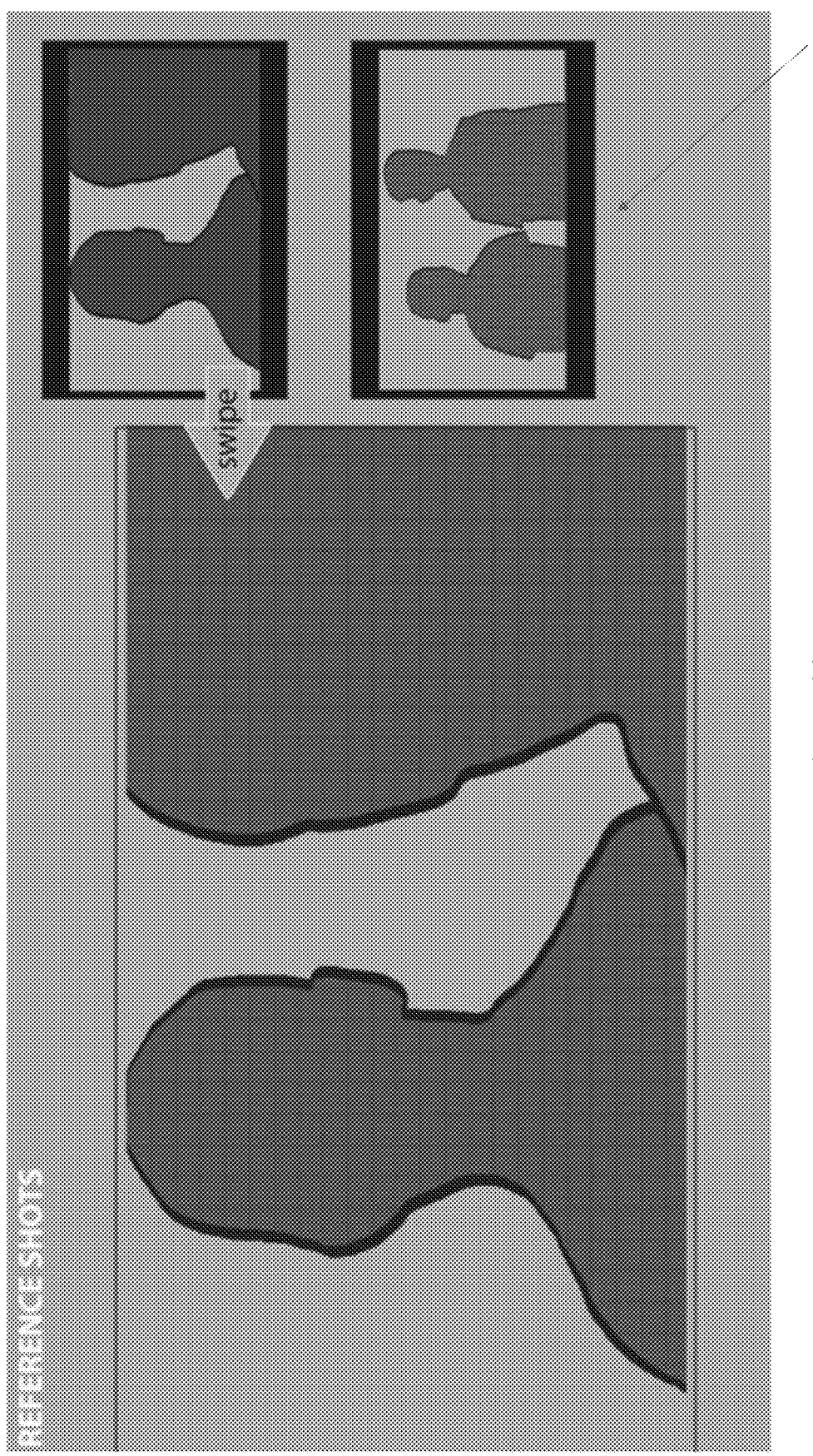
FIG. 33B is a picture showing use of a composition guide menu in accordance with example embodiments.

In accordance with example embodiments, FIG. 33A shows a close-up of a third actor 3306 positioned on the right third of the live view of the mobile camera system 400, composed with the assistance of a close-up composition guide 1102 consisting of a vertical line 1108 which marks the right third of the frame and guides proper body placement on the right third of the frame, and a short horizontal line 3304 that forms a crosshair designed to guide a proper eyeline height for the third actor's 3306 eyes, all in service of the line of action 1314 and the rule of thirds.

As shown in FIG. 33B, in accordance with example embodiments, composition guides 1102 may be designed to feature silhouettes of subjects in various positions, postures and angles, which the user may use to position the subjects in matching or complimentary postures, positions and/or locations and to position the camera at matching or complimentary angles, all of which may be designed in service of the line of action 1314, the rules of proper sequencing, and the rule of thirds.

In accordance with example embodiments, users may deploy the film previsualization system's free shot functionality, which allows the user to add a shot anywhere into the existing coverage scheme. In accordance with example embodiments, users may select a free shot composition guide 1102 from a menu 3308 of one or more free shot composition guides 1102 in order to help frame their shot. In accordance with example embodiments, the composition guides 1102 may be part of scripted or unscripted coverage schemes and/or exercises. In accordance with example embodiments, the composition guides 1102 offer guidance for the recommended camera positions as well as free shot camera positions.

In accordance with example embodiments, measurements culled in real-time from the scanners and lenses of the mobile camera system 400 are used to provide visual guidance for the next shot position and composition. In accordance with example embodiments, the master shot 1906, which is the reference point for derivative camera positions, is based on the user setting the position of this shot relative to the positions of the subjects, which is a decision guided, in part, by how the user chooses to compose this shot.

In accordance with example embodiments, the camera positions and composition guides 1102 are calibrated to suit the focal length of the mobile camera system's 400 native lens and/or any attachable lens, the aspect ratio or ratios offered by the device camera, and/or the aspect ratios of existing footage. In accordance with example embodiments, the film previsualization system can make coverage recommendations which can edit with existing footage from a licensed scene. For example the user can download a project module that features clips from a popular episode of a TV show, which they augment with footage of their own.

In accordance with example embodiments, the previsualization system is versioned for particular devices and lenses or multiple lenses and devices. For example, the default lenses on the iPhone 7 Plus and the Phab2Pro are wide angle and as such, the camera positions and composition guides 1102 take that into account and provide a result tuned for these lenses.

In accordance with example embodiments, the composition guides 1102 are designed in either 2D or 3D, both of which allow the user the creative freedom to use the guides from a variety of angles, for example a low, medium or high angle, when recording the shot.

In accordance with example embodiments, in dynamic camera coverage, the composition guides 1102 are versioned to accommodate wide shots, medium shots and close-ups. In accordance with example embodiments, when providing composition guidance for a dynamic camera, composition recommendations are selected after the pathway is set and before the user records, so wide, medium and close-up compositions can govern the camera moves and takes. In accordance with example embodiments, the user may alter the composition while recording.

In accordance with example embodiments, the overlays that serve as the composition guides 1102 are designed and created by a storyboard artist. In accordance with example embodiments, the content of the composition guides 1102 is based, in part, on the distances and angles of each camera position relative to other camera positions, subject positions, and/or furniture or objects on the set. In accordance with example embodiments, composition guides 1102 are registered to dedicated camera positions or to identified pathways for guided subject or camera movement.

In accordance with example embodiments, the content of the composition guides 1102 is partially based on the guidance offered for unscripted or scripted content. In accordance with example embodiments, composition guides 1102 for unscripted content feature positional recommendations and template based designs or silhouette based designs for one actor, two actor, three actor (and so on) scenes. In accordance with example embodiments, composition guides 1102 for scripted content may include template and/or silhouette based designs that serve and help guide the proper production of a genre based fictional screenplay or documentary based outline or treatment for a screenplay, in real time. In accordance with example embodiments, the composition guides for scripted content may feature visual guidance that includes other subjects or elements of the set as identified in the master schematic.

In accordance with example embodiments, composition guides 1102 for dynamic subject or camera pathways offer different frames that accommodate the user getting closer or further from the subjects for each take, via a wide shot dynamic composition guide 1102 and its derivatives, including a medium shot dynamic guide and a close-up dynamic guide.

As shown in FIGS. 10, 11, and 33A, in accordance with example embodiments, once the user has adjusted their frame so that the actors 1902, 1904, and 3306 are properly positioned, the user records their shot. In accordance with example embodiments, once the user saves the shot, the map 3424 reappears on the display 700 of the mobile camera system 400 and guides the user to the next shot position. In accordance with example embodiments, the user repeats the steps of advancing to the next shot position, as identified by the next shot position icon 906 on the map 3424; swiping the composition guide 1102 over the live view; framing the shot; then recording the shot until all the recommended coverage is shot out.

In accordance with example embodiments, with dynamic camera functionality the camera pathways offered, from wide to close-up, are derivative in respect to one another, so users are guided to reshoot the same move from various distances and angles relative to the subject's pathway and movement, as a means of capturing full coverage.

Figure 12:
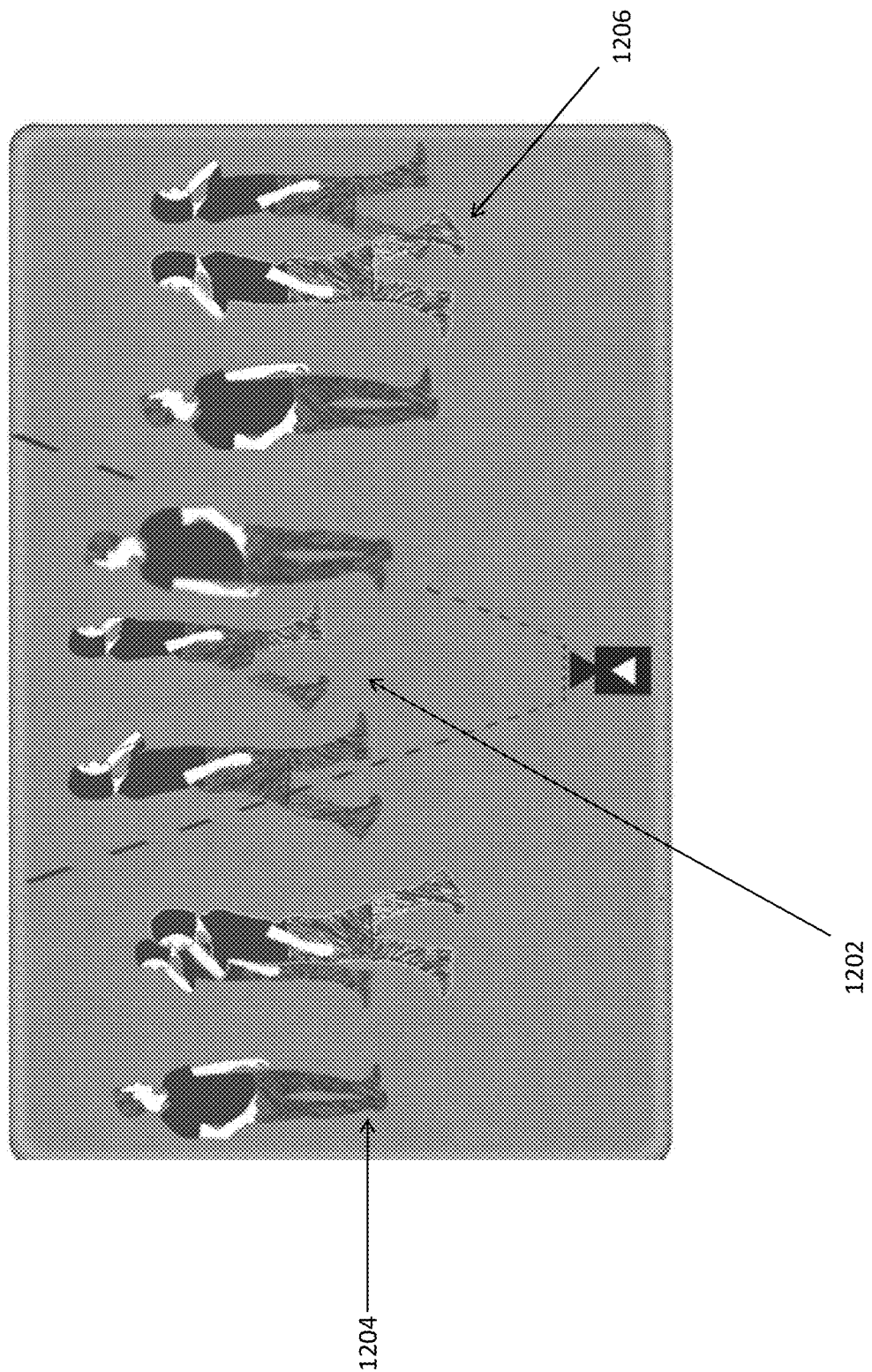
FIG. 12 is an illustration showing an example of staging patterns for 3 person scenes.

In accordance with example embodiments, the coverage scheme, which includes camera positions and composition guides 1102, is adjusted to account for different configurations of subjects, such as actors or objects of interest which are substituted for actors. For example, in professional filmmaking, it is common that actors are staged in patterns that allow the director to shoot out the coverage in a systematic manner. For example, as shown in FIG. 12, in a 3 person static camera static subject dialogue scene, the director may choose to stage the actors in an A pattern 1202, L pattern 1204, or near straight line pattern 1206. In accordance with example embodiments, a coverage scheme is generated based on how the user stages the subjects or finds them positioned. In accordance with example embodiments, the coverage schemes offered serve multiple configurations, for different numbers of on-screen subjects.

In accordance with example embodiments, the coverage scheme serves and respects the line of action 1314, which is an important filmmaking convention with respect to proper camera placement.

For example, as shown in FIG. 13, in a simple 2 person scene where the first person 1301 and the second person 1302 are looking at one another while standing still, separated by, for example 5 feet, there is just one line of action 1314, which is a theoretical line connecting the actors' eyelines. Described as the axis or line of action 1314, this theoretical line has implications when it comes to properly covering a scene. For example, typically all master and derivative camera positions are staged on 1 side of the line which means they are set within an imaginary 180 degree field that connects to both ends of the line drawn between any 2 subjects. In accordance with example embodiments, respecting the line(s) of action means not crossing the line(s) of action with respect to camera placement.

As shown in FIG. 13, in accordance with example embodiments, in a static camera, static subject 2 person scene where all shots are recorded on the same mobile camera system 400 with the same lens, all 5 recommended shots 1303, 1304, 1306, 1308, and 1310 have camera positions that have been placed on the same side of the line of action 1314, so that all the separate shots taken will edit in a manner such that the two actors 1902, 1904 will appear to look at one another throughout the edited sequence. In this 2 person scene, the first recommended shot 1303 can be the master shot 1906, which can be the furthest camera position from the first person 1301 and second person 1302 and may be used to capture both people interacting in the same, wide frame. In a 2 person scene which features a first person 1301 and a second person 1302 looking at one another, the master shot 1906 establishes the two people's eyelines—such that they are looking at one another during the conversation—while setting the location of the scene, for example in a booth in a diner, because elements of the location are visible in the foreground and/or background.

In accordance with example embodiments, the second recommended shot 1304 in the sequence is described as an over-the-shoulder 2 shot and is framed such that the camera looks over and includes the second person's 1302 left shoulder while featuring the first person 1301 positioned on the other side of the frame, in a waist high frame looking at the second person 1302. To reposition for this shot, the camera must move from the position of the first recommended shot 1303 to a second position for the second recommended shot 1304 behind and to the left of the second person's 1302 shoulder. The third recommended shot 1306 in the sequence is a close-up of the first person 1301 looking at the second person 1302 and is achieved by moving the camera past the second person's 1302 left shoulder to a close-up camera position which is closer to the first person 1301.

In accordance with example embodiments, two more camera positions are recommended in the 5 shot sequence; known as the reverses, the fourth recommended shot 1308 is an over-the-shoulder two shot position to capture the first person 1301 looking at the second person 1302, and the fifth recommended shot 1310 is a derivative close-up position that helps capture a close-up of the second person 1302 looking at the first person 1301.

While the recommended shots 1303, 1304, 1306, 1308, and 1310 have been described in a particular order, it is understood that the recommended shots can be recorded in a different order.

Figure 14A:
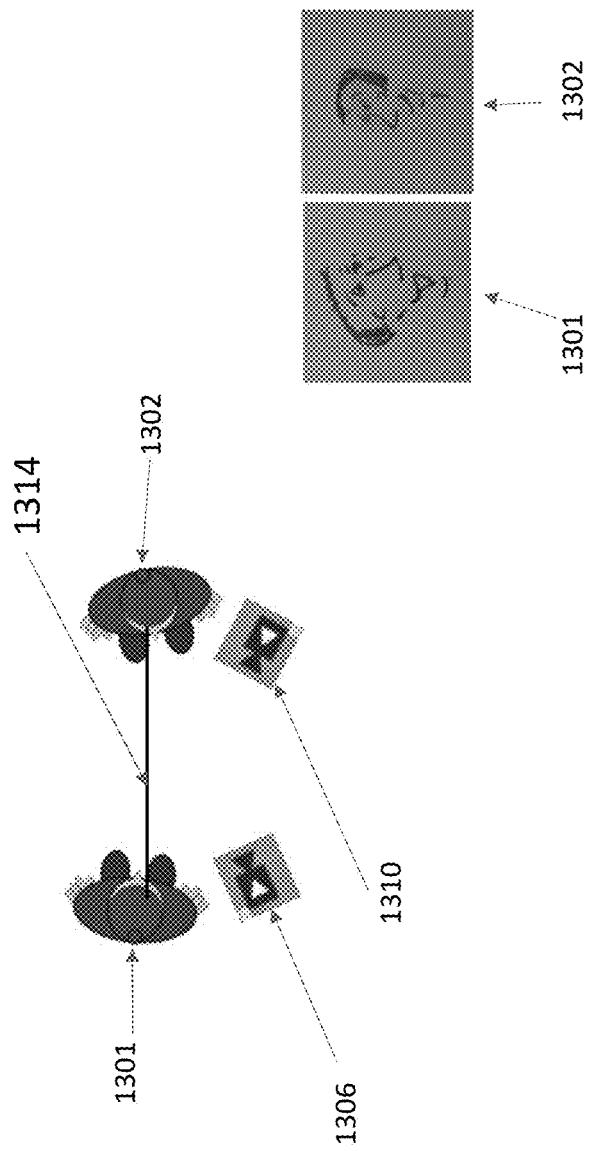
FIG. 14A is an illustration showing an example of a line of action and camera positions in 2 person coverage.

In accordance with example embodiments, as depicted in FIG. 14A, when the two close-up recommended shots 1310, 1306 are shot from the same side of the line of action 1314, the close-ups of the first person 1301 and the second person 1302 will appear to look at one another in the edit, which means screen direction has been properly maintained in a manner that is contiguous with the eyelines already established with recommended shots 1302, 1304 and 1308 as depicted in FIG. 13. In accordance with example embodiments, the film previsualization methods and systems recommend camera positioning that respects the line of action 1314 and maintains continuous screen direction in shots that are in coverage schemes featuring one or more tagged subjects.

Figure 14B:
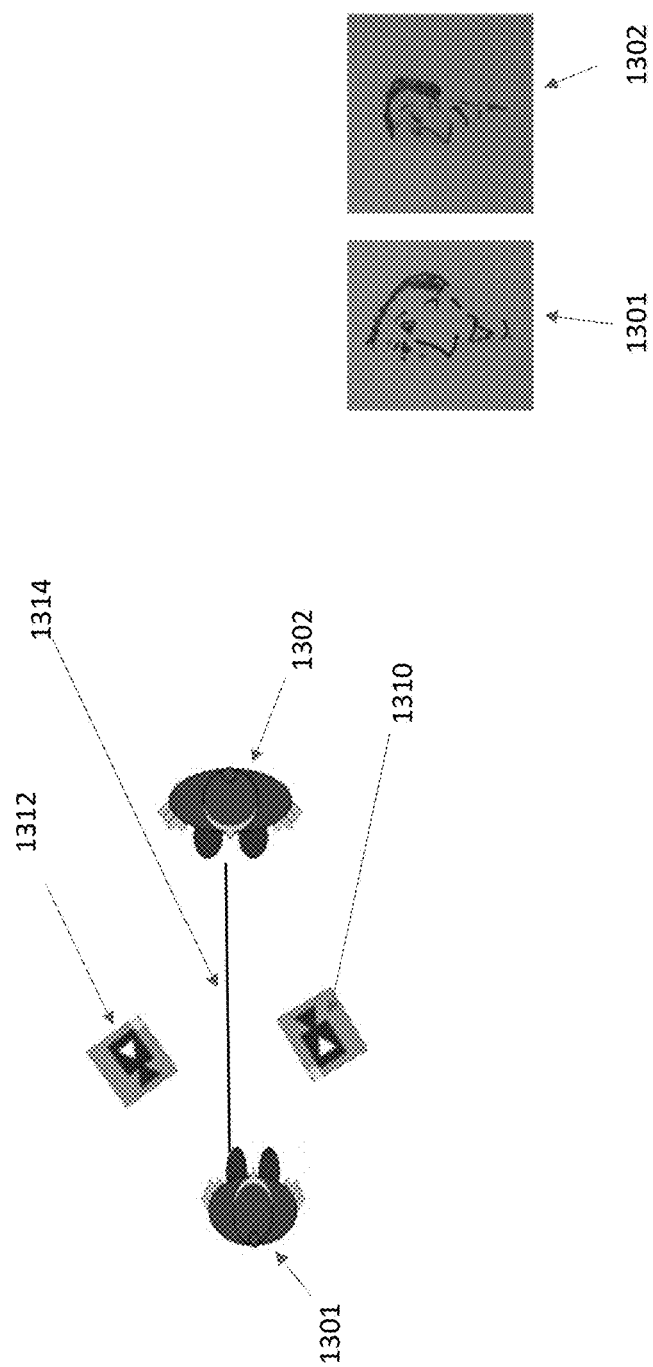
FIG. 14B is an illustration showing an example of how errors in screen direction occur when the line of action is crossed in a 2 person scene.

For amateurs, difficulties improperly staging shots can cause problems in editing when camera positions from opposing sides of the line are used in the same sequence, for example when the user has erroneously crossed the line of action 1314 when repositioning for one of two close-ups during coverage. For example, as depicted in FIG. 13 and FIG. 14B, in a 2 person static subject, static camera dialogue sequence with 5 shots, if the user replaces the third recommended shot 1306 with alternative shot 1312, which is on the wrong side of the line of action 1314, in the edit the close-up shots will not show the first person 1301 and second person 1302 looking at one another, but rather the second person 1302 will appear to be talking to the back of the first person's 1301 head while the first person 1301 will appear to be looking off camera when they should be facing the second person 1302. In FIG. 14B, continuous screen direction has not been maintained—eyelines were broken as a consequence of incorrect camera placement with respect to the line of action 1314, which is a common mistake made by amateur filmmakers.

There are occasions when the director may want to deliberately break the line of action 1314, for example in order to meet specific needs and goals of the scene or the blocking within the scene. In accordance with example embodiments, the film previsualization methods and systems may show how, when and why to respect, cross or break the line of action 1314.

A coverage scheme that respects the line of action 1314 helps maintain proper screen direction during editing, meaning, for example, that in a scene where actors are talking to one another, the actors appear to be looking at one another, at all times, in all shots, in an assembled sequence. In accordance with example embodiments, as depicted in FIG. 13, an example of a coverage scheme that respects the line of action 1314 is a 2 person, static subject, static camera coverage scheme where all 5 recommended shots 1303, 1304, 1306, 1308, and 1310, including a master shot 1906 (recommended shot 1303), two over-the-shoulder 2 shots (recommended shots 1304 and 1308), and two close-up shots (recommended shots 1306 and 1310), are shot from the same side of the line of action 1314. In accordance with example embodiments, the edited footage of this sequence, based on proper camera positioning which respects the line of action 1314, produces the desired visual outcome of the first person 1301 and second person 1302 looking at one another as they would in real life. In an improperly staged coverage scheme one or more camera positions are placed on different sides of the line of action 1314. For example, in FIG. 14B, recommended shot 1310, and alternative shot 1312 are shot, resulting in an edited outcome where the first person 1301 and second person 1302 appear to be looking away from each other when they should be looking at one another.

In accordance with example embodiments, as depicted in FIG. 13, the user may deploy free shot functionality during production of any coverage scheme, adding one or more additional shots 1320 to the coverage scheme. As depicted in FIG. 13, the user has added one medium wide additional shot 1320 to the 5 shot coverage scheme. In accordance with example embodiments, the user may place and record one or more free shots anywhere on the virtual set, on either side of the line of action 1314. In accordance with example embodiments, as depicted in FIG. 13, free shot functionality speeds the learning curve of continuity shooting for the amateur filmmaker because this functionality may produce successful positional augmentation or errors during editing that do not affect a successful edit.

In accordance with example embodiments, in a 3 person scene, there are 3 lines of action 1314 and coverage may include 13 shots in total. By way of example, as shown in FIG. 12, even in static camera, static subject scenes, where both the subject and camera are stationary, there are multiple staging patterns for 3 person scenes, including the A pattern 1202, L pattern 1204, or near straight line 1206. Each staging pattern may require a different coverage scheme. There may also be occasions when the line of action 1314 must be broken in order for a new line of action 1314 to be established, for example in order to accommodate the arrival of a third character in a 3 person scene. In these situations, specific camera movement, or a carefully directed actor movement like a head turn which shifts eyelines, or a combination of camera movement and actor direction, can be used to set a new line of action 1314, which may in turn require an updated coverage scheme.

Maintaining proper screen direction can be challenging for filmmakers. In accordance with example embodiments, the generated coverage schemes deliver line of action 1314 safe camera positions that will maintain proper screen direction for scenes featuring multiple actors staged in different staging patterns. In accordance with example embodiments, coverage schemes are generated and guidance is provided to the user for different situations, including multiple subjects in multiple staging patterns with multiple lines of action 1314. In accordance with example embodiments, coverage schemes are generated and guidance is provided for scenes where the camera, the subject or subjects, or a combination of the camera and subjects are in motion.

As shown in FIG. 34, in accordance with example embodiments, the user can check the line of action 1314 at any time. In accordance with example embodiments, all lines of action 1314 have been included and can be viewed via push-button, on-demand access by using the line of action 1314 icon 3426. In accordance with example embodiments, the display of lines of action 1314 can be used as a tool for discussion and understanding of proper screen direction. In accordance with example embodiments, a user can save a screenshot by using the screenshot icon 3428 and share images of the map 3424, with or without the line of action 1314 deployed, over the live image for discussion and learning.

In accordance with example embodiments, the line of action 1314 is shown on the map 3424 in FIG. 34. In accordance with example embodiments, the map 3424 shows where the current actor positions are (as represented, in this example, by the first subject position icon 912, second subject position icon 914 and third subject position icon 916 and where the camera positions are (as represented, in this example, by the current camera position icon 904, next shot position icon 906, and follow up position icon 910) in relation to the line of action 1314.

In accordance with example embodiments, FIG. 34 features a close-up shot of the third actor 3306 taken from a 3 person static camera, static subject scene. The graphic for the first of three lines of action 1314 has been deployed by tapping the line of action 1314 icon 3426 on the control panel 2804.

In accordance with example embodiments, with the line of action 1314 visible on the map 3424, the user is guided to the next shot in the sequence by the next shot position icon 906, which in this example is an over-the-shoulder 2 shot. In accordance with example embodiments, the third subject position icon 916 and second subject position icon 914 reflect, in the map 3424, the tagged positions of two of the subjects in this 3 person scene.

In accordance with example embodiments, the recommended next two shots in the sequence, identified by the next shot position icon 906 and the follow up shot position icon 910, may be considered positionally derivative of the master shot 1906 position, identified by the master shot 1906 position icon 908 in the map 3424.

As shown in FIG. 34, in accordance with example embodiments, the current camera position icon 904 shows that the user has just finished recording a close-up on the third actor 3306, who is identified in the map 3424 by the second subject position icon 914. In accordance with example embodiments, the user is then prompted by the dynamic compass arrow 902 to travel across the first line of action 1314 to record an over-the-shoulder 2 shot from the location identified by the next shot position icon 906, which is behind and to the left of the second actor's 3306 position (as identified by the third camera position icon 916) looking at the subject identified by the first subject position icon 912 on the map 3424.

In accordance with example embodiments, in this 3 person scene, all recommended guidance has been generated in relation to the position of the master shot 1906, identified by the master shot 1906 position icon 908 on the map 3424. In accordance with example embodiments, the user may take a screenshot of the live view and map 3424 by tapping the screenshot icon 3428 on the control panel 2804 at any time during production.

Figure 35:
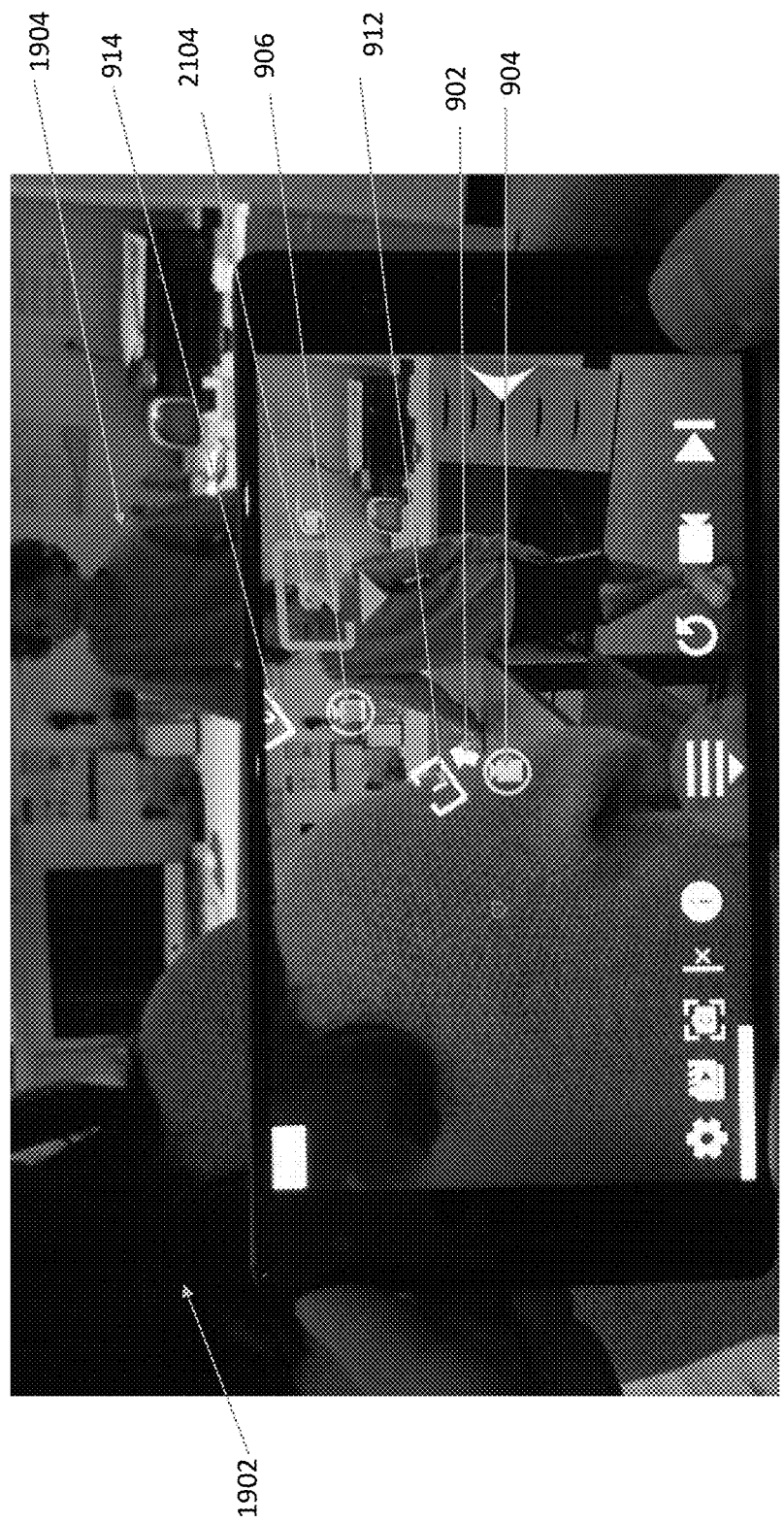
FIG. 35 is a picture depicting a map user interface showing guidance from the over-the shoulder position to the close-up position in accordance with example embodiments.

In accordance with example embodiments, as depicted in FIG. 35, the current camera position icon 904 and activated dynamic compass arrow 902 show that the user has recorded an over-the-shoulder 2 shot from the first actor's 1902 tagged position (identified on the map 3424 by the first subject position icon 912), looking back at the second actor's 1904 tagged position (identified on the map 3424 by the second subject position icon 914 and by the second numbered tag 2104) and is now being prompted by the dynamic compass arrow 902 to move to the next shot position (identified on the map 3424 by the next shot position icon 906) for a close-up on the second actor 1904.

Figure 36:
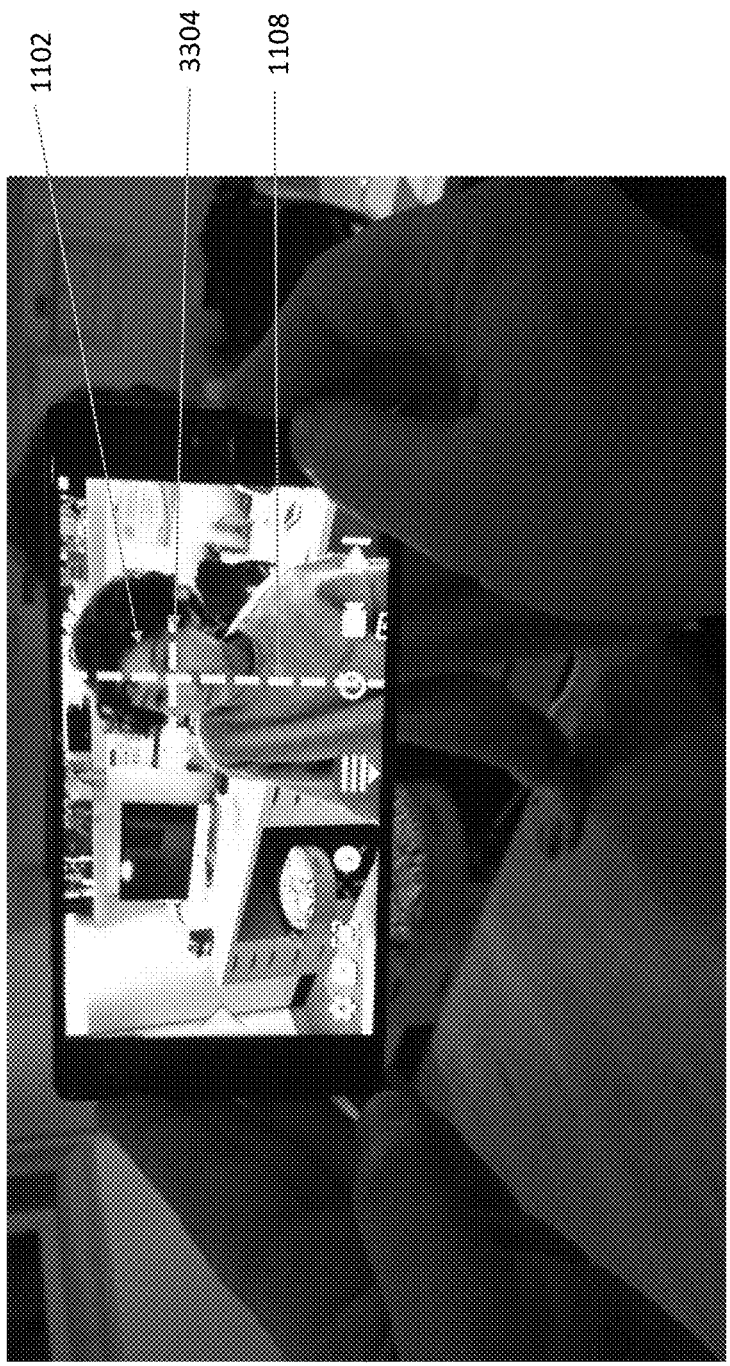
FIG. 36 is a picture of an actor framed according to a composition guide in accordance with example embodiments.

In FIG. 36, in accordance with example embodiments, the user has advanced to the close-up position and has swiped the close-up composition guide 1102 over the live view, using the crosshair formed by the vertical line 1108 and horizontal line 3304 of the close-up composition guide 1102 to level the second actor's 1904 eyeline and center the face in accordance with the rule of thirds. In accordance with example embodiments, the close-up composition guide 1102 may be used to frame a close-up of an object of interest.

In accordance with example embodiments, the generated coverage schemes may prioritize coverage in a manner that minimizes lighting set ups. Minimizing lighting setups can reduce or eliminate the need for large lighting kits along with the time needed to work with lighting kits.

In accordance with example embodiments, simple and complete versions of the same coverage scheme are generated. In accordance with example embodiments, simple coverage schemes may include the minimal number of positional and compositional recommendations to cover the scene while complete versions may include a greater number of recommendations so the coverage is more thorough.

FIG. 15 shows an example coverage scheme in accordance with example embodiments for a 3 person static camera, static subject scene, with subject one 1521, subject two 1522, and subject three 1523 staged in an A pattern 1202, in accordance with example embodiments. In accordance with example embodiments, a simple and complete version of the coverage schemes for a 3 person static camera, static subject scene is generated. In accordance with example embodiments, the master shot 1906 position may be set at any point on the virtual set, at any angle relative to the positional tags set within the scanned environment.

As shown in FIG. 15, in accordance with example embodiments, a complete version of the coverage scheme for a 3 person static camera, static subject scene includes recommendations for 13 camera configurations. In accordance with example embodiments, the order of appearance for the 13 camera configurations accommodates a minimum number of lighting sets ups, in this case the first lighting setup 1518 and second lighting setup 1516.

In accordance with example embodiments, the previsualization system may be used with available light meaning the user may shoot out all 13 recommendations, without pause, by following the order of shots that the system provides, or the user may follow the same positional recommendations in the same order, knowing that this order of shots accommodates and recommends a simple lighting scheme that minimizes the number of set lighting set ups needed to shoot out the sequence.

In accordance with example embodiments, as depicted in FIG. 15, a minimal number of 2 lighting set ups, first lighting setup 1518 and second lighting setup 1516, are required for the complete 13 shot sequence for static camera, static subject coverage. The first lighting set up 1518 is recommended to be set up behind the first recommended shot 1501, which is the master shot 1906, where it remains for the first 9 shots. The second lighting set up 1516 is recommended to be set up behind subject three 1523 after the ninth recommended shot 1509.

In accordance with example embodiments, the order that the next shot positions appear in is governed by the smallest angle principle, also known as the acute angle principle. In accordance with example embodiments, the smallest angle principle delivers line of action 1314 friendly coverage for two or more tagged subjects.

In accordance with example embodiments, the order of shots are determined based on the smallest angle formed between the set master shot 1906 position, and the position of the two subjects closest to the master shot 1906 position. In accordance with example embodiments, the first set of coverage recommendations serve the tagged subject that is the pivot point in the smallest angle formed between the master shot 1906 position and the two subjects closest to the camera. In accordance with example embodiments, the second set of coverage recommendations serves the remaining of the two subjects closest to the master shot 1906 position.

In accordance with example embodiments, in scenes with three or more subjects, the subject furthest from the master shot 1906 position is shot out last when following the smallest angle principle. In accordance with example embodiments, in scenes with four or more tagged subjects, coverage recommendations for tagged subjects that are neither the nearest two tagged subjects to the master shot 1906 position (which are prioritized first) nor the furthest from the master shot 1906 position (which is prioritized last) are prioritized based on physical proximity to the tagged subject of the preceding set of coverage recommendations.

In accordance with example embodiments, in situations where the nearest two tagged subjects are the same distance from the master shot 1906 position, or the nearest two tagged subjects are at the same angle to the master shot 1906 position, the previsualization system can select either of the two tagged subjects is to be covered first.

Figure 40:
FIG. 40 is a picture of a master shot shown on a user interface in accordance with example embodiments.

In accordance with example embodiments, in a 3 person scene, once the user sets and records the master shot 1906, the first recommended coverage set, based on the smallest angle principle, recommends coverage around the person that's the pivot point in the smallest angle formed between the master shot 1906 position and the two subjects closest to the master shot 1906 position. As shown in FIG. 40, in accordance with example embodiments, the live view features a first actor 1902, second actor 1904, and third actor 3306 who have been recorded from the master shot 1906 position, identified in the map 3424 by the master shot 1906 position icon 908. In accordance with example embodiments, because the angle formed between the master shot 1906 position, the first actor 1902 and the second actor 1904, with the first actor 1902 as the pivot, forms the smallest angle, the first recommended coverage set will rotate around the first actor 1902 beginning with the first over-the-shoulder 2 shot position. In accordance with example embodiments, the first over-the-shoulder 2 shot is identified by the next shot position icon 906 in the map 3424. Once the first actor's 1902 coverage is shot out, coverage for the next nearest actor to the master shot 1906 position is recommended, which is coverage that will rotate around the second actor 1904.

Figure 37:
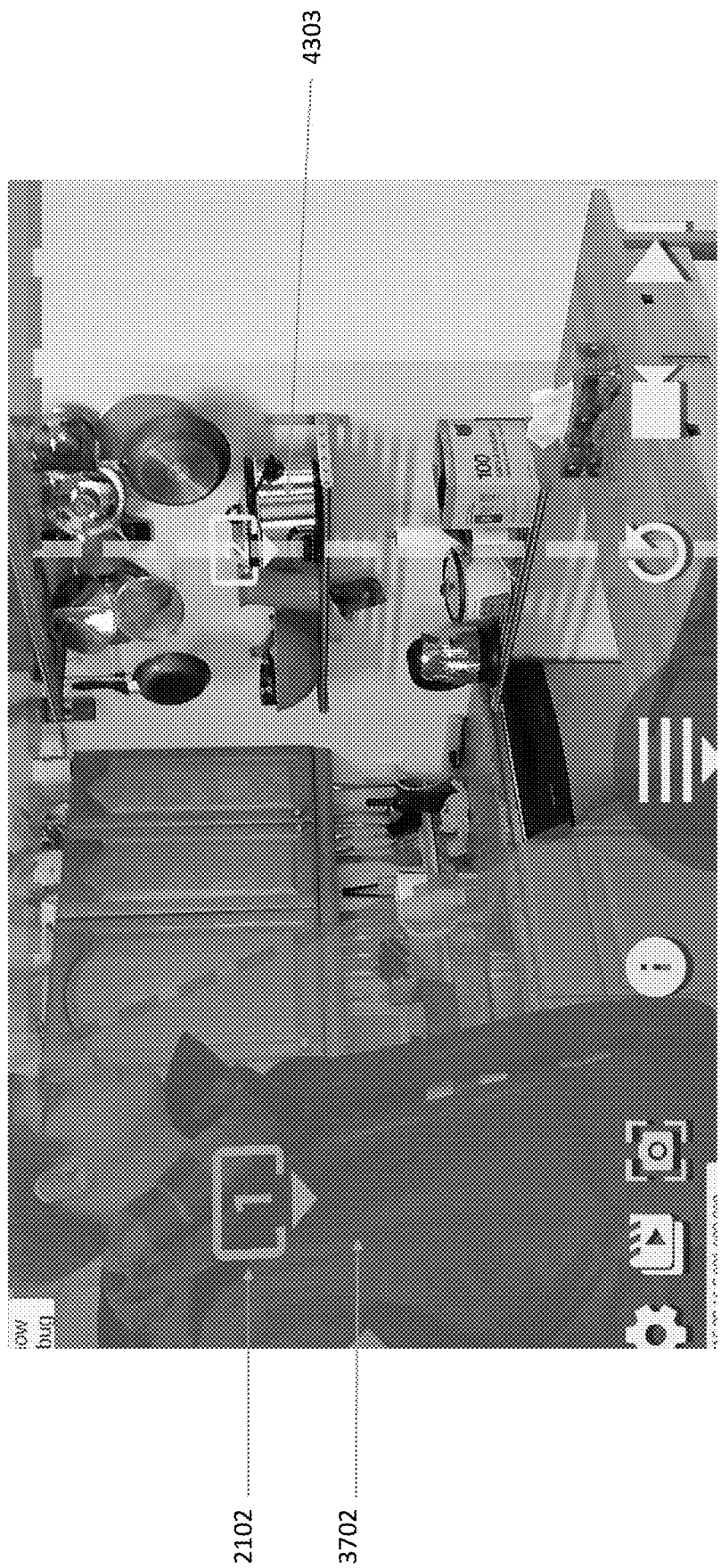
FIG. 37 is a picture showing an example of one person coverage in accordance with example embodiments.

In accordance with example embodiments, the smallest angle principle can also be applied to the coverage of 1 person scenes. In accordance with example embodiments, because a minimum of two subjects is required to establish a primary line of action 1314, the set up for 1 or 2 person coverage is the same since the user must tag at least two subjects to generate the required coverage for either scene. As shown in FIG. 37, in accordance with example embodiments, 1 person scene coverage requires that the user tag one individual 3702 and one object of interest, in this example a pot 4303, to generate a coverage scheme.

In accordance with example embodiments, the primary line of action 1314 is set between the tagged subject of the first set of coverage recommendations and the tagged subject of the second set of coverage recommendations.

In accordance with example embodiments, using the smallest angle principle results in next shot camera positions that respect the line of action 1314 in different staging patterns—for example an A pattern 1202, L pattern 1204 or near straight line pattern 1206 in a 3 person scene—and minimizes the number of lighting set ups required to cover the scene.

As shown in FIG. 15, in accordance with example embodiments, coverage rotating around the subject two's 1522 position is recommended first, followed by coverage for the subject one's 1521 position, each of which feature camera positions in respect of two lines of action 1314: the primary line of action 1314 defined by the position of the subject two 1522 and subject one 1521, and another line of action 1314 defined by subject two 1522 and subject three 1523. In accordance with example embodiments, following coverage for the first two actors, the user is then guided to reposition behind subject three 1523 to secure and capture the reverses, in respect of two lines of action 1314: the primary line of action 1314 between subject two 1522 and subject one 1521, and another line of action 1314 between subject three 1523 and the subject one 1521.

In accordance with example embodiments, as depicted in FIG. 15, the first nine shots in the A pattern 1202 sequence are accommodated by the first lighting set up 1518, which recommends that the user's lights be set up behind the first recommended shot 1501 (the master shot 1906 position), in a manner that lights the subject one 1521, subject two 1522, and subject three 1523 from a position where the lighting hardware cannot be seen in the live view of the mobile camera system's 400 display 700 for the first nine shots.

In accordance with example embodiments, the user sets the master shot 1906 which allows the mobile camera to visually feature subject one 1521, subject two 1522, and subject three 1523 in the same wide frame.

In accordance with example embodiments, once the master shot 1906 is set, shot and saved, the second recommended shot 1502 in the sequence is an over-the-shoulder (OTS) two shot camera position of subject two 1522 looking at subject three 1523.

In accordance with example embodiments, the third recommended shot 1503 is a close-up position of subject three 1523 from the subject two's 1522 point of view.

In accordance with example embodiments, the fourth recommended shot 1504 is an over-the-shoulder 2 shot of subject two 1522 looking at subject one 1521.

In accordance with example embodiments, the fifth recommended shot 1505 is a close-up of the subject one 1521 from the point of view of the subject two 1522.

In accordance with example embodiments, the sixth recommended shot 1506 is an over-the-shoulder 2 shot of subject one 1521 looking at subject two 1522.

In accordance with example embodiments, the seventh recommended shot 1507 is a close-up of subject two 1522 from the point of view of subject one 1521.

In accordance with example embodiments, the eighth recommended shot 1508 is an over-the-shoulder 2 shot that features subject one 1521 looking at subject three 1523.

In accordance with example embodiments, the ninth recommended shot 1509, which is the final recommendation for camera positioning in the sequence for the first lighting set up 1518, is a close-up of subject three 1523 from the point of view of subject one 1521. In accordance with example embodiments, at this point in the recommended coverage, the film previsualization system recommends that the user set up the second lighting set up 1516, which is behind subject three 1523 such that subject one 1521 and subject two 1522 are properly lit for the remaining four shots in the 13 shot sequence, which feature subject one 1521 and subject two 1522 looking at subject three 1523.

In accordance with example embodiments, as depicted in FIG. 15, the tenth recommended shot 1510 is an over-the-shoulder shot of subject three 1523 looking at subject one 1521.

In accordance with example embodiments, the eleventh recommended shot 1511 is a close-up of the subject one 1521 from the point of view of subject three 1523.

In accordance with example embodiments, the twelfth recommended shot 1512 is an over-the-shoulder shot of subject three 1523 looking at subject two 1522.

In accordance with example embodiments, the thirteenth recommended shot 1513 is a close-up of subject two 1522 from the point of view of subject three 1523.

In accordance with example embodiments, the order of the first nine recommended shots 1501, 1502, 1503, 1504, 1505, 1506, 1507, 1508 and 1509 can be re-arranged and the order of the last four recommended shots 1510, 1511, 1512, and 1513 can be re-arranged while maintaining the minimized lighting set ups.

In accordance with example embodiments, a simple coverage scheme for the A pattern 1202 may only feature 9 recommendations, which would exclude both the last four recommended shots 1510, 1511, 1512, and 1513 as well as the second lighting set up 1516.

In accordance with sample embodiments, the same shot logic, shot count and lighting strategies may apply to alternative staging patterns, such as the L pattern 1204 and the near straight line pattern 1206 for 3 person static camera static subject coverage schemes.

In accordance with example embodiments, a lighting scheme, which compliments the coverage scheme, appears as an overlay. In accordance with example embodiments, the lighting scheme overlay can be deployed by the user as needed. In accordance with example embodiments, the location of the one or more lighting set ups are shown on the map 3424. In accordance with example embodiments, only the current lighting set up is shown on the map 3424, so that the user knows which lighting set up to use at any given point. In accordance with example embodiments, a master scheme of the full lighting scheme can be viewed at any time. In accordance with example embodiments, the user may add lighting set ups to the lighting scheme, adjust lighting set ups in the scheme or replace lighting set ups to the scheme. In accordance with example embodiments, the user may create their own lighting scheme. In accordance with example embodiments, any changes to the lighting scheme overlay will be visible on the lighting scheme overlay and may be orange in colour.

In accordance with example embodiments, as depicted in FIG. 15, all positional recommendations are placed on complimentary sides of the three lines of action 1314 in the scene, such that all shots will cut together properly.

In accordance with example embodiments, three person coverage in a three person static camera, static subject scene, may include recommendations for nine or thirteen camera positions, consisting of one master shot 1906, four or more over-the-shoulder 2 shots and four or more close-up shots.

In accordance with example embodiments, a 2 person static subject, static camera coverage scheme may feature five recommended camera positions, including the master shot 1906, two over-the-shoulder shots and two close-up shots.

In accordance with example embodiments, a 1 person static subject, static camera coverage scheme may feature recommendations for four camera positions, consisting of two over-the-shoulder shots and two close-up shots, based on the position of the master shot 1906 position, which is the 5th shot in this sequence.

In accordance with example embodiments, as depicted in FIG. 13 coverage of subject one 1301 and subject two 1302 may require only one lighting set up 1516.

Figure 41:
FIG. 41 is a picture of a different shot shown on a user interface in accordance with example embodiments.

In accordance with example embodiments, as shown in FIG. 41, in a 3 person scene, coverage rotating around the nearest two subjects (in this case, the subjects identified on the map 3424 by the first subject position icon 912 and the third subject position icon 916) to the master shot 1906 position (identified on the map 3424 by the master shot 1906 position icon 908) will be shot out first, which can allow them to share the same lighting set up. In accordance with example embodiments for the final positional recommendations in a 3 person scene, the lighting equipment will be moved to a second location.

In accordance with example embodiments, by using the smallest angle principle to prioritize coverage, the user's repositioning may be minimized or reduced compared to other coverage schemes.

In accordance with example embodiments, by using the smallest angle principle to prioritize coverage, when a lighting set up is used, the number of lighting set ups required can be minimized or reduced compared to other coverage schemes which may require more lighting set ups to achieve the same coverage for the same configuration of actors.

In accordance with example embodiments, one or more than one camera position can be added to the existing coverage scheme by deploying free shot functionality, which allows the user to add a shot of their own positional choice to the recommended positional sequence.

In accordance with example embodiments, the user may record fewer shots than prescribed by the sequence. In accordance with example embodiments, the user can skip a shot by tapping the skip shot icon 3400 as shown in FIG. 34. In accordance with example embodiments, the skip shot function can be used to advance past any recommended shot. In accordance with example embodiments, engaging the film previsualization system's skip shot functionality allows the user to skip one or more recommended camera positions in the prescribed coverage scheme. In accordance with example embodiments, the skip shot function can be used to skip camera positions that are not needed for the current scene.

Figure 43:
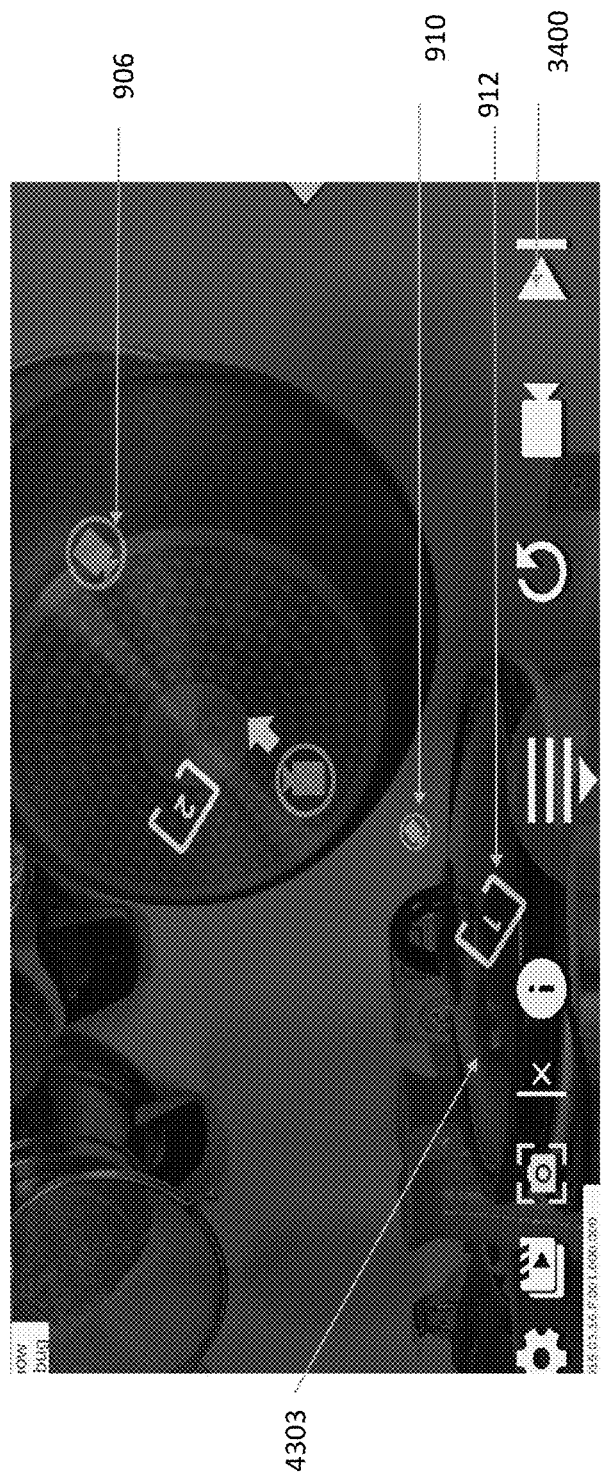
FIG. 43 is a picture of a user interface depicting a skip shot feature in accordance with example embodiments.

In accordance with example embodiments, as depicted in FIG. 43, skip shot functionality may be used to skip a positional recommendation that cannot be achieved because of the nature of the set. In FIG. 43, in an example one person scene, the user must skip the over-the-shoulder 2 shot recommendation, identified by the next shot position icon 906 on the map 3424, because the tagged object is a pot 4303 which is next to a kitchen wall. Because there is not enough room to go behind this tagged subject, the user taps the skip shot icon 3400 which advances the coverage to the follow up position, identified by the follow up shot position icon 910, to capture a close-up of the subject identified by the first numbered tag 2102 looking at the pot 4303 as shown in FIG. 37.

In accordance with example embodiments, deploying skip shot functionality may reduce the number of shots needed to achieve a successful coverage scheme, for example in coverage schemes where 4 of 5 recommended shots are recorded and 1 recommended shot is bypassed.

In accordance with example embodiments, for any coverage scheme, the previsualization system can include one or more composition guides 1102. In accordance with example embodiments, the same composition guide 1102 may be registered to different camera positions, for example the same close-up composition guide 1102 may be recommended for two different actors.

In accordance with example embodiments, the coverage schemes are designed in two stages. In accordance with example embodiments, plotting and measurement take place in a manual stage, which will then be used to program a coverage scheme for the previsualization system. In accordance with example embodiments, the plotting and measurements from the manual stage are generalized so that the previsualization system can apply a coverage scheme to multiple staging patterns.

In accordance with example embodiments, in the manual stage, coverage schemes are developed based on the needs or interests of users. In accordance with example embodiments, coverage schemes are based on a product mix and organized into different tiers. In accordance with example embodiments, the tiers include basic coverage schemes, basic add-on coverage schemes, and project modules which are genre based coverage schemes.

In accordance with example embodiments, once a coverage scheme is decided upon, a version of the scheme is manually plotted and measured. In accordance with example embodiments, coverage scheme plotting and measuring follows certain parameters, including staging the coverage scheme in a manner that serves the scanning range of the device, the visual output of the fixed lens of the device and/or any attachable lenses that may be deemed suitable, prudent or necessary. In accordance with example embodiments, unlike traditional coverage schemes, the coverage scheme is designed to serve the real-time functionality of the mobile camera system's 400 camera.

In accordance with example embodiments, one or more source coverage schemes are first manually blocked and mapped. In accordance with example embodiments, mapping the source coverage scheme may include one or more of: staging and framing each shot in a manner that may serve the rule of thirds; staging and framing each shot using a mobile camera system 400 with a fixed lens or a with any attachable lens in a manner that produces a visually desirable result; plotting each camera position in a manner that a companion composition guide 1102 can be designed to help the user recreate the visually desirable result; plotting the position, positions or moves of the subjects within an interior or exterior set; measuring and plotting the distance and angles between subjects relative to the line or lines of action 1314; plotting the camera position, camera positions or camera moves in a manner that captures the desired visual content; measuring and plotting the distance and angles of camera positions relative to the subjects and each line of action 1314; plotting each line of action 1314; plotting a desirable lighting scheme; plotting the camera positions in a manner and order that may minimize lighting set ups; and/or plotting camera positions such that they accommodate minor visual variances that may occur when shifting from a recommended composition to the live view offered by the device camera before recording. In accordance with example embodiments, FIGS. 38 and 39 show example angle schematics for over-the-shoulder and close-up shots.

Figure 38:
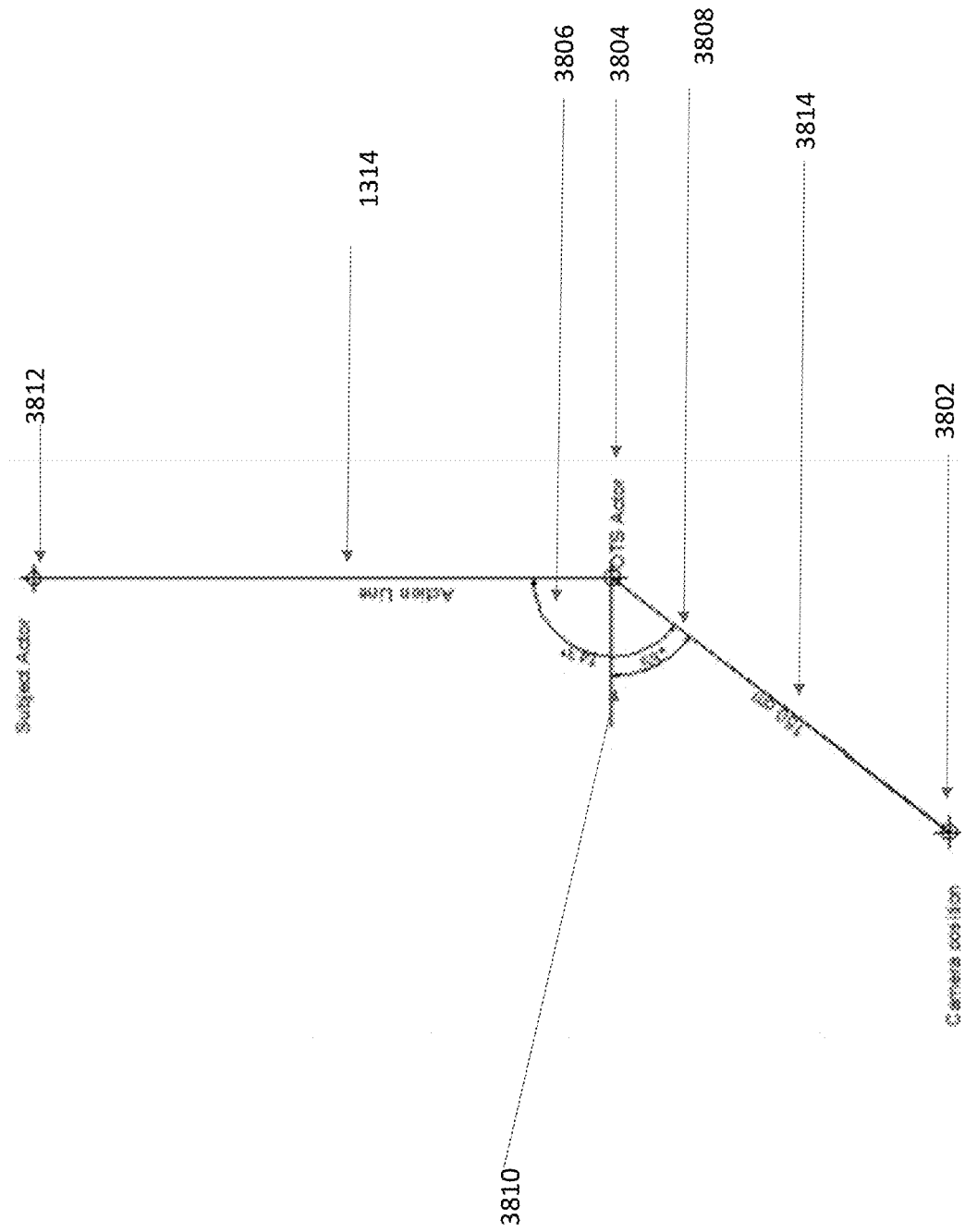
FIG. 38 is a schematic of example angles and distances for an over-the-shoulder 2 shot.
Figure 39:
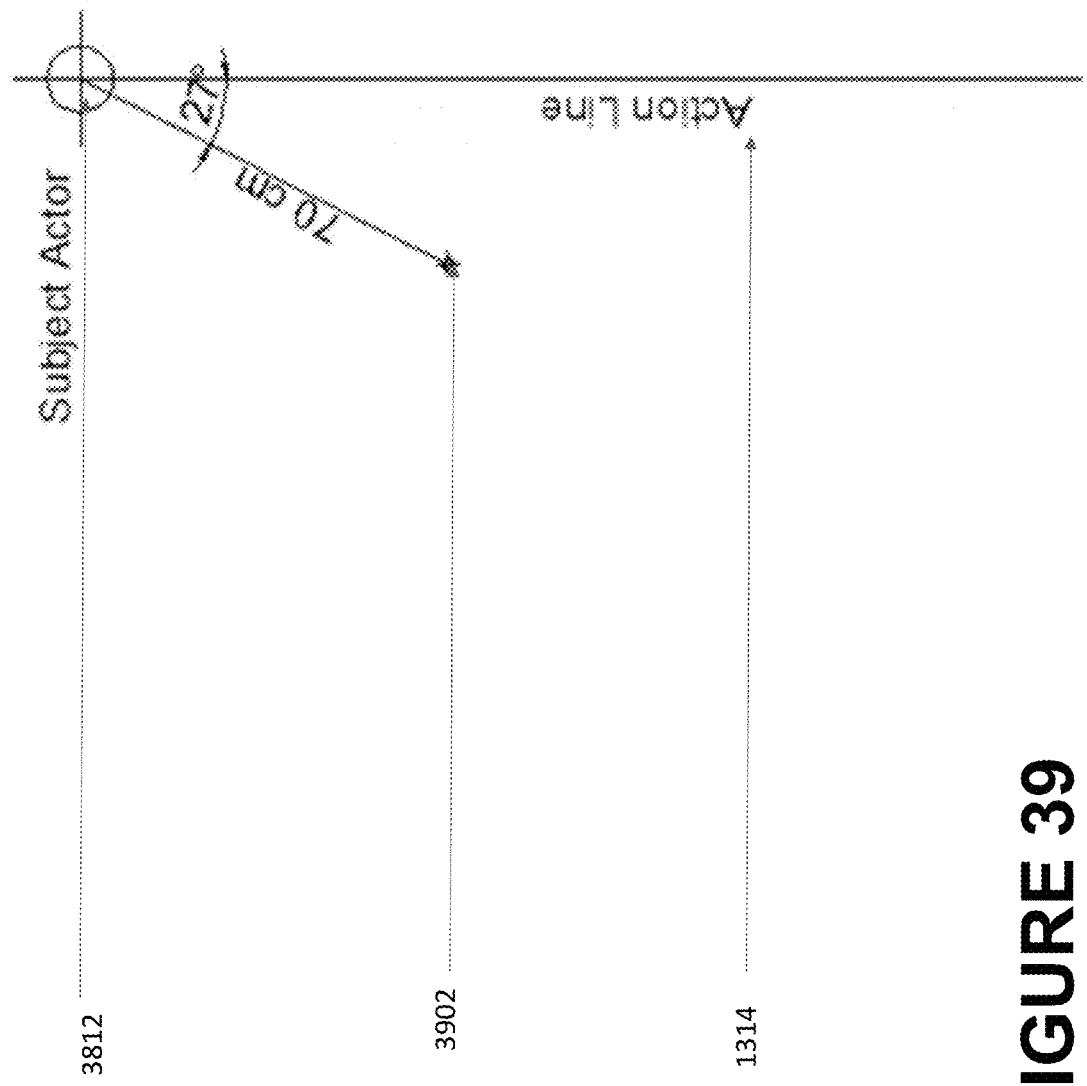
FIG. 39 is a schematic of example angles for a close-up on one actor.

FIG. 38 provides an example of an appropriate distance and angle for over-the-shoulder shots in 1, 2, and 3 person static camera/static subject coverage schemes, in accordance with example embodiments. In accordance with example embodiments, the appropriate distance and angle are determined by staging actors in various layouts and composing appropriate over-the-shoulder shots for each layout. In accordance with example embodiments, the location and measurements of the actors as well as the appropriately composed shot camera location are measured. In accordance with example embodiments, an appropriate angle and distance for the camera to be located behind and to one side of the over-the-shoulder actor is determined based on the fixed lens on the mobile camera system 400, a known field of view, and an average of the measurements taken.

As shown in FIGS. 38 and 44D, in accordance with example embodiments, a distance of approximately 150 cm away from the OTS (over-the-shoulder) actor 3804 at an approximately 143 degree angle 3806 from the line of action 1314 was determined to be an appropriate distance and angle to compose a shot with phablet type mobile camera systems 400. In accordance with example embodiments, in a mobile camera system 400 such as the Lenovo™ Phab2Pro™, when the distance between the OTS (over-the-shoulder) actor 3804 and the subject actor 3812 is 150 cm or more, the distance from the OTS camera position 3802 to the tagged OTS actor 3804 is 150 centimeters, with that 150 cm line 3814 set at a 143 degree angle 3806 to the line of action 1314 and at a 53 degree angle 3808 to an organizing line 3810 emanating from the OTS actor 3804 and running perpendicular to the line of action 1314. In accordance with example embodiments, the 150 cm distance from the camera position 3802 to the OTS actor 3804 and the 143 degree angle 3806 formed between the 150 cm line 3814 and the line of action 1314 was determined by first manually placing two actors on a set and using a mobile camera system 400 to compose the OTS shot such that the shoulder of the actor at OTS actor 3804 was visible in the foreground third of the frame while the subject actor 3812 was framed in the distance, on the opposing third of the frame, as per the rule of thirds and the live view of a fixed lens mobile camera system 400.

In accordance with example embodiments, as depicted in FIG. 44D, when the distance between the OTS actor 3804 and the subject actor 3812 is less than 150 cm, the distance from the OTS camera position 3802 to the OTS actor 3804 is 71 centimeters, with that 71 cm line set at a 132 degree angle 3816 to the line of action 1314.

FIGS. 39 and 44D provides an example of an appropriate distance and angle for a close-up shot position 3902 of a subject actor 3812, in accordance with example embodiments. In accordance with example embodiments, the appropriate distance and angle are determined in a similar manner to the determination of the appropriate distance and angle for over-the-shoulder shots. In accordance with example embodiments, an appropriate distance and angle for a close-up shot position 3902 with phablet type mobile camera systems 400 was determined to be approximately 70 cm away from the subject actor 3812 at a 27 degree angle from the line of action 1314.

In accordance with example embodiments, the blocking of the scene is done in a manner such that the camera positions follow the rule of thirds. In accordance with example embodiments, the camera position for the over-the-shoulder shots is positioned so that the main subject can be contained within approximately one third of the camera's frame. In accordance with example embodiments, the camera position for the over-the-shoulder shots is positioned so that the subject whose shoulder appears in the shot can also be contained within approximately one third of the camera's frame. In accordance with example embodiments, the camera position for a close-up shot is positioned so that the subjects can be contained within approximately one third of the camera's frame.

In accordance with example embodiments, once the distances and angles are manually determined, a composition guide 1102 to help the user frame the shot is designed based on the rule of thirds and the charted measurements and angles of the shot.

In accordance with example embodiments, the visual content to be seen within each composition guide 1102 is identified, with the understanding that it will be influenced by and adjusted to serve the field of view of the native lens of the mobile camera system 400 or any attachable lens that the recommendations may accommodate, as well as any formatting variance that may occur if and when the user leaves the framed shot of the composition guide 1102 to record the shot using the camera of the mobile camera system 400.

In accordance with example embodiments, once the manual measurements and positional and compositional decisions are finalized, they are codified for deployment in the coverage scheme.

In accordance with example embodiments, the camera positions are calculated based on the position of the master shot 1906 and the position of the subjects. In accordance with example embodiments, camera positions are calculated by identifying the appropriate camera distances and angles (which were measured during the manual measurements stage) based on the distance between subjects. In accordance with example embodiments, the position of the master shot 1906 and the subjects determines the one or more lines of action 1314. In accordance with example embodiments, the smallest angle principle is used to identify the primary line of action 1314. In accordance with example embodiments, the position of the master shot 1906 and subjects determines which side of a line of action 1314 the recommended camera position will be placed.

In accordance with example embodiments, different measurements sets are prepared during the manual measurement stage to accommodate different lenses, focal length and/or image sensor sizes. In accordance with example embodiments, the mobile camera system 400 automatically detects the lens, focal length and/or image sensor size. In accordance with example embodiments, the user inputs the type of lens, the focal length and/or the image sensor size. In accordance with example embodiments, the measurement set appropriate to the particular lens, focal length and/or image sensor size is used when calculating the recommended camera positions.

In accordance with example embodiments, to accommodate the integration of attachable lenses and/or camera movement, a dynamic algorithm, which factors in focal length and image sensor size, makes adjustments to the coverage scheme such that variance in distance and angle can be accommodated. In accordance with example embodiments, the coverage scheme is adjusted in a manner that serves the field of view, which may change because of movement or because an additional lens has been accommodated for and recommended for use within a coverage scheme.

In accordance with example embodiments, the plotting and measurement of the manual stage includes accommodating the live view and concepts such as the rule of thirds with respect to composition. In accordance with example embodiments, the plotting and measurement of the manual stage is done in the same manner for the different tiers.

In accordance with example embodiments, during the plotting and measurement of the manual stage, decisions relating to actor and camera placement conform to certain filmmaking conventions which allow for the development of derivative coverage schemes to serve multiple staging patterns. In accordance with example embodiments, coverage schemes that suit dedicated staging patterns are developed.

In accordance with example embodiments, the previsualization system's ability to automatically recommend one or more master shot 1906 camera positions is based, in part, on a set of aesthetic decisions and related measurements taken during the manual measurement stage. In accordance with example embodiments, based on the live view of the mobile device, a master shot 1906 position is decided upon such that all subjects can be in seen in the same wide frame. In accordance with example embodiments, the angles and distances between this master shot 1906 camera position and the tagged subjects are measured as well. In accordance with example embodiments, these master shot 1906 measurements are then codified into the previsualization system for deployment.

In accordance with example embodiments, a source lighting scheme is plotted in a manner that compliments the source camera scheme.

In accordance with example embodiments, coverage schemes are developed to serve the scanning requirements of the mobile camera system 400 used by the previsualization system, including parameters that relate to the size of the set, the presence of scan-able surfaces to assist in satisfactory measurement feedback and the quality of light, which can affect the device scanner.

In accordance with example embodiments, the desired staging is repeated on a set with a gridded floor that allows for efficient measurement of angles and relative distances of actors and the mobile camera system 400, with attachable lenses if desired.

In accordance with example embodiments, the method of determining appropriate distances and angles for different shots is repeated for different camera positions in a coverage scheme.

In accordance with example embodiments, dynamic camera pathways, distances and angles are devised with a similar approach to that used for static camera distances and angles. In accordance with example embodiments, the dynamic camera algorithm requires the user tag each subject at multiple positions along the intended route before it determines its derivative camera pathways. In accordance with example embodiments, measurement sets, which define the angle, distance and rotation of the camera relative to the line of action 1314, are worked out as it was with static camera, static subject functionality. In accordance with example embodiments, the measurement sets are a mix of camera positions and compositional recommendations to assist a user in achieving coverage from a variety of positions in order to try and achieve full coverage.

In accordance with example embodiments, in dynamic subject, dynamic camera scenes, each tagged subject position is time stamped, and the time stamps are used to create derivative camera pathways which guide the user at a relative speed in relation to the subject.

In accordance with example embodiments, in static subject, dynamic camera scenes, the speed of the master shot camera pathway guidance is set by the user and derivative camera pathway speeds are reproduced by the system.

In accordance with example embodiments, the measured angles, distances, lines of action 1314 and camera and subject positions are generalized so that the previsualization system can apply a coverage scheme to multiple staging patterns. In accordance with example embodiments, the generalization is done in a manner that allows the coverage schemes to be modified to suit where the user stages the scene, how they set the scene, and where they set the first shot or master shot 1906 in the sequence. In accordance with example embodiments, the generalization is done in a manner that serves smallest angle principle.

In accordance with example embodiments, in 3 person static camera, static subject coverage, the smallest angle principle is enacted during any 3 person coverage scheme, provided the 3 actors are staged in a triangle formation. While the A pattern 1202 and L pattern 1204 are defacto triangles, the near straight line pattern 1206 must feature the middle character being slightly off line so it is, barely noticeable but still, a valid, triangle shape.

In accordance with example embodiments, additional or reduced coverage is recommended based on particular staging patterns. In accordance with example embodiments, in staging configurations with scenes with more than 3 subjects, the smallest angle principle, or a variation thereof, is modified to recommend coverage by recognizing sets of triangular 3 person scenes within a 4 person shape such as a square or rectangle. In accordance with example embodiments, by staging 2 of 4 characters in a 4 person scene shoulder to shoulder, they become 1 unit, if and when tagged only once. As such, 3 person coverage is sufficient to cover a 4 person scene. In accordance with an example embodiments, 2 couples sitting opposite one another can similarly be covered with 2 person coverage, provided each couple is sitting shoulder to shoulder and each couple is tagged only once (as opposed to each actor). In accordance with an example embodiment, while tagging strategies change, the smallest angle rule remains in effect and coverage is recommended accordingly. In accordance with example embodiments, in instances where the staging is a square or rectangular, and the characters are spread out, the smallest angle rule is modified accordingly.

In accordance with example embodiments, dynamic coverage measurement sets are generalized in a manner that generates guidance which allows the user to cover the content from different speeds, distances and positions, for example in front of the actors as they walk toward camera, beside the actors and from behind the actors.

In accordance with example embodiments, the measured angles and distances are generalized to accommodate the integration of attachable lenses, different focal lengths and image sensor sizes, camera movement and related changes in the field of view including speed.

In accordance with example embodiments, the user can shoot additional coverage by selecting a free shot option which allows the user to insert their own shot into the recommended coverage set. In accordance with example embodiments, the user is able to label their free shot option shot.

In accordance with example embodiments, the user can input supplementary camera positions or full coverage schemes into the map 3424 as a means of generating real time guidance which they can follow and record while using the free shot option. In accordance with example embodiments, the user plots coverage on-the-fly when using the free shot option. In accordance with example embodiments, the additional camera positions can be added to the coverage using a touchscreen on the mobile camera system 400. In accordance with example embodiments, composition guides 1102 may be recommended based on the user defined supplementary camera positions.

In accordance with example embodiments, the free shot option functionality allows user input either within the parameters of the set coverage schemes or outside them. In accordance with example embodiments, the user is required to leave the previsualization system application to record using the device camera. In accordance with example embodiments, free shot option footage is unbound by scanning limitations. In accordance with example embodiments, because it's the user's choice where to set the camera, they may place it near another recommended camera position—inside the scanned area—or they may place it outside the scanned area, for example from a distance and height such as a rooftop that offers a high and wide perspective that compliments the coverage scheme but is outside the area of the scanned set. In accordance with example embodiments, the previsualization system offers free shot compositional recommendations where the user can add/insert a shot into the recommended sequence at any time. In accordance with example embodiments, the free shot recommendation is derivative in nature and is meant to serve the recommended coverage sequence.

In accordance with example embodiments, the user is provided with a menu 3308 of optional composition guides 1102 which can be accessed to help frame each free shot. In accordance with example embodiments, users can access compositional guides 1102 when using the free shot option from an on-board menu 3308. In accordance with example embodiments, the free shot composition recommendations either serve the existing line of action 1314, or may trigger a new line of action 1314 if the user performs a move which does not serve the existing line of action 1314.

In accordance with example embodiments, derivative coverage of this position can be calibrated if and when a new free shot position is designated as a master shot 1906 position in a separate coverage scheme. In accordance with example embodiments, the user can continue engaging free shot functionality until they are satisfied with their own coverage.

In accordance with example embodiments, the previsualization system is able to accommodate derivative coverage that the user feels could add to their sequence. In accordance with example embodiments, the previsualization system allows the user to expand the coverage and add, for example, a medium 2 shot additional shot 1320, as shown in FIG. 13, or a super wide shot that they feel is missing from the recommendations. In accordance with example embodiments, the expanded coverage may help knit together dynamic chase scene footage.

In accordance with example embodiments, after a user has shot content, the footage is saved in an organized manner. In accordance with example embodiments, the footage is saved in a gallery 2208. In accordance with example embodiments, the user can access the gallery 2208 and tap framed screen grabs of each shot to trigger playback of the shot.

In accordance with example embodiments, the saved shots 2302 are presented traditionally in the gallery 2208.

In accordance with example embodiments, as depicted in FIG. 22, the user can access the gallery in a current project folder by tapping the current folder icon 2214 at any time during recording to review and/or replace the shots they've recorded to date.

In accordance with example embodiments, the saved shots 2302 are additionally or alternatively viewed stacked at each camera position in the map 3424. In accordance with example embodiments, by organizing shots by camera position, the user has a visual record of what shots they have, where they took them, and what shots they may need.

In accordance with example embodiments, the user is able to discard and reshoot any take from the gallery 2208, with full access to the original positional and compositional guidance.

In accordance with example embodiments, if any recommended shot has not been shot, the user can tap the empty shot frame in the gallery 2208 and finish their shooting with full guidance.

As shown in FIGS. 22, 23A, 23B, 23C, 24A, 24B, 26A and 26B, in accordance with example embodiments, the user can review their coverage in a gallery 2208 of recorded shots. In accordance with example embodiments, every saved shot 2302 is automatically labeled. In accordance with example embodiments, each recorded shot may be manually labelled as well.

As shown in FIGS. 22, 23A, 23B, 23C, 24A, 24B, 25A, 25B, 25C, 25D, 26A and 26B, which reflect the sequence for replacing a shot in accordance with example embodiments, the user can replace any shot from their coverage in the gallery 2208 and re-shoot the shot with the same previsualization guidance that was provided for the original shot.

In accordance with example embodiments, as shown in FIG. 22, the gallery 2208 is visible under the gallery 2208 information box 2202 which has been activated to help describe this stage of the user experience. The gallery 2208 information box 2202 offers guidance on how to replace a shot. In accordance with example embodiments, a user may access the gallery 2208 and review recorded shots by tapping any recorded shot then tapping the replay icon 2210 on the control panel 2804.

Figure 23B:
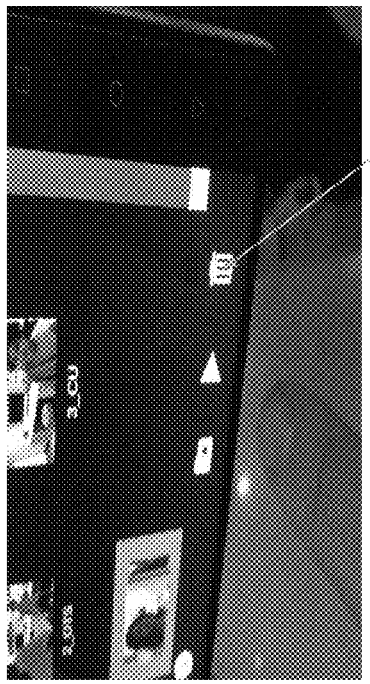
FIGS. 23A, 23B, and 23C are pictures showing a user deleting a shot from a gallery using a user interface in accordance with example embodiments.
Figure 23A:
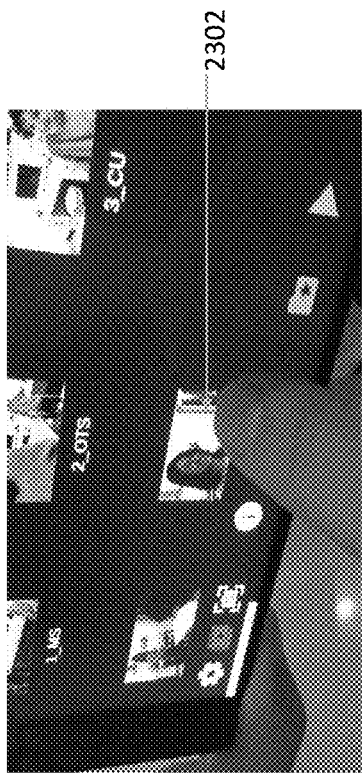
Figure 23C:
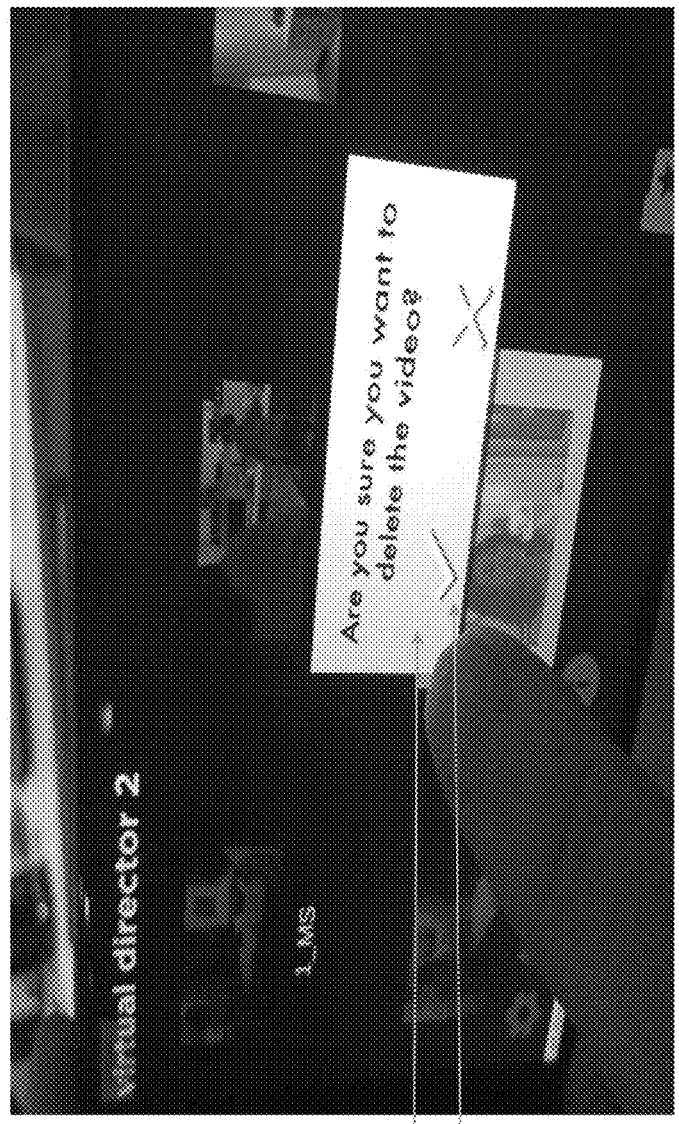

As depicted in FIGS. 23A, 23B, and 23C, in accordance with example embodiments, to reshoot a saved shot 2302, the user may tap a saved shot 2302 then tap the trash icon 2304 to start deleting the shot. As depicted in FIG. 23C, in accordance with example embodiments, a confirmation box 2306 appears. To delete the shot, the user taps the check icon 2308.

Figure 24A:
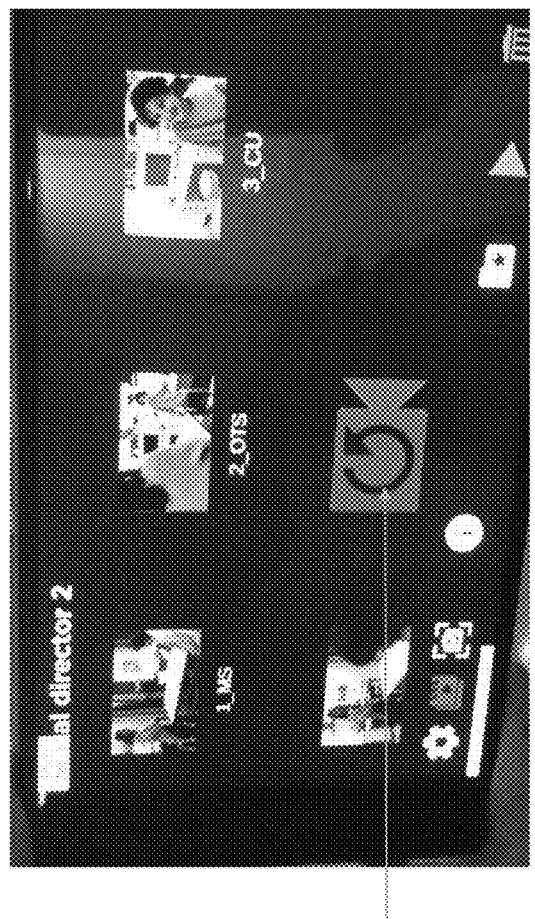
FIGS. 24A and 24B, are pictures showing a user using a user interface to request guidance to re-shoot a deleted shot in accordance with example embodiments.
Figure 24B:
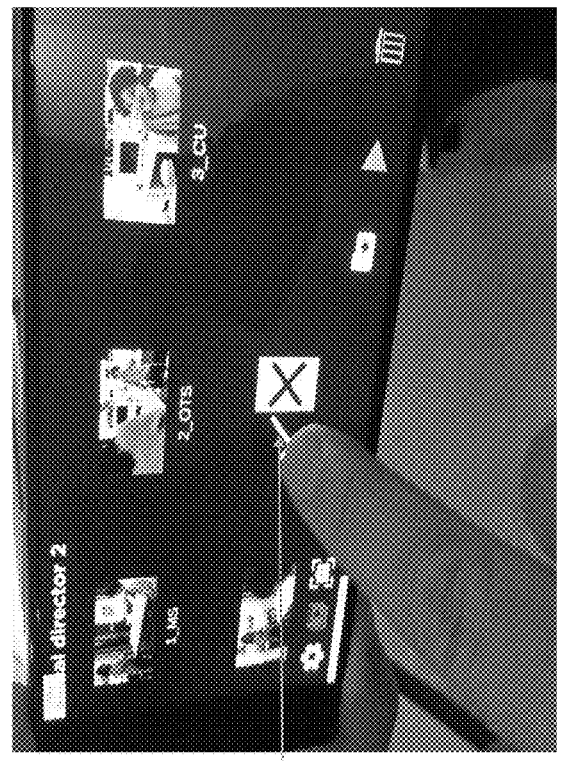
Figure 25D:
Figure 25C:
Figure 26B:
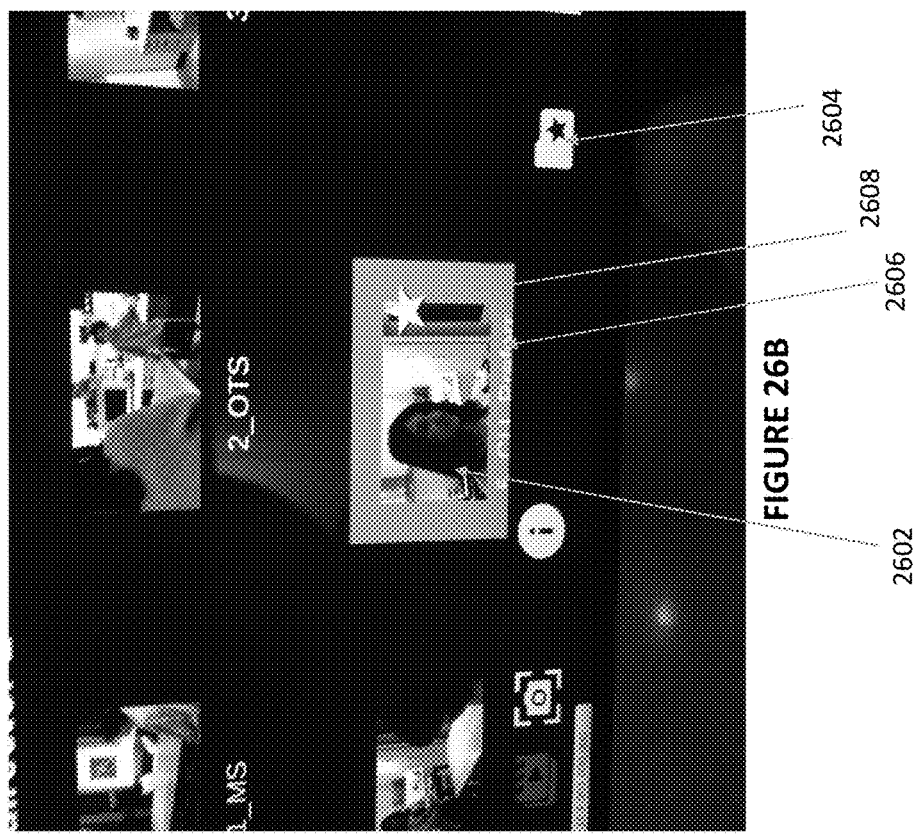
FIG. 26B is a picture depicting a user interface showing a gallery of recorded shots with a preferred shot identified by a star in accordance with example embodiments.
Figure 26A:
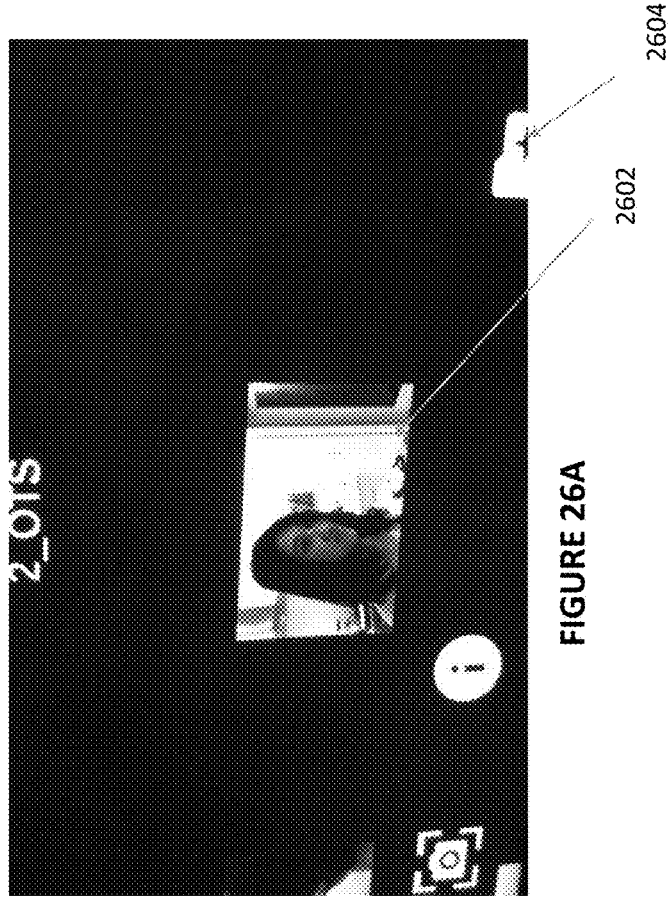
FIG. 26A is a picture of the user interface following a re-take of a shot in accordance with example embodiments.

As depicted in FIG. 24A, in accordance with example embodiments, the screengrab of the deleted shot is replaced by a camera icon 2402, which the user can tap to re-shoot the shot. As depicted in 24B, in accordance with example embodiments, the user then taps the check icon 2308 which, as depicted in FIG. 25A, summons the map 3424 which features the user's current camera position icon 904 and the next shot position icon 906, which represents the position of the deleted shot. In accordance with example embodiments, a user can be provided with instructions on re-shooting the shot as shown in FIG. 25B. In accordance with example embodiments, the user uses this guidance to re-stage and re-record the deleted shot. In accordance with example embodiments, as shown in in FIG. 25C, the user may access the same composition guide 1102 from the deleted shot for the replacement shot, which the user records as shown in FIG. 25D. In accordance with example embodiments, as shown in FIG. 26A, the new shot 2602 populates the same slot in the gallery 2208 as the deleted shot it replaced.

In accordance with example embodiments, the user can re-shoot a shot as an additional version without first having to delete the shot. In accordance with example embodiments, the user can select a shot to be re-shot in the gallery 2208. In accordance with example embodiments, re-shooting a shot summons the map 3424 which features the user's current camera position icon 904 and the next shot position icon 906, which represents the position of the selected shot. In accordance with example embodiments, a user can be provided with instructions on re-shooting the shot as shown in FIG. 25B. In accordance with example embodiments, the user uses this guidance to re-stage and re-record the selected shot. In accordance with example embodiments, as shown in in FIG. 25C, the user may access the same composition guide 1102 from the selected shot for the new version of the shot.

Figure 42B:
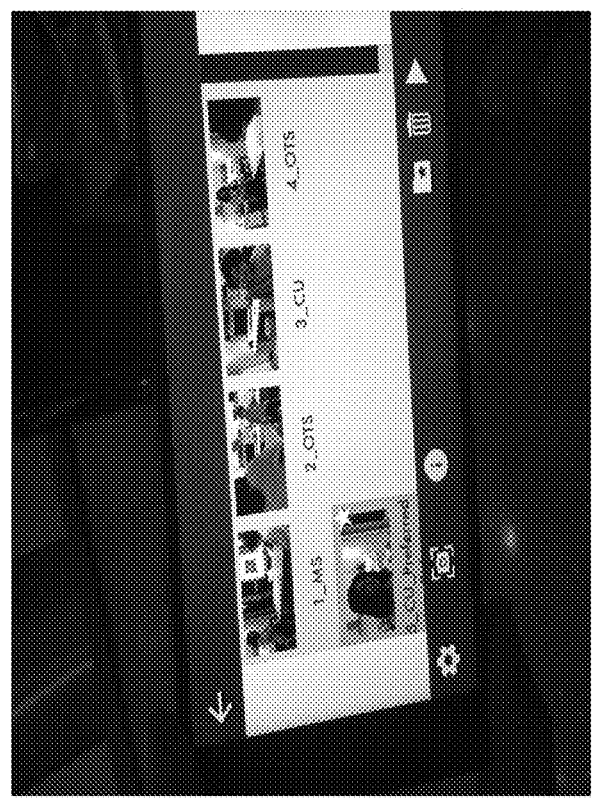
FIG. 42B is a picture showing a project user interface in accordance with example embodiments.
Figure 42A:
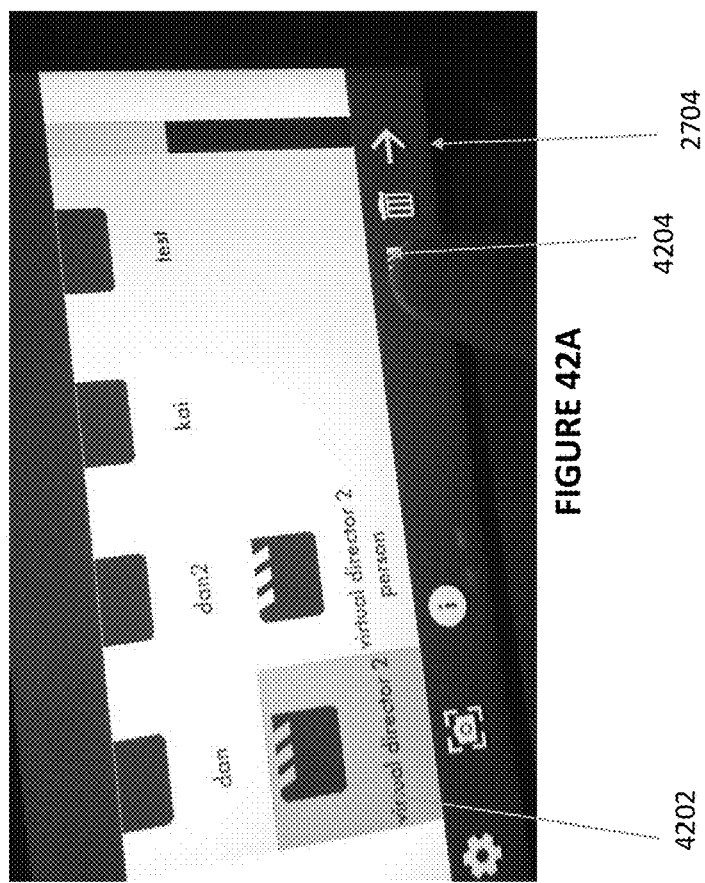
FIG. 42A is a picture showing an existing projects folder user interface in accordance with example embodiments.

As shown in FIG. 42A, in accordance with example embodiments, the user can access the gallery 2208 for an existing project in the existing projects bin by tapping the existing project folder 4202. In accordance with example embodiments, the user selects the existing project folder 4202 then the open folder icon 4204. As shown in FIG. 42B, in accordance with example embodiments, in the opened existing project folder 4202, the user may review, delete and reshoot any shot with full guidance or complete any unfinished coverage with full guidance.

In accordance with example embodiments, the master shot 1906 position as well as the positional tags from an existing project can be accessed in a new project, and the user would not have to re-scan the same set, re-set the master shot 1906 position or re-stage the subjects before using the skip shot function to advance through the recommendations to access the same recommendations for the shot the user wants to re-shoot.

In accordance with example embodiments, some augmented reality toolsets such as Apple™ ARKit™ may not allow an existing virtual set to be summoned when an existing project is re-opened. In accordance with example embodiments, to replace a deleted shot or sequence, the user can open a new project as depicted in FIG. 27B, select the same coverage scheme, scan the set, stage and set the same master shot 1906, re-tag the actors then use the skip shot function to advance through the coverage until they arrive at the shot they want to replace. The user can then re-shoot the deleted shot, while following the same guidance as provided in the previous project.

In accordance with example embodiments, this replacement shot can be accessed in the new project gallery 2208 or transferred to another project gallery 2208. In accordance with example embodiments, the user may re-save the new shot 2602 in the old gallery 2208.

In accordance with example embodiments, shooting may also be continued in existing project folders 4202. In accordance with example embodiments, if any recommendations have not been shot, users can enter the existing project folder 4202—by tapping the existing project folder 4202 then tapping the go arrow 2704—at any time and complete all unfinished shooting with full guidance. In accordance with example embodiments, to re-launch guidance, the mobile camera system 400 requires that the user re-tag their subjects. In accordance with example embodiments, to re-launch guidance, the mobile camera system 400 requires the user re-scan and re-tag their subjects.

As shown in FIG. 42A, in accordance with example embodiments, the user may complete any unfinished coverage, with the same previsualization guidance by tapping the existing project folder 4202 in the existing projects bin, then tapping the go arrow 2704. This will summon the guidance for any missing shot which the user has not yet shot.

In accordance with example embodiments, the user can also review any saved take in the camera of the mobile camera system 400.

In accordance with example embodiments, the user can relabel any shot or disable the auto-label function and label their footage as they want.

As shown in FIG. 42B, in accordance with example embodiments, the user can review saved takes in the gallery 2208. In accordance with example embodiments, exceptions such as free shots are added to the gallery 2208.

In accordance with example embodiments, a user can select a shot as a preferred shot in the gallery 2208. As shown in FIGS. 26A and 26B, in accordance with example embodiments, the user may highlight the new shot 2602 or any shot as a preferred take by tapping the selected screengrab then the preferred take icon 2604 as depicted in FIG. 26A. As depicted in FIG. 26B, this action highlights the preferred take. In accordance with example embodiments, the preferred take is highlighted with a small star 2608 and new frame 2606 which is coloured bright green.

In accordance with example embodiments, the previsualization system includes an auto-edit functionality, which is also known as dynamic gallery functionality, so an assembly of the recorded footage can automatically be put together. In accordance with example embodiments, the preferred shots are compiled to create the finished output. In accordance with example embodiments, the preferred shots are compiled into a video.

In accordance with example embodiments, this finished output can be shared, either to other devices or over the internet. In accordance with example embodiments, the finished output can be shared with various professional departments as is or shared with an editor whose work will be reduced because the assembly, which is the initial stage in editing, will have already be done, allowing them to advance to the rough cut stage.

In accordance with example embodiments, as depicted in FIGS. 26A and 26B, the user may designate and highlight their preferred shots in the project gallery 2208 and deploy auto-assembly to link the shots on a digital timeline using a playback viewer with editing capability. In accordance with example embodiments, this dynamic gallery 2208 functionality may offer real-time previsualization guidance by integrating recommended composition guides 1102; animatic screengrabs; animatic dialogue; animatic static or dynamic shots or sequences onto the timeline to act as a visual template for each clip in the edit; the content of each clip; the length of each clip; and the start and end edit points for each clip.

In accordance with example embodiments, sequences from the animatic or the composition guides 1102 used during production, which may be based on or drawn from the animatic, may be deployed as overlays to help guide editing during the edit of the sequence. In accordance with example embodiments, recorded shots using free shot functionality may also be used in the edit. In accordance with example embodiments, the animatic shots or sequences or composition guides 1102 may be viewed at the same time that the user edits and completes their project. In accordance with example embodiments, the real-time editing system offers composition guides on the editing time line as a visual recommendation for the placement and length of each recorded shot. In accordance with example embodiments, the music bed tracks and sound effects, which may be downloaded, unlocked and/or included in the animatic in the project module, may be added to the digital timeline as a separate element or elements for editing and mixing purposes.

In accordance with example embodiments, the real-time editing guidance may integrate facial recognition software, voice recognition software and/or text analysis software to identify edit points in shots which may include the same dialogue.

In accordance with example embodiments, the assembled footage can be integrated and mixed with bed tracks which are accessible in the project modules or by download, then adjusted for timing, so the edit and music work to a timed sequence as demonstrated in the project animatic.

In accordance with example embodiments, the user is able to upload the footage or screenshots to the cloud, social media sites, hard drives and/or other storage media, which feature the facility to export into conventional editing software. In accordance with example embodiments, the users can upload from the device gallery 2208, which automatically labels each project folder for easy access.

In accordance with example embodiments, the previsualization system may come in different feature tiers.

In accordance with example embodiments, the first tier may include basic coverage including beginner coverage schemes in the same respect that musical rudiments and proper hand position are taught to piano students. In accordance with example embodiments, basic coverage may include static camera, static subject coverage for 1, 2, 3, and 4 subjects, as well as static subject, dynamic camera coverage, dynamic subject, static camera coverage and dynamic subject, dynamic camera coverage for the same.

In accordance with example embodiments, the second tier, also known as basic add-on coverage, may supplement the basic coverage with learning modules as well as additional coverage schemes that augment the core functionality. In accordance with example embodiments, the second tier may include related learning modules including interactive lessons, exercises, tests, games where, for example, the user is required to chart one or more line of action 1314 friendly camera positions in a coverage scheme based on a master shot 1906 position or a derivative shot or shots, demonstration videos, and coverage schemes designed to help the user master the functionality and master proper coverage and improve their overall skill set.

In accordance with example embodiments, the third tier may include project modules that offer advanced coverage schemes and packages for short films in multiple genres. In accordance with example embodiments, the third tier project modules includes one or more of producer packs, character breakdowns, scripts, music tracks, animatics (simple animation sequences that dramatize the story), set designs, lighting schemes and coverage schemes that repurpose key storyboard frames from the animatics as composition guides 1102. In accordance with example embodiments, the script content may include original scripts and licensed material from famous films so users can study and recreate scenes the same way theatre students study the theatre canon in scene study.

In accordance with example embodiments, additional functionality for the previsualization system is created and deployed to supplement the previsualization system's functionality. In accordance with example embodiments, additional functionality may be purchased and downloaded into the previsualization system. In accordance with example embodiments, additional functionality may be deployed as purchases from the previsualization system. In accordance with example embodiments, users may be able to purchase additional tier 2 learning modules or tier 3 project modules. In accordance with example embodiments, users may be able to purchase additional coverage schemes.

In accordance with example embodiments, learning modules may include different content outlines.

In accordance with example embodiments, the learning modules may include feature lessons and coverage schemes on the line of action 1314, including when and how to break it; lighting; blocking; and camera moves.

In accordance with example embodiments, the learning modules may include a line of action 1314 module, which is a static subject, static camera introductory module that explores the line of action 1314 and includes 1 person and 2 person exercises. In accordance with example embodiments, once users run the drill in the line of action 1314 module three times, the 3 person and 4 person functionality is unlocked with related lessons, including how, when and why to break the line of action 1314.

In accordance with example embodiments, the learning modules may include an establishing shots and transitions module, which is a module that explains how to start and end a sequence.

In accordance with example embodiments, the learning modules may include a dynamic camera, static subject module, which includes an exercise on when and how the camera needs to move relative to stationary subjects, with technical tips on handheld, stabilizer and dolly options.

In accordance with example embodiments, the learning modules may include a dynamic subject, dynamic camera module which includes various exercises and/or scenarios that discuss when and how the camera needs to move relative to moving subjects and instruction on how it works and when and why to use this functionality, with tips on handheld, dolly, and stabilizer options.

In accordance with example embodiments, the learning modules may include a staging and blocking module, which explains how to stage and block for drama or other genres or how to stage and block for specific scenes from specific genres (such as a fight scene set in an action movie). In accordance with example embodiments, the learning modules may include common exits and entrances, and how, why and when to capture a scene in one shot versus a number of shots.

In accordance with example embodiments, the learning modules include coverage schemes and coverage scheme exercises that help the user work through the lesson.

In accordance with example embodiments, the learning modules may include various lighting modules and schemes, which compliment the coverage schemes as a second set of lighting recommendations, which may appear as another layer of overlays that appear over the live image, which in some cases can be user modified. A module on lighting effects explains what lights to use and how placement affects coverage.

In accordance with example embodiments, the learning modules may include an advanced lensing and composition module which offers lessons and coverage schemes designed to accommodate different interchangeable lens and related tutorials which discuss when and why change your lens, and the effect a lens change can have on content.

In accordance with example embodiments, the learning modules may include a staging and angles module, which provides insight into how changing the angle of a shot, the length of a shot, or the positioning of subjects within a shot, can have editorial significance. For example, low angle shots can make a character seen more ominous, while an overhead shot, taken using a selfie stick, can suggest vulnerability or hopelessness. This approach may be suitable for a horror scene versus a comedy scene which usually feature more conservative angles. In accordance with example embodiments, this module explores composition, angle and timing as they relate to meaning, genre and scene content.

In accordance with example embodiments, the learning modules may include a module on group scenes and related blocking, tagging and coverage strategies.

In accordance with example embodiments, the learning modules may include a car coverage module, explaining how to shoot car coverage or bike coverage and providing tutorials including insight on tagging strategies that work around reflective surfaces.

In accordance with example embodiments, the learning modules may include coverage strategies for chase scenes featuring 2, 3 or people, which sets the stage for project modules with action sequences.

In accordance with example embodiments, the learning modules may include a sports coverage module, which explains how to shoot sports including football and basketball games.

In accordance with example embodiments, the learning modules may include a documentary module, which explains how to set and conduct interviews, capture fly-on-the wall B roll coverage at live events and stage and capture controlled B roll coverage.

In accordance with example embodiments, the learning modules may include a blog/vlog module which provides instruction on shooting rants, selfie technique and content and coverage strategies for related scenes.

In accordance with example embodiments, the learning modules may include a video sales aid module and a corporate profile module, explaining how to shoot a sales video or corporate profile for the corporate world.

In accordance with example embodiments, the learning modules may include a next shot logic for architect's module, which allow architects the means to plot and move property based icons (buildings, trees) from position to position (vs shot to shot) over live images of properties for customers.

In accordance with example embodiments, the third tier, the project modules, which a user uses to make a film, may include short producer packs that outline the movie and list all required elements; tips and tricks; screenplays; sound effects, music tracks, animatics that show the user what the finished film will look like and coverage schemes that include lighting; lensing; and static and/or dynamic positional and compositional guidance which repurposes key frames from the animatic as overlays.

In accordance with example embodiments, learning modules and project modules may include screenplays featuring licensed content, clips and images from Hollywood classics, so users can study and recreate the classics in the same manner that theatre schools re-stage classic works by history's greatest playwrights. In accordance with example embodiments, the project modules may be of varying complexity, including a module with a script that calls for basic static camera, static subject functionality in a simple 2 person movie; and an advanced 4 person project module with dynamic subject, dynamic camera functionality. In accordance with example embodiments, the screenplay-based project modules modules can range from 60 to 5 minutes and can be shot in an afternoon. In accordance with example embodiments, the screenplay-based project modules are designed with cliffhanger endings, which the user can shoot as is or finish on their own.

In accordance with example embodiments, the learning modules may include lessons which introduce users to the art of narrative storytelling in a variety of genres, including horror, comedy, action, drama and documentary.

In accordance with example embodiments, scripted project modules feature animatics, short scripts, bed tracks, sound effects, and related coverage schemes and lighting schemes in multiple genres. In accordance with example embodiments, these modules can be downloaded into the previsualization system by the user. In accordance with example embodiments, some on-board scripted or unscripted learning modules or on-board project modules may be unlocked once competency in core functionality has been successfully achieved.

In accordance with example embodiments, the user watches the animatic and reviews an animated version of the short film or scene as it is intended to be shot and cut. In accordance with example embodiments, following an on-board script, the user shoots the same scene or scenes based on a suitably chosen set or sets, with the previsualization system offering full guidance. In accordance with example embodiments, at each camera position, the user can access looks (storyboard overlays) which are key frames pulled from the animatic that they just watched. In accordance with example embodiments, the user shoots out the scene based on the guidance from the previsualization system, which helps the user shoot footage that will cut properly. In accordance with example embodiments, the previsualization system provides directing tips, style sheets (that profile the different techniques of great directors), providing the user helpful insights and tips to produce and complete their film.

In accordance with example embodiments, project module content is developed to meet different needs and interests of different user groups. In accordance with example embodiments, project module length may vary from 30 seconds to 5 minutes and may be structured in a manner that can be shot in as little time as half a day. In accordance with example embodiments, the project module may contain guidance for only half the scene, for example only the set up, and the user is then expected to complete the scene on their own, for example determining the resolution, writing and directing it on their own, with the previsualization system offering real time guidance.

In accordance with example embodiments, script-based project modules may include sketch comedy, romantic comedy, action, Sci-Fi, drama, western, horror, thriller, music video, be the hero (for the younger set, vignette coverage scheme that feature game winning plays by select players), news casts, commercials, and how to vlog.

In accordance with example embodiments, learning modules and project modules may advance the amateur skillset by way of focused, hands-on and entertainment based experiential learning.

In accordance with example embodiments, the previsualization system can be geared towards different levels of education, for example primary, secondary and post secondary education levels. Introductory media classes and non-media based curriculum are offered at different levels of education, putting an emphasis on video as a presentation tool. In accordance with example embodiments, the previsualization system offers a digital learning tool to assist educators and provide an alternative to conventional study.

In accordance with example embodiments, the learning modules may include an academic curriculum module which includes curriculum based units for primary, secondary and/or post secondary special projects.

In accordance with example embodiments, the previsualization system outputs coverage schemes based entirely on user inputs. In accordance with example embodiments, the previsualization system engine delivers real time mapping functionality that serves advanced users and professionals who prefer full control over the coverage schemes created. In accordance with example embodiments, the user can adjust the map 3424 and control where each camera position is set, based on the position of where they set the master shot 1906 location. In accordance with example embodiments, each user input camera position remains derivative of the initial placement. In accordance with example embodiments, the user inputs camera positions using the mobile camera systems' 400 touchscreen display 700.

In accordance with example embodiments, users can disable the composition guides 1102, and the previsualization system then helps create and output coverage schemes that the user designs, including the master shot 1906 and all derivative shots in the sequence. In accordance with example embodiments, this coverage scheme can be recorded shot by shot or the coverage schemes can be saved as 'maps' for the purposes of sharing or both. In accordance with example embodiments, these user developed coverage schemes may be appropriate for professional, preproduction pre-visualization. In accordance with example embodiments, rather than design a previsualization plan in a traditional sense, e.g. after visiting the location, the user can prepare a real-time shotlist on-the-fly during a location scout. In accordance with example embodiments, the user imports an existing script or scene from a script into the system then maps their scene, starting with the master shot, using the script as a guide which they can reference as swipe-able overlay. After inputting each camera position onto the map 3424, the user has the option of recording each shot using free shot functionality. In accordance with example embodiments, the user can chart and describe lighting sources onto the map 3424. In accordance with example embodiments, on-the-fly mapping and shotlists—which can be based on labelled shots in the system's gallery—may help a user speed up their creative process, because not only are they creating a coverage scheme on-the-fly, they can shoot it if they so choose and share one or both forms of the output. In accordance with example embodiments which allow user developed shotlists, the user can input and/or augment metadata that describes the scene, shot, lens and lighting, and time of day, which can be uploaded and shared.

In accordance with example embodiments, when a coverage scheme is built by way of user input only, users can reshoot saved shots 2302 in the gallery 2208 with guidance, as shown in FIG. 22.

In accordance with example embodiments, the user may supplement the recommended scene with coverage and content they have written and directed on their own.

In accordance with example embodiments, the coverage scheme and shotlist can be printed, for example as PDFs.

In accordance with example embodiments, the created output, including the coverage scheme, shotlist, and the recorded, edited scenes, can be shared and reviewed by multiple departments as a means of speeding up the pre-production process. In accordance with example embodiments, a producer or assistant director can input related metadata from the created output into scheduling software such as Movie Magic™ and review whether or not the coverage scheme can actually be achieved in a time frame that the budget allows. In accordance with example embodiments, other departments may benefit from the created output, including set design and props, by benefitting from trial sequences based on set coverage schemes.

Certain adaptations and modifications of the described embodiments can be made. Therefore, the above discussed embodiments are considered to be illustrative and not restrictive.

What is claimed is:

1. A method for film presvisualization of a video, the method comprising:
   scanning a set using a mobile camera system having a camera that records the video, one or more scanners, and a display, the scanning performed using the one or more scanners of the mobile camera system;
   setting a master shot position in the set using the mobile camera system;
   tagging a position of one or more subjects within the set using the mobile camera system;
   calculating one or more camera positions based on the position of the master shot and the position of the one or more subjects within the set using the mobile camera system;
   identifying one or more lines of action between two or more of the subjects, wherein calculating the one or more camera positions comprises the one or more camera positions not crossing the one or more lines of action;
   displaying on the display of the mobile camera system a spatial location of the one or more camera positions on a map of the set, wherein the map is translucent and appears over a live view of the camera;
   indicating on the display of the mobile camera system, wherein the display of the mobile camera system displays more than one subject, one or more recommended spatial locations of which the one or more camera positions is a next camera position to be shot for the video, wherein the next camera position is associated with a subject who is the pivot of a smallest angle formed between the master shot position and the two subjects closest to the master shot position; and
   displaying on the map of the set on the display of the mobile camera system, a position icon that tracks a real time position of the camera as teh camera moves to the next camera position.

2. A method for film previsualization in accordance with claim 1, further comprising:
   determining, using the one or more scanners, when the camera of the mobile camera system is at the next camera position; and
   indicating on the display which of the one or more camera positions is to be shot after footage has been shot from the next camera position.

3. A method for film previsualization in accordance with claim 1, further comprising displaying a dynamic compass arrow on the map of the set that points in a direction of the spatial location of the next camera position.

4. A method for film previsualization in accordance with claim 1, further comprising:
   determining, using the one or more scanners, a current location of the camera of the mobile camera system in the set; and
   displaying the current location of the camera of the mobile camera system on the map of the set.

5. A method for film previsualization in accordance with claim 1, further comprising:
identifying, from memory, one or more composition guides for the one or more camera positions;
selecting, from the memory, one of the one or more composition guides;
overlaying the selected composition guide over a camera live view on the display of the mobile camera system.

6. A method for film previsualization in accordance with claim 1, wherein the map of the set is an overhead map.

7. A method for film previsualization in accordance with claim 1, wherein one or more of the one or more camera positions is an over-the-shoulder shot.

8. A method for film previsualization in accordance with claim 1, wherein one or more of the one or more camera positions is a close-up shot of one of the subjects.

9. A method for film previsualization in accordance with claim 1, wherein the setting of the master shot position comprises receiving user input through the mobile camera system when the camera of the mobile camera system is presently capturing the master shot.

10. A method for film previsualization in accordance with claim 1, wherein one or more recommended spatial locations for the master shot is based on the scan of the set and the position of the one or more subjects.

11. A method for film previsualization in accordance with claim 1, wherein the mobile camera system automatically calculates and sets the master shot position in the set based on the scan of the set and the position of the one or more subjects.

12. A method for film previsualization in accordance with claim 1, wherein the display comprises a touchscreen, the method further comprising manually plotting camera positions for a coverage scheme through the touchscreen, wherein the calculating is further based on the manually plotted camera positions.

13. A method for film previsualization in accordance with claim 1, wherein the calculating is further based on one or more of a focal length, image sensor size, or lens of the mobile camera system.

14. A method for film previsualization in accordance with claim 1, wherein the scanning of the set generates a point cloud of a virtual set.

15. A method for film previsualization in accordance with claim 1, wherein
the scanning is performed using one or more of monocular photogrammetry, stereoscopic photogrammetry, motion tracking or infrared scanning.

16. A method for film previsualization in accordance with claim 15, wherein the scanning comprises measurements from one or more of a gyroscope, compass or accelerometer.

17. A method for film previsualization in accordance with claim 1, further comprising:
wherein the one or more camera positions associated with the subject who is the pivot are recommended first after the master shot.

18. A method for film previsualization in accordance with claim 1, further comprising, after footage has been shot from the next camera position, recommending one or more further camera positions associated with a next subject who is closest to the subject who is the pivot.

19. A method for film previsualization in accordance with claim 1, further comprising:
displaying, on the display, a location of one or more of the lighting set ups on the map of the set,
wherein the next camera position associated with the subject who is the pivot minimizes a need to reconfigure the lighting set ups.

20. A method for film previsualization in accordance with claim 1, wherein the position of one or more of the subjects comprises a path of the subject to account for the subject moving during a scene.

21. A method for film previsualization in accordance with claim 1, wherein one or more of the camera positions comprise a recommended path for the camera to follow during a scene.

22. A method for film previsualization in accordance with claim 1, further comprising:
shooting one or more shots at one or more of the camera positions with the camera of the mobile camera system; and
saving the one or more shots in a gallery.

23. A method for film previsualization in accordance with claim 22 further comprising:
identifying one or more of the shots as preferred shots; and
compiling the one or more preferred shots into the video.

24. A method for film previsualization in accordance with claim 22, further comprising:
selecting a shot in the gallery;
displaying the camera position of the selected shot on the map of the set;
re-shooting the shot footage from the camera position with the camera; and
saving the new shot in the gallery.

25. A method for film previsualization in accordance with claim 1, further comprising displaying the location of one or more of the subjects on the map of the set on the display of the mobile camera system.

26. A method for film previsualization in accordance with claim 1, further comprising displaying a tag on one or more of the subjects on the live view of the camera on the display of the mobile camera system.

27. A method for film previsualization in accordance with claim 1, wherein the display comprises a touchscreen, wherein one or more additional camera positions can be manually added to the map through the touchscreen.

28. A method for film previsualization in accordance with claim 1, wherein the display comprises a touchscreen, wherein the tagging the position of the one or more subjects is performed through the touchscreen by touch input of the one or more subject displayed on the touchscreen.

29. A method for film previsualization in accordance with claim 1, wherein instructions which are executable by one or more processors for performing the method are stored on a non-transitory computer readable medium.

30. A method for film previsualization in accordance with claim 1, wherein the more than one subject includes at least three subjects, wherein the subject who is the pivot is selected from one of the at least three subjects.

31. A method for film previsualization in accordance with claim 1, wherein the more than one subject includes at least four subjects, wherein the subject who is the pivot is selected from one of the at least four subjects.

32. A method for film previsualization in accordance with claim 1, wherein the indicating on the display includes recommending one or more recommended spatial locations which include, in sequential order:
the master shot;
an over-the-shoulder shot of the subject who is the pivot; and
a close-up shot of the subject who is the pivot.

33. A mobile camera system comprising:
a camera that records a video;
one or more processors;
memory;
one or more scanners; and
a display;
the one or more processors configured to execute instructions stored in memory to:
scan a set using the one or more scanners,
set a master shot position in the set for athe video,
tag a position of one or more subjects within the set,
calculate one or more camera positions based on the master shot position and the position of the one or more subjects within the set,
identify one or more lines of action between two or more of the subjects wherein calculating the one or more camera positions comprises the one or more camera positions not crossing the one or more lines of action;
display on the display a spatial location of the one or more camera positions on a map of the set, wherein the map is translucent and appears over a live view of the camera,
indicate on the display, wherein the display displays more than one subject, one or more recommended spatial locations of which the one or more camera positions is a next camera position to be shot for the video, wherein the next camera position is associated with a subject who is the pivot of a smallest angle formed between the master shot position and the two subjects closest to the master shot position; and
display on the map of the set on the display, a position icon that tracks a real time position of the camera as the camera moves to the next camera position.

* * * * *